United States Patent [19]
Enoki et al.

[11] Patent Number: 5,738,275
[45] Date of Patent: Apr. 14, 1998

[54] COMBINATION FAUCET DEVICE

[75] Inventors: Masatoshi Enoki; Osamu Tokunaga; Setsuo Ito; Masaaki Itoh; Hirofumi Takeuchi, all of Kitakyushu, Japan

[73] Assignee: Toto Ltd., Fukuoka, Japan

[21] Appl. No.: 699,486

[22] Filed: Aug. 19, 1996

Related U.S. Application Data

[62] Division of Ser. No. 290,807, filed as PCT/JP93/01933 Dec. 24, 1993, Pat. No. 5,579,992.

Foreign Application Priority Data

Dec. 25, 1992 [JP] Japan .................. 4-359492 P
Jun. 30, 1993 [JP] Japan .................. 5-189162 P

[51] Int. Cl.$^6$ .................................. G05D 23/13
[52] U.S. Cl. ........................ 236/12.21; 236/101 D
[58] Field of Search .................. 236/12.21, 12.22, 236/101 D

[56] References Cited

U.S. PATENT DOCUMENTS

| | | | |
|---|---|---|---|
| 4,607,788 | 8/1986 | Bendall et al. | 236/12.2 |
| 5,123,593 | 6/1992 | Rundle | 236/101 D |
| 5,141,153 | 8/1992 | Jeffress | 236/93 B |
| 5,356,074 | 10/1994 | Limet et al. | 236/12.22 |

FOREIGN PATENT DOCUMENTS

| | | |
|---|---|---|
| 0443416A1 | 8/1991 | European Pat. Off. . |
| 61-44062 | 8/1980 | Japan . |
| 58-24669 | 7/1981 | Japan . |
| 61-50194 | 5/1982 | Japan . |

*Primary Examiner*—William E. Tapolcai
*Attorney, Agent, or Firm*—Hickman Beyer & Weaver, LLP

[57] ABSTRACT

In a combination faucet device (10) according to the invention, a movable valve member (160) slidingly moves relative to a main casing (30) to change a mixing ratio of high-temperature water supplied from a hot water port (116) to low-temperature water supplied from a cold water port (106). The movable valve member (160) is pressed by a temperature sensitive spring (130) in a first direction while being pressed by a bias spring (150) in a second direction opposite to the first direction. The temperature sensitive spring (130) is exposed to water mixture and varies its spring constant according to the temperature of the water mixture. The temperature sensitive spring (130) accordingly moves the movable valve member (160) in a direction for decreasing the ratio of the high-temperature water to a certain position where the spring force of the temperature sensitive spring (130) balances with the spring force of the bias spring (150), thus allowing water mixture adjusted to a target.

21 Claims, 36 Drawing Sheets

L : RESPONSE DELAY TIME
τ : TIME CONSTANT

COMBINATION FAUCET DEVICE

This is a divisional of application Ser. No. 08/290,807 filed on Aug. 8, 1994, now U.S. Pat. No. 5,579,992, and International Application PCT/JP93/01933 filed on Dec. 24, 1993 and which designated the U.S.

BACKGROUND OF THE INVENTION

1. Field of the Invention

The present invention relates to a combination faucet device, and more particularly to a combination faucet device for mixing hot water with cold water by pressing a movable valve member with a spring composed of a material having a spring constant varied according to the temperature.

2. Description of the Related Art

One example of proposed combination faucet devices is an automatic temperature-control combination faucet disclosed in JAPANESE UTILITY MODEL PUBLICATION GAZETTE No. 61-44062, where a shape-memory alloy whose shape is varied with the temperature is used to press a movable valve member for changing the ratio of hot water to cold water, thus uniformly controlling the temperature of water mixture of hot water and cold water. After a predetermined shape is given to the shape-memory alloy in an atmosphere of a specific temperature, the alloy is physically changed to another shape at other temperatures. The original predetermined shape is, however, restored every time when the alloy is exposed to the atmosphere of the specific temperature. The shape-memory alloy has a thermal capacity smaller than conventional temperature-sensitive elements, for example, a thermowax, and is sensitive to the temperature variation.

In the prior art combination faucet, the movable valve member is pressed on one end thereof by a shape memory alloy coil and on the other end thereof by a coil spring. The shape-memory alloy coil is directly exposed to water mixture of hot water and cold water. The shape-memory alloy coil having a fixed coil length at a specific temperature functions as described below in response to the temperature variation of water mixture.

While water mixture is in a steady state at a preset temperature, the movable valve member does not move but is stopped at a position where the shape-memory alloy coil balances with the coil spring. When the temperature of water mixture is changed from the steady state to the specific temperature by an external turbulence, the shape-memory alloy coil exerts its shape restoration effect to restore the fixed coil length set at the specific temperature. The shape restoration effect destroys the balance of the shape-memory alloy coil with the coil spring to drive the movable valve member towards the coil spring or the shape-memory alloy coil. When the coil length of the shape-memory alloy coil is successively set in a certain temperature range around the preset temperature, the shape-memory alloy coil exerts its shape restoration effect to vary the coil length with variation in the temperature of water mixture within the certain temperature range. The movable valve member is accordingly displaced corresponding to the temperature change of water mixture so as to vary the ratio of hot water to cold water, thus maintaining the temperature of water mixture around the preset value.

The shape-memory alloy is generally expensive and preferably composed of a small amount of material. A temperature-sensitive spring composed of a small amount of material has a smaller spring constant than conventional springs, and does not drive the movable valve member with a sufficiently large driving force. Such a temperature sensitive spring having a small spring constant has a poor supporting force with respect to the movable valve member. Even a slight torsional force inclines the movable valve member to deteriorate the sealing effects, thus preventing the temperature of water mixture from being controlled accurately.

A spring composed of the shape-memory alloy sensitively responds to the temperature of water mixture of hot water and cold water. When the shape-memory alloy spring is exposed to insufficiently mixed hot water and cold water, varying loads are applied onto different parts of the shape-memory alloy spring to prevent stable temperature control of water mixture.

SUMMARY OF THE INVENTION

The object of the invention is thus to provide a novel combination faucet device for stably supplying water mixture of a preset target temperature using a temperature sensitive spring composed of a shape-memory alloy having a small spring constant.

The invention is directed to a combination faucet device for mixing high-temperature water with low-temperature water and making water mixture of a predetermined target temperature flown through the combination faucet device. The combination faucet device includes a casing member having a hot water port for supplying the high-temperature water therethrough, a cold water port for supplying the low-temperature water therethrough, and a sliding chamber connecting to both of the hot water port and the cold water port, a movable valve member having an inner face and an outer face, the movable valve member being slidably fitted into the sliding chamber formed in the casing member so as to adjust a mixing ratio of the high-temperature water flown through the hot water port to the low-temperature water flown through the cold water port, a temperature sensitive spring having a first end and a second end and being mainly composed of a material having a spring constant varied according to a temperature change within a predetermined temperature range, the temperature sensitive spring pressing the movable valve member in a first direction for decreasing the ratio of the high-temperature water to the low-temperature water when an actual temperature of the water mixture becomes greater than the predetermined target temperature, a bias spring for pressing the movable valve member in a second direction opposite to the first direction, and a spacer member having a first end and a second end and being disposed between the movable valve member and the temperature sensitive spring for keeping the first end of the temperature sensitive spring apart by a predetermined distance from a certain position where the high-temperature water is mixed with the low-temperature water.

According to the preferred embodiment, the spacer member has, on the first end, a valve pressing element being in contact with the movable valve member and, on the second end, a spring receiving element for supporting the first end of the temperature sensitive spring. The valve pressing element formed on the first end of the spacer member is projected from the spring receiving element formed on the second end of the spacer member, and has a plurality of legs disposed at predetermined intervals in a circumferential direction along the inner face of the movable valve member. It is preferable that some of the plurality of legs are arranged to face the cold water port formed on the casing member. Each of the legs may be formed as a fin for leading a flow of the low-temperature water through the cold water port in the circumferential direction along the inner face of the movable valve member. The valve pressing element preferably includes six through eight fins arranged at identical intervals in the circumferential direction or alternatively arranged at varying intervals in the circumferential direction. In the latter case, the interval increases in proportion to the distance from the cold water port.

According to another aspect of the invention, a combination faucet device for mixing high-temperature water with low-temperature water and making water mixture of a predetermined target temperature flown through the combination faucet device includes

- a casing member having a hot water port for supplying the high-temperature water therethrough, a cold water port for supplying the low-temperature water therethrough, and a sliding chamber connecting to both of the hot water port and the cold water port,
- a movable valve member having an inner face and an outer face, the movable valve member being slidably fitted into the sliding chamber formed in the casing member so as to adjust a mixing ratio of the high-temperature water flown through the hot water port to the low-temperature water flown through the cold water port,
- a temperature sensitive spring mainly composed of a material having a spring constant varied according to a temperature change within a predetermined temperature range, the temperature sensitive spring pressing the movable valve member in a first direction for decreasing the ratio of the high-temperature water to the low-temperature water when an actual temperature of the water mixture becomes greater than the predetermined target temperature,
- a bias spring for pressing the movable valve member in a second direction opposite to the first direction, and
- a diverging member disposed at a certain position facing the cold water port for changing a direction of a flow of the low-temperature water supplied through the cold water port.

In one preferable application, the diverging member includes one or a plurality of fins for leading a flow of the low-temperature water through the cold water port in a circumferential direction along the inner face of the movable valve member.

According to another aspect of the invention, a combination faucet device for mixing high-temperature water with low-temperature water and making water mixture of a predetermined target temperature flown through the combination faucet device includes

- a casing member having a hot water port for supplying the high-temperature water therethrough, a cold water port for supplying the low-temperature water therethrough, and a sliding chamber connecting to both of the hot water port and the cold water port,
- a movable valve member having an inner face and an outer face, the movable valve member being slidably fitted into the sliding chamber formed in the casing member so as to adjust a mixing ratio of the high-temperature water flown through the hot water port to the low-temperature water flown through the cold water port,
- a temperature sensitive spring mainly composed of a material having a spring constant varied according to a temperature change within a predetermined temperature range, the temperature sensitive spring pressing the movable valve member in a first direction for decreasing the ratio of the high-temperature water to the low-temperature water when an actual temperature of the water mixture becomes greater than the predetermined target temperature,
- a bias spring for pressing the movable valve member in a second direction opposite to the first direction, and
- a diverging member disposed at a certain position facing the hot water port for changing a direction of a flow of the high-temperature water supplied through the hot water port.

According to the preferred embodiments, the bias spring is supported by a bias spring receiving member, which is formed integrally with the diverging member. The diverging member may include one or a plurality of fins for leading a flow of the high-temperature water through the hot water port in a circumferential direction along the inner face of the movable valve member.

The invention is also directed to a combination faucet device including

- a cylindrical mixing chamber connecting to both of a hot water port for supplying the high-temperature water therethrough and a cold water port for supplying the low-temperature water therethrough,
- a movable valve member for controlling a flow of the high-temperature water supplied through the hot water port and/or a flow of the low-temperature water supplied through the cold water port so as to adjust a mixing ratio of the high-temperature water to the low-temperature water,
- a temperature sensitive spring having a first end and a second end, the temperature sensitive spring being exposed to water mixture of the high-temperature water and the low-temperature water mixed in the mixing chamber, the temperature sensitive spring having a spring constant varied with a temperature of the water mixture,
- driving means for actuating the movable valve member in proportion to a pressing force of the temperature sensitive spring, and
- a diverging member for leading a flow of the high-temperature water supplied through the hot water port, a flow of low-temperature water supplied through the cold water port, and a flow of the water mixture on the upstream of the temperature sensitive spring, in a circumferential direction of the cylindrical mixing chamber.

In one preferable application, the temperature sensitive spring is fixed on the second end, and presses the movable valve member by the first end in a first direction to function as the driving means. The combination faucet device may further include a bias spring for pressing the movable valve member in a second direction opposite to the first direction, and a pre-load adjusting mechanism for adjusting a pre-load applied onto the bias spring. In another preferable application, the combination faucet device further includes a casing member having a wall for defining the mixing chamber and a valve chamber for accommodating the movable valve member, the temperature sensitive spring, and the bias spring therein. The casing member is detachably attached to a member having the cold water port or the hot water port formed thereon. The diverging member may be integrally formed with the wall of the casing member.

According to the preferred embodiments, the combination faucet device further includes a spacer for keeping the temperature sensitive spring apart by a the diverging member is formed on the spacer. The spacer is provided with a guide member which is slidably brought into contact, on a plurality of points, with the wall of the casing member facing the mixing chamber.

According to still another aspect of the invention, a combination faucet device for mixing high-temperature water with low-temperature water and making water mixture of a predetermined target temperature flown through the combination faucet device includes a casing member having a hot water port for supplying the high-temperature water therethrough, a cold water port for supplying the low-temperature water therethrough, and a sliding chamber connecting to both of the hot water port and the cold water port, a movable valve member slidably fitted into the sliding chamber formed in the casing member for adjusting a mixing ratio of the high-temperature water flown through the hot water port to the low-temperature water flown through the cold water port, a temperature sensitive spring having a first end and a second end and being mainly composed of a material having a spring constant varied according to a temperature change within a predetermined temperature range, the temperature sensitive spring pressing the movable valve member in a first direction for decreasing the ratio of the high-temperature water to the low-temperature water when an actual temperature of the water mixture becomes greater than the predetermined target temperature, a bias spring for pressing the movable valve member in a second direction opposite to the first direction, a cylindrical flow-path member disposed inside the temperature sensitive spring for defining, together with an inner wall of the casing member, a spring flow path chamber which receives the temperature sensitive spring therein, and a spring chamber conduit for leading a flow of water mixture of the high-temperature water supplied through the hot water port and the low-temperature water supplied through the cold water port, into the spring flow path chamber.

According to a preferable structure for exposing the temperature sensitive spring to water mixture, the combination faucet device further includes a spacer disposed between the movable valve member and the temperature sensitive spring for keeping the first end of the temperature sensitive spring apart by a predetermined distance from a certain position where the high-temperature water is mixed with the low-temperature water. The cylindrical flow-path member and the spring chamber conduit are formed on the spacer. In one preferable application, the spring chamber conduit having a throttle is formed on one end of the spacer and is provided with a guide element widened gradually from upstream to downstream of a flow of the water mixture.

According to the preferred embodiments, the combination faucet device further includes a temperature-sensitive spring receiving member having a spring receiving element for receiving the second end of the temperature sensitive spring, where the cylindrical flow-path member is formed on the temperature-sensitive spring receiving member. A flow baffle element for stirring the water mixture may be disposed in the spring flow path chamber. The flow baffle element includes a helical projection formed on the cylindrical flow-path member, or alternatively includes a helical projection formed on the inner wall of the casing member.

According to another aspect of the invention, a combination faucet device for mixing high-temperature water with low-temperature water and making water mixture of a predetermined target temperature flown through the combination faucet device includes a casing member having a hot water port for supplying the high-temperature water therethrough, a cold water port for supplying the low-temperature water therethrough, and a sliding chamber connecting to both of the hot water port and the cold water port, a movable valve member slidably fitted into the sliding chamber formed in the casing member for adjusting a mixing ratio Of the high-temperature water flown through the hot water port to the low-temperature water flown through the cold water port, a temperature sensitive spring having a first end and a second end and being mainly composed of a material having a spring constant varied according to a temperature change within a predetermined temperature range, the temperature sensitive spring pressing the movable valve member in a first direction for decreasing the ratio of the high-temperature water to the low-temperature water when an actual temperature of the water mixture becomes greater than the predetermined target temperature, a bias spring for pressing the movable valve member in a second direction opposite to the first direction, and a temperature-sensitive spring receiving member having a spring receiving recess formed corresponding to a shape of the second end of the temperature sensitive spring.

The temperature-sensitive spring receiving member may include a splittable member having a helical groove for accommodating the temperature sensitive spring therein, or alternatively include a resin element which the second end of the temperature sensitive spring is inserted in and molded with. In another preferable structure, the temperature-sensitive spring receiving member is formed integrally with a spacer, which is disposed between the movable valve member and the temperature sensitive spring for keeping the first end of the temperature sensitive spring apart by a predetermined distance from a certain position where the high-temperature water is mixed with the low-temperature water.

The invention is also directed to a combination faucet device for mixing high-temperature water with low-temperature water and making water mixture of a predetermined target temperature flown through the combination faucet device, which includes a casing member having a hot water port for supplying the high-temperature water therethrough, a cold water port for supplying the low-temperature water therethrough, and a sliding chamber connecting to both of the hot water port and the cold water port, a movable valve member slidably fitted into the sliding chamber formed in the casing member for adjusting a mixing ratio of the high-temperature water flown through the hot water port to the low-temperature water flown through the cold water port, a temperature sensitive spring having a first end and a second end and being mainly composed of a material having a spring constant varied according to a temperature change within a predetermined temperature range, the temperature sensitive spring receiving member is formed member in a first direction for decreasing the ratio of the high-temperature water to the low-temperature water when an actual temperature of the water mixture becomes greater than the predetermined target temperature, a bias spring for pressing the movable valve member in a second direction opposite to the first direction, and a temperature-sensitive spring receiving member including a flat plate having a central support element formed on a center thereof and a spring receiving element for supporting the second end of the temperature sensitive spring, the temperature-sensitive spring receiving member being supported on the casing member via the central support element to allow a pivotal movement of the temperature sensitive spring receiving member with respect to the casing member.

In one preferable structure, the central support element of the temperature-sensitive spring receiving member includes a projection and a support recess for supporting the projection.

According to the preferred embodiments, the central support element of the temperature-sensitive spring receiving member is mainly composed of a hard resin whereas the spring receiving element of the temperature-sensitive spring receiving member is mainly composed of a resilient material.

According to another aspect of the invention, a combination faucet device for mixing high-temperature water with low-temperature water and making water mixture of a predetermined target temperature flown through the combination faucet device includes a casing member having a hot water port for supplying the high-temperature water therethrough, a cold water port for supplying the low-temperature water therethrough, and a sliding chamber connecting to both of the hot water port and the cold water port, a movable valve member slidably fitted into the sliding chamber formed in the casing member for adjusting a mixing ratio of the high-temperature water flown through the hot water port to the low-temperature water flown through the cold water port, a temperature sensitive spring mainly composed of a material having a spring constant varied according to a temperature change within a predetermined temperature range, the temperature sensitive spring pressing the movable valve member in a first direction for decreasing the ratio of the high-temperature water to the low-temperature water when an actual temperature of the water mixture becomes greater than the predetermined target temperature, a bias spring having a first end and a second end, the bias spring pressing the movable valve member in a second direction opposite to the first direction, and a bias spring receiving member including a flat plate having a central support element formed on a center thereof and a spring receiving element for supporting the first end of the bias spring, the bias spring receiving member being supported on the casing member via the central support element to allow a pivotal movement of the bias spring receiving member with respect to the casing member.

In one preferable structure, the central support element of the bias spring receiving member includes a projection and a support recess for supporting the projection. According to the preferred embodiments, the central support element of the bias spring receiving member is mainly composed of a hard resin whereas the spring receiving element of the bias spring receiving member is mainly composed of a resilient material.

The invention is further directed to a combination faucet device for mixing high-temperature water with low-temperature water and making water mixture of a predetermined target temperature flown through the combination faucet device, which includes a casing member having a hot water port for supplying the high-temperature water therethrough, a cold water port for supplying the low-temperature water therethrough, and a sliding chamber connecting to both of the hot water port and the cold water port, a movable valve member slidably fitted into the sliding chamber formed in the casing member for adjusting a mixing ratio of the high-temperature water flown through the hot water port to the low-temperature water flown through the cold water port, a temperature sensitive spring having a first end and a second end and being mainly composed of a material having a spring constant varied according to a temperature change within a predetermined temperature range, the temperature sensitive spring pressing, the movable valve member in a first direction for decreasing the ratio of the high-temperature water to the low-temperature water when an actual temperature of the water mixture becomes greater than the predetermined target temperature, a bias spring for pressing the movable valve member in a second direction opposite to the first direction, and a temperature-sensitive spring receiving member having a spring receiving element for supporting the second end of the temperature sensitive spring, and a valve pressing element protruded from the spring receiving element for pressing a central portion of the movable valve member in a sliding direction.

According to another aspect of the invention, a combination faucet device for mixing high-temperature water with low-temperature water and making water mixture of a predetermined target temperature flown through the combination faucet device includes a casing member having a hot water port for supplying the high-temperature water therethrough, a cold water port for supplying the low-temperature water therethrough, and a sliding chamber connecting to both of the hot water port and the cold water port, a movable valve member slidably fitted into the sliding chamber formed in the casing member for adjusting a mixing ratio of the high-temperature water flown through the hot water port to the low-temperature water flown through the cold water port, a temperature sensitive spring mainly composed of a material having a spring constant varied according to a temperature change within a predetermined temperature range, the temperature sensitive spring pressing the movable valve member in a first direction for decreasing the ratio of the high-temperature water to the low-temperature water when an actual temperature of the water mixture becomes greater than the predetermined target temperature, a bias spring having a first end and a second end, the bias spring pressing the movable valve member in a second direction opposite to the first direction, and receiving element for supporting the first end of the bias spring, and a valve pressing element protruded from the spring receiving element for pressing a central portion of the movable valve member in a sliding direction.

The invention is still further directed to a combination faucet device for mixing high-temperature water with low-temperature water and making water mixture of a predetermined target temperature flown through the combination faucet device, which includes a casing member having a hot water port for supplying the high-temperature water therethrough, a cold water port for supplying the low-temperature water therethrough, and a sliding chamber connecting to both of the hot water port and the cold water port, a movable valve member slidably fitted into the sliding chamber formed in the casing member for adjusting a mixing ratio of the high-temperature water flown through the hot water port to the low-temperature water flown through the cold water port, a temperature sensitive spring mainly composed of a material having a spring constant varied according to a temperature change within a predetermined temperature range, the temperature sensitive spring pressing the movable valve member in a first direction for decreasing the ratio of the high-temperature water to the low-temperature water when an actual temperature of the water mixture becomes greater than the predetermined target temperature, a bias spring for pressing the movable valve member in a second direction opposite to the first direction, a movable valve member guide aperture formed through the movable valve member along a sliding direction, and a guiding element fixed to the casing member and slidably fitted in the movable valve member guide aperture for supporting the movable valve member.

The invention is also directed to a combination faucet device for mixing high-temperature water with low-temperature water and making water mixture of a predetermined target temperature flown through the combination faucet device, which includes a casing member having a hot water port for supplying the high-temperature water therethrough, a cold water port for supplying the low-temperature water therethrough, and a sliding cheer connecting to both of the hot water port and the cold water port, a movable valve member slidably fitted into the sliding chamber formed in the casing member for adjusting a mixing ratio of the high-temperature water flown through the hot water port to the low-temperature water flown through the cold water port, a temperature sensitive spring mainly composed of a material having a spring constant varied according to a temperature change within a predetermined temperature range, the temperature sensitive spring pressing the movable valve member in a first direction for decreasing the ratio of the high-temperature water to the low-temperature water when an actual temperature of the water mixture becomes greater than the predetermined target temperature, a bias spring for pressing the movable valve member in a second direction opposite to the first direction, and a guide projection protruded to an opening of the hot water port or the cold water port for coming into contact with a circumference of the movable valve member so as to guide the movable valve member in a sliding direction.

In one preferable structure, the guide projection is formed to guide the movable valve member inside a parting line, which is formed along the circumference of the movable valve member in a seating position.

The invention is further directed to a combination faucet device for mixing high-temperature water with low-temperature water and making water mixture of a predetermined target temperature flown through the combination faucet device, which includes a casing member having a hot water port for supplying the-high-temperature-water-therethrough, a cold water port for supplying the low-temperature water therethrough, and a sliding chamber connecting to both of the hot water port and the cold water port, a movable valve member slidably fitted into the sliding chamber formed in the casing member for adjusting a mixing ratio of the high-temperature water flown through the hot water port to the low-temperature water flown through the cold water port, a temperature sensitive spring having a first end and a second end and being mainly composed of a material having a spring constant varied according to a temperature change within a predetermined temperature range, the temperature sensitive spring pressing the movable valve member in a first direction for decreasing the ratio of the high-temperature water to the low-temperature water when an actual temperature of the water mixture becomes greater than the predetermined target temperature, a bias spring for pressing the movable valve member in a second direction opposite to the first direction, a temperature-sensitive spring receiving member including a spring receiving element for supporting the second end of the temperature sensitive spring, and a cylinder element inserted into the sliding chamber of the casing member, and fixture means for fixing the temperature-sensitive spring receiving member to the casing member.

According to one aspect of the invention, the fixture means includes a recess formed on the casing member, and an engagement click formed on the temperature-sensitive spring receiving member for engaging with the recess. According to another aspect of the invention, the fixture means includes a slit formed on the casing member, a groove formed on the temperature-sensitive spring receiving member at a certain position corresponding to the slit, and a stop ring for engaging with the slit and the groove to prevent the temperature-sensitive spring receiving member from being slipped off the sliding chamber.

According to one preferred embodiment, the temperature-sensitive spring receiving member is fixed integrally to a cold water valve seat member which is fitted in the sliding chamber of the casing member for constituting the cold water port and has a cold water valve seat where the movable valve member is seated on.

The invention is still further directed to a combination faucet device for mixing high-temperature water with low-temperature water and making water mixture of a predetermined target temperature flown through the combination faucet device, which includes a casing member having a hot water port for supplying the high-temperature water therethrough, a cold water port for supplying the low-temperature water therethrough, and a sliding chamber connecting to both of the hot water port and the cold water port, a movable valve member slidably fitted into the sliding chamber formed in the casing member for adjusting a mixing ratio of the high-temperature water flown through the hot water port to the low-temperature water flown through the cold water port, a temperature sensitive spring having a first end and a second end and being mainly composed of a material having a spring constant varied according to a temperature change within a predetermined temperature range, the temperature sensitive spring pressing the movable valve member in a first direction for decreasing the ratio of the high-temperature water to the low-temperature water when an actual temperature of the water mixture becomes greater than the predetermined target temperature, a bias spring for pressing the movable valve member in a second direction opposite to the first direction, a first screw element formed in an opening of the casing member, a spring receiving member having a second screw element for engaging with the first screw element of the casing member, the spring receiving member being fixed to one end of the opening of the casing member through engagement of the second screw element with the first screw element and receiving the second end of the temperature sensitive spring, and a sliding member disposed between the spring receiving member and the temperature sensitive spring, the sliding member further including a sliding face having a small coefficient of friction and being brought into contact with the spring receiving member and the temperature sensitive spring.

The invention is also directed to a combination faucet device including a cylindrical mixing chamber connecting to both of a hot water port for supplying the high-temperature water therethrough and a cold water port for supplying the low-temperature water therethrough, a movable valve member for controlling a flow of the high-temperature water supplied through the hot water port and/or a flow of the low-temperature water supplied through the cold water port so as to adjust a mixing ratio of the high-temperature water to the low-temperature water, a temperature sensitive spring exposed to water mixture of the high-temperature water and the low-temperature water mixed in the mixing chamber, the temperature sensitive spring having a spring constant varied with a temperature of the water mixture, driving means for actuating the movable valve member in an a first direction in proposition to a pressing force of the temperature sensitive spring.

a cylindrical flow-path member disposed inside the temperature sensitive spring for defining, together with an inner wall of the casing member, a spring flow path chamber which receives the temperature sensitive spring therein, and a spring chamber conduit for leading a flow of water mixture of the high-temperature water supplied through the hot water port and the low-temperature water supplied through the cold water port, into the spring flow path chamber.

According to the preferred embodiments, the combination faucet device further includes a bias spring for pressing the movable valve member in a second direction opposite to the first direction, and a pre-load adjusting mechanism for adjusting a pre-load applied onto the bias spring. According to another aspect of the invention, the combination faucet device further includes a casing member having a wall for defining the mixing chamber and a valve chamber for accommodating the movable valve member, the temperature sensitive spring, and the bias spring therein. The casing member is detachably attached to a member having the cold water port or the hot water port formed thereon. The cylindrical flow-path member and the spring chamber conduit are integrally formed on the wall of the casing member.

The invention is still further directed to a combination faucet device for moving a movable valve member through expansion and contraction of a temperature sensitive coil spring to mix high-temperature water with low-temperature water and make water mixture of a predetermined target temperature flown through the combination faucet device. The temperature sensitive spring includes an alloy mainly composed of nickel and titanium, and has a spring constant proportional to the temperature under conditions of Ms≦70° C., Mf≧10° C., and Ms−Mf≧15° C., where Ms and Mf respectively represent a transformation starting temperature and a transformation terminating temperature in cooling.

The temperature sensitive spring has an attachment strain expressed by Equation (1):

$$r = (d \, ST/\pi n D) 100 (\%) \tag{1}$$

wherein d, ST, n, and D respectively represent a wire diameter of the temperature sensitive spring, a stroke of the movable valve member, a number of coil windings, and a center diameter of the temperature sensitive spring.

The attachment strain r is set in a range of 0.6 through 1.4%, or preferably in a range of 0.6 through. 1.2%, and more preferably in a range of 0.6 through 0.8%. The movable valve member may be slidably supported between the temperature sensitive spring an a bias spring, in order to give the attachment strain r to the temperature sensitive spring.

The functions and effects of the invention are described in detail hereinafter.

In the combination faucet device according to the invention, a movable valve member is slidingly fitted into a sliding chamber of a casing member to change the mixing ratio of high-temperature water supplied from a hot water port to low-temperature water supplied from a cold water port. The movable valve member is pressed on one end thereof by a temperature sensitive spring and on the other end thereof by a bias spring. The temperature sensitive spring changes its spring constant with the temperature variation of water mixture so as to move the movable valve member to a position where the spring force of the temperature sensitive spring balances with the spring force of the bias spring, thus allowing water mixture to be controlled to a preset target temperature.

A spacer is typically disposed between the movable valve member and the temperature sensitive spring. The spacer keeps the temperature sensitive spring apart by a predetermined distance from a position where high-temperature water is mixed with low-temperature water. This structure allows the temperature sensitive spring to be exposed to sufficiently mixed warm water of high-temperature water and low-temperature water, thereby ensuring a stable sliding movement of the movable valve member.

According to the preferred embodiments, the spacer has, on one end thereof, a valve pressing element for pressing the movable valve member and, on the other end thereof, a spring receiving member for supporting the temperature sensitive spring. The valve pressing member may include a plurality of legs disposed at predetermined intervals in a circumferential direction along the inner face of the movable valve member. The plurality of legs press the movable valve member along the inner face thereof with an identical force. Some of the legs are arranged to face the cold water port formed on the casing member so as to separate a flow of low-temperature water flown out of the cold water port and accelerate mixing of the low-temperature water with high-temperature water.

Each of the legs may be formed as a fin for leading a flow of the low-temperature water flown out of the cold water port in the circumferential direction. The fins make high-temperature water out of the hot water port surrounded by and subsequently mixed with the low-temperature water, thus allowing the high-temperature water to be sufficiently mixed with the low-temperature water. The valve pressing element preferably includes six through eight fins arranged at identical intervals in the circumferential direction.

In another preferable structure, the valve pressing element includes six through eight fins arranged at varying intervals in the circumferential direction. In this case, the interval increases in proportion to the distance from the cold water port. Cold water flows through narrow intervals in a large flow-speed area close to the cold water port and through wide intervals in a small flow-speed area far from the cold water port. This arrangement allows a substantially equivalent amount of low-temperature water to be flown through each inter-fin passage, thus accelerating uniform mixing of the low-temperature water with high-temperature water.

According to another structure, a diverging member, for example, a plurality of legs or fins, may be formed or mounted on the casing member instead of the spacer. In this structure, the diverging member is also arranged to face the cold water port to separate a flow of low-temperature water through the cold water port.

The diverging member, such as the legs and fins, may be formed on the casing member or the bias spring to face the hot water port to separate a flow of high-temperature water through the hot water port, thus accelerating uniform mixing of the high-temperature water with low-temperature water.

The temperature sensitive spring varies its spring constant in response to the temperature of water mixture of hot water and cold water passing through the movable valve member. The driving means converts the variation of the spring constant to a driving force for moving the movable valve member, thus controlling the temperature of water mixture stably. The temperature sensitive spring is sensitive to the temperature of water mixture, and has a quick response to control the temperature of water mixture accurately. When the temperature sensitive spring is exposed to insufficiently mixed water, however, the quick response causes a cycling phenomenon which periodically varies the temperature and flow of water mixture. According to the preferred embodiments, a diverging member is disposed at least on the upstream of the temperature sensitive spring to separate a flow of high-temperature water, a flow of low-temperature water, or a flow of water mixture in a circumferential direction along an inner wall of a mixing chamber, thus preventing a flow of uneven temperature. The temperature sensitive spring may be disposed out of a primary flow path of water mixture, thereby effectively preventing an external turbulence due to a variation in the pressure of water mixture. The temperature sensitive spring may not function to give a driving force directly to the movable valve member but work only as a temperature sensor. The driving means receives contraction and expansion of the temperature sensitive spring and directly transmits a driving force to the movable valve member. A fine, inexpensive temperature sensitive spring having a small wire diameter may be applicable in such a case.

In an alternative structure, the temperature sensitive spring is fixed on one end thereof and presses the movable valve member in a first direction by the other end thereof, thereby working as the driving means as well as the temperature sensor. This simplifies the structure of the whole combination faucet device and realizes the down-sizing of the device. In such a structure, the driving force for moving the movable valve member should be exactly proportional to the temperature of water mixture. The diverging member accordingly works to sufficiently stir high-temperature water, low-temperature water, or insufficiently mixed water mixture.

The bias spring presses the movable valve member in a second direction opposite to the first direction. The movable valve member is accordingly displaced to a position where the spring force of the temperature sensitive spring balances with the spring force of the bias spring. The displacement of the movable valve member decreases the distance between the movable valve member and the temperature sensitive spring. In this structure, the diverging member effectively works to expose the temperature sensitive spring to sufficiently mixed water. The temperature sensitive spring may generate a one-directional spring force instead of the two-directional spring force.

The target temperature of water mixture is changed by varying a pre-load applied onto the bias spring by means of a pre-load adjusting mechanism. Increase in the pre-load improves the durability of the temperature sensitive spring and enhances the sealing effects of the movable valve member. Appropriate adjustment of the strain in the temperature sensitive spring gives excellent temperature control ability to the temperature sensitive spring. The diverging member effectively cancels uneven temperatures of water mixture and inhibits a localized or instantaneous temperature change in the temperature sensitive spring, thus preventing the temperature control ability of the temperature sensitive spring from deteriorating.

According to a preferable application, the combination faucet device includes a casing member having a wall for defining a mixing chamber and a valve chamber for accommodating the movable valve member, the temperature sensitive spring, and the bias spring therein. The casing member is detachably attached to a member having the cold water port or the hot water port formed thereon. This structure simplifies assembly, maintenance, and inspection of each unit, such as a diverging member or a temperature control element including a temperature sensitive spring. The diverging member may be integrally formed with the wall of the casing member, which saves the labor of assembly of the diverging member.

A spacer formed integrally with the diverging member is disposed between the movable valve member and the temperature sensitive spring to keep the temperature sensitive spring apart by a predetermined distance from a position where high-temperature water is mixed with low-temperature water. The temperature sensitive spring is accordingly exposed to sufficiently mixed water having a uniform temperature. The combined use of the diverging member and the spacer reduces the number of required parts.

The spacer may be provided with a guide member which is slidably brought into contact, on a plurality of points, with an inner wall of the casing member facing the mixing chamber. The guide member unequivocally determines the sliding direction of the spacer, and smoothly moves the movable valve member without inclining the movable valve member.

According to the preferred embodiments, a cylindrical flow-path member is disposed inside the temperature sensitive spring for defining, together with the inner wall of the casing member, a spring flow path chamber. A flow of water mixture of hot water and cold water is led via a spring chamber conduit into the spring flow path chamber, and is then in contact with the temperature sensitive spring. The temperature sensitive spring thereby contracts and expands in water mixture throttle by the spring path chamber and sufficiently mixed. The cylindrical flow-path member and the spring chamber conduit may be formed integrally with a spacer disposed between the movable valve member and one end of the temperature sensitive spring or with a temperature-sensitive spring receiving member for the other end of the temperature sensitive spring.

A throttle may be formed in the spring chamber conduit for enhancing the function of the spring flow path chamber or the spring chamber conduit. A flow baffle element or a helical projection may also be formed on the spring flow path chamber for stirring the water mixture. A widened guide element may be formed on one end of the spacer for smooth flow of water mixture into the spring flow path chamber.

Displaced loading from the temperature sensitive spring or the bias spring inclines the movable valve member to damage the sealing effects of the movable valve member and change the mixing ratio of hot water to cold water, thus causing deviation from a preset target temperature. According to one aspect of the invention, a specific structure is applied to prevent such inclination of the movable valve member.

The temperature-sensitive spring receiving member for supporting one end of the temperature sensitive spring includes a spring receiving recess corresponding to a shape of the one end of the temperature sensitive spring. This spring receiving recess can support upright the temperature sensitive spring with the one end non-processed or -ground to flat. The temperature sensitive spring does not apply a displaced pressing force to the movable valve member, which is accordingly not inclined but maintains the high sealing effects for precise temperature control. The spring receiving recess of the temperature-sensitive spring receiving member may be formed by a helical groove, a helical step, or a combination of splittable elements. The temperature-sensitive spring receiving member may include a resin element which the one end of the temperature sensitive spring is inserted in and molded with. Even when the one end of the temperature sensitive spring is ground to flat, there is a small gap between a first winding of the spring and the ground end. A recess is preferably formed on the spring receiving member to receive the ground end of the temperature sensitive spring and prevent displaced loading due to the small gap. The temperature-sensitive spring receiving member for receiving one end of the temperature sensitive spring may be formed integrally with or mounted on the casing member or the spacer.

According to one preferable structure, the temperature-sensitive spring receiving member for supporting one end of the temperature sensitive spring is formed as a flat plate having a central support element formed on a center thereof. The spring receiving member is supported by its central support element on the casing member to allow a pivotal movement relative to the casing member. When displaced loading is generated on different parts of the temperature sensitive spring, the central support element works to equalize the loading of the temperature sensitive spring, thus preventing the movable valve member from being inclined. In one preferable structure, the central support element of the temperature-sensitive spring receiving member includes a projection and a support recess for supporting the projection. The spring receiving element of the temperature-sensitive spring receiving member may be composed of a resilient material, which allows a portion having a greater load to be bent greater than the other portions to make the loading uniform.

A similar structure may be applied to a bias spring receiving member for supporting the bias spring to make loading of the bias spring uniform.

According to another preferable structure of the spring receiving member for supporting the temperature sensitive spring, a valve pressing element is protruded from a center of a spring receiving element for pressing a central portion of the movable valve member in a sliding direction. The movable valve member receives the pressing force on its central portion and is not exposed to any eccentric force. A similar structure may be applied to a bias spring receiving member for supporting the bias spring to apply a pressing force onto the central portion of the movable valve member.

A preferable structure for preventing inclination of the movable valve member includes guide means for guiding a sliding movement of the movable valve member. The guide means, for example, includes a movable valve member guide aperture formed through the movable valve member along a sliding direction, and a guiding element fixed to the casing member and slidably fitted in the movable valve member guide aperture for supporting the movable valve member.

A guide projection may be formed in an opening of the hot water port or the cold water port for coming into contact with a circumference of the movable valve member so as to prevent inclination of the movable valve member during the sliding movement. In one preferable structure, the guide projection is formed to guide the movable valve member inside a parting line, which is formed on a seat face where the movable valve member is seated on. The guide projection effectively prevents the movable valve member from striking on the parting line.

A torsional force applied onto the temperature sensitive spring during attachment of the temperature sensitive spring to the combination faucet device works as a residual stress to incline the movable valve member. A specific structure is applied to prevent such inclination of the movable valve member. The temperature-sensitive spring receiving member includes a spring receiving element for supporting one end of the temperature sensitive spring, and a cylinder element inserted and positioned in the sliding chamber of the casing member and fixed to the casing member via fixture means. The temperature-sensitive spring receiving member is simply inserted into the sliding chamber, and no torsional force is applied onto the temperature sensitive spring. According to a preferable embodiment, the fixture means includes a recess formed on the casing member, and an engagement click formed on the temperature-sensitive spring receiving member for engaging with the recess. According to another preferred embodiment, the fixture means includes a slit formed on the casing member, a groove formed on the temperature-sensitive spring receiving member, and a stop ring for engaging with the slit and the groove to prevent the temperature-sensitive spring receiving member from being slipped off the sliding chamber. Since the cylinder element of the temperature-sensitive spring receiving member is inserted into the sliding chamber where the movable valve member sliding moves, the spring receiving member may be formed integrally with a cold water valve seat where the movable valve member is seated on.

The temperature-sensitive spring receiving member may be screwed to an opening of the casing member without applying a torsional force to the temperature sensitive spring. A sliding member having a coefficient of friction smaller than those of the temperature sensitive spring and the temperature-sensitive spring receiving member is disposed between the spring receiving member and the temperature sensitive spring. The sliding member slides with respect to the temperature sensitive spring during assembly of the spring receiving member to the casing member, thus preventing a torsional force from being applied onto the temperature sensitive spring.

The temperature sensitive spring varies its spring constant in response to the temperature of water mixture of hot water and cold water passing through the movable valve member. The driving means converts the variation of the spring constant to a driving force for moving the movable valve member, thus controlling the temperature of water mixture stably. The temperature sensitive spring is sensitive to the temperature of water mixture, and has a quick response to control the temperature of water mixture accurately. When the temperature sensitive spring is exposed to water mixture having a temperature not exactly proportional to the ratio of the hot water to cold water passing through the movable valve member, however, the quick response causes a cycling phenomenon which periodically varies the temperature and flow of water mixture. The cylindrical flow-path member and the spring chamber conduit lead all flows of high-temperature water and low-temperature water passing through the movable valve member to the temperature sensitive spring. Namely, the flow-path member and the spring chamber conduit prevent either high-temperature water or low-temperature water from being preferentially in contact with the temperature sensitive spring, thus realizing accurate temperature control.

The bias spring presses the movable valve member in a second direction opposite to the first direction. The movable valve member is accordingly displaced to a position where the spring force of the temperature sensitive spring balances with the spring force of the bias spring. The displacement of the movable valve member decreases the distance between the movable valve member and the temperature sensitive spring. In this structure, the spring chamber conduit effectively works to expose the temperature sensitive spring to sufficiently mixed water. The temperature sensitive spring may generate a one-directional spring force instead of the two-directional spring force.

According to a preferable application, the combination faucet device includes a casing member having a wall for defining a mixing cheer and a valve chamber for accommodating the movable valve member, the temperature sensitive spring, and the bias spring therein. The casing member is detachably attached to a member having the cold water port for supplying low-temperature water or the hot water port for supplying high-temperature water. This structure simplifies assembly, maintenance, and inspection of each unit, such as a flow-path member, a spring chamber conduit, or a temperature control element including a temperature sensitive spring. The flow-path member and the spring chamber conduit may be integrally formed with the wall of the casing member, which reduces the number of required parts and saves the labor of assembly of the flow-path member and the spring chamber conduit.

The temperature sensitive spring is composed of a material which varies the spring constant according to the temperature so as to adjust the temperature of water mixture of hot water and cold water to a preset target value. A preferable example of such material is a shape-memory alloy mainly composed of nickel and titanium and having a spring constant in proportion to the temperature in a specific region of at least 15 degrees within an adjustable temperature range of 10° C. through 70° C.

The temperature sensitive spring has an attachment strain r of 0.6 through 1.4%. The attachment strain r of not less than 0.6% increases the loading to stabilize a sliding movement of the movable valve member against a fluctuation of the water pressure whereas the strain r of not greater than 1.4% decreases the hysteresis and improves the durability. The upper limit of the attachment strain r is decreased to 1.2% or more preferably to 0.8% for further improvement of the durability. The attachment strain of this range is given by pressing the temperature sensitive spring by means of the bias spring via the movable valve member.

These and other objects, features, aspects, and advantages of the present invention will become more apparent from the following detailed description of the preferred embodiment with the accompanying drawings.

DESCRIPTION OF THE PREFERRED EMBODIMENT

Figure 1:
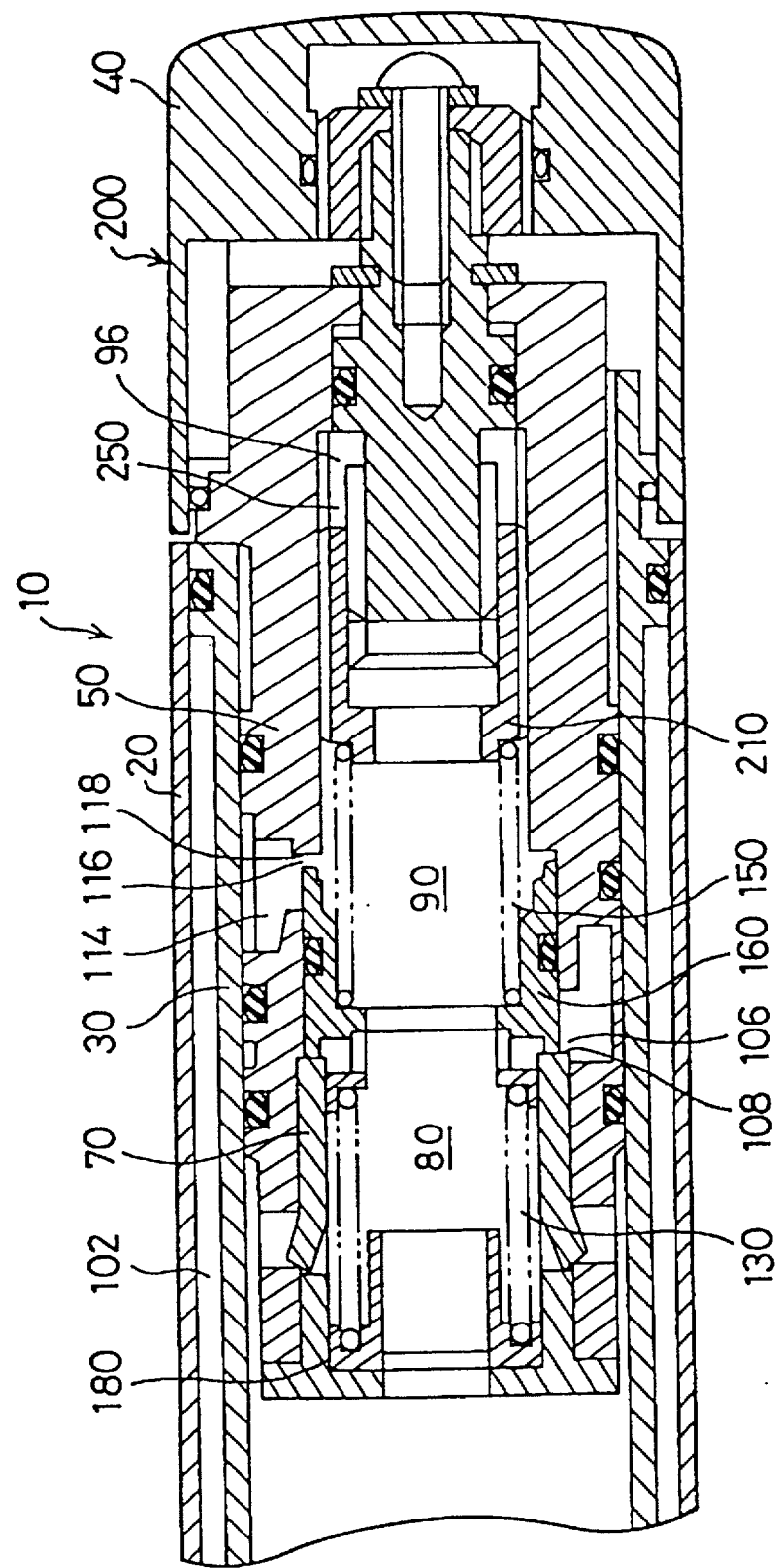
FIG. 1 is a cross sectional view showing a combination faucet device embodying the present invention.

A combination faucet device 10 embodying the invention includes an outer casing 20, an inner casing 30 accommodated in the outer casing 20, a cap 40 attached to one end of the outer casing 20, and a main casing 50 accommodated in the inner casing 30 as shown in the cross-sectional view of FIG. 1.

The main casing 50 includes a plurality of chambers for receiving valve mechanisms (described later), that is, a mixing chamber 80, a water flow chamber 90, and a sliding chamber 96.

A cold water valve seat member 70 sealed with an O ring is fitted in the mixing chamber 80. The cold water valve seat member 70 has a cold water valve seat 108 with a cold water port 106. The cold water port 106 is connected with a cold water conduit 102 formed between the outer casing 20 and the inner casing 30. The main casing 50 is further provided with a hot water conduit 114 connecting to a water heater (not shown) and with a hot water valve seat 118 with a hot water port 116 connecting to the hot water conduit 114.

A movable valve member 160, which is engaged with and disengaged from the cold water valve seat 108 and the hot water valve seat 118, is slidably fitted in the water flow chamber 90. The movable valve member 160 receives a spring force of a temperature sensitive spring 130 disposed in the mixing chamber 80 as well as a spring force of a bias spring 150, and is positioned according to a balance of the spring forces.

Figure 3:
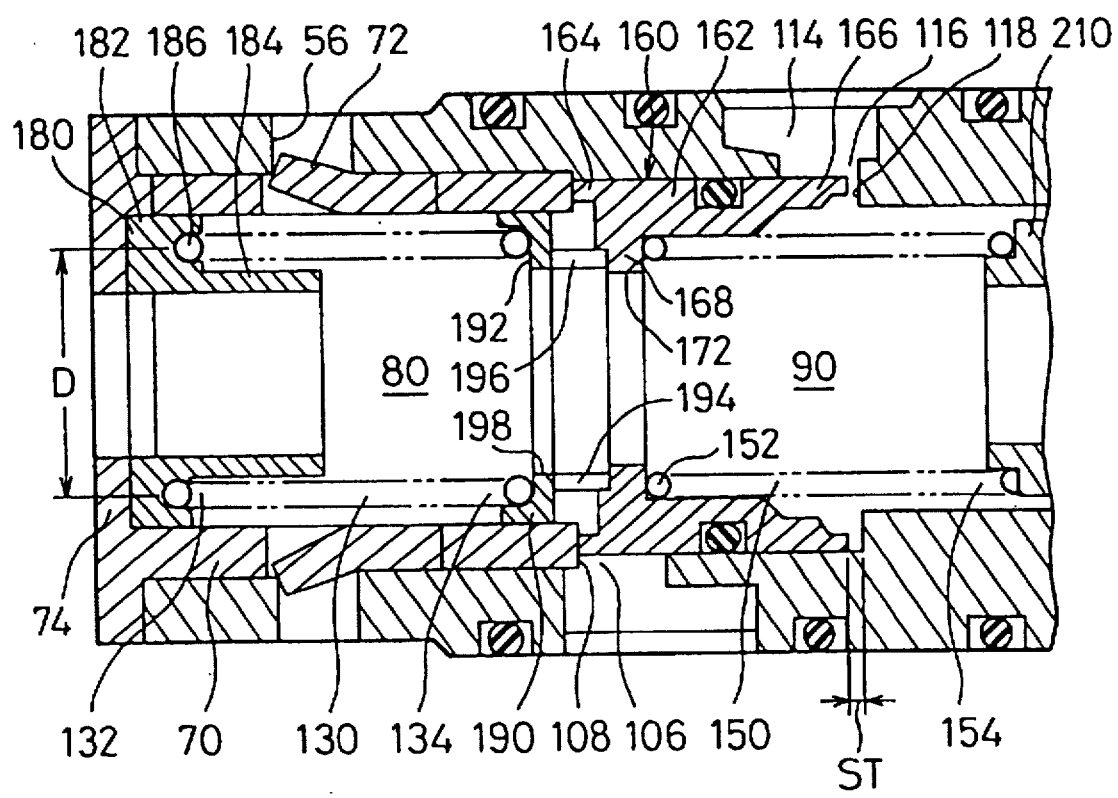
FIG. 3 is a cross sectional view showing essential elements of the combination faucet device of FIG. 1.

Referring to the cross-sectional view of FIG. 3 showing an essential part of the combination faucet device 10, the temperature sensitive spring 130 is spanned between a temperature-sensitive spring receiving member 180 supported by the cold water valve seat member 70 and a spacer 190. The temperature sensitive spring 130 is composed of a metal having a spring constant varied with the temperature whereas the bias spring 150 is composed of a conventional material having a spring constant unchanged irrespective of the temperature.

Referring to FIGS. 1 and 3, a pre-load adjusting mechanism 200 adjusts a pre-load of the bias spring 150 in order to change a target temperature of water mixture running through the combination faucet device 10. When the cap 40 is turned, a bias spring receiving member 210 moves forward (rightward in FIG. 1) and backward (leftward in FIG. 1) via a sliding mechanism 250 to increase and decrease the pre-load of the bias spring 150. In response to the increase or decrease of the pre-load, the movable valve member 160 is shifted to a location where the spring force of the bias spring 150 balances with the spring force of the temperature sensitive spring 130, so as to change the target temperature of water mixture.

The temperature of water mixture running through the combination faucet device 10 is controlled according to the operation described below.

When water mixture of the target temperature runs through the combination faucet device 10 while a variety of conditions, such as the temperature of hot water fed from the water heater and the temperature and the flow of tap water, are in stationary state, the movable valve member 160 is kept at a position determined according to a balance between a force of the temperature sensitive spring 130 caused by water mixture in the mixing chamber 80 and the spring force of the bias spring 150. When the temperature of hot water fed from the water heater, the temperature of tap water, the flow of tap water, or another essential condition is fluctuated by some external factor, the temperature of water mixture in the mixing chamber 80 is consequently deviated from the target temperature. The temperature sensitive spring varies its spring constant with the temperature, which results in the varied spring force of the temperature sensitive spring 130.

When the actual temperature of water mixture is deviated to be higher than the target temperature, the spring force of the temperature sensitive spring 130 is increased to shift the movable valve member 160 forward (rightward in FIG. 1) as increasing the pre-load of the bias spring 150. The rightward shift of the movable valve member 160 decreases the ratio of hot water to lower the temperature of water mixture.

When the actual temperature of water mixture is deviated to be lower than the target temperature, on the contrary, the spring force of the temperature sensitive spring 130 is decreased to shift the movable valve member 160 backward (leftward in FIG. 1) as decreasing the pre-load of the bias spring 150. The leftward shift of the movable valve member 160 increases the ratio of hot water to raise the temperature of water mixture. In this manner, the actual temperature of water mixture is adjusted to come close to the target temperature by means of the temperature sensitive spring 130.

In the combination faucet device 10 thus constructed, the target temperature is changed by turning the cap 40, which constitutes a part of the pre-load adjusting mechanism 200, in a predetermined direction. When the cap 40 is turned in the predetermined direction, the bias spring receiving member 210 moves backward (leftward in FIG. 1) via the sliding mechanism 250 to compressively displace the bias spring 150, thus increasing the pre-load of the bias spring 150 against the movable valve member 160. When the cap 40 is turned in a direction opposite to the predetermined direction, on the contrary, the bias spring receiving member 210 moves forward (rightward in FIG. 1) via the sliding mechanism 250 to extensibly displace the bias spring 150, thus decreasing the pre-load of the bias spring 150 against the movable valve member 160.

Increase in the pre-load of the bias spring 150 adjusts the movable valve member 160 at such a position as to widen a flow path of the hot water valve seat 118 and narrow a flow path of the cold water valve seat 108. Resultant increase in the hot water flow and decrease in the cold water flow changes the ratio of hot water to cold water and raises the temperature of water mixture running through the combination faucet device 10. Decrease in the pre-load of the bias spring 150, on the other hand, adjusts the movable valve member 160 at such a position as to narrow the flow path of the hot water valve seat 118 and widen the flow path of the cold water valve seat 108. Resultant decrease in the hot water flow and increase in the cold water flow changes the ratio of hot water to cold water and lowers the temperature of water mixture running through the combination faucet device 10.

In the combination faucet device 10 of the first embodiment, the pre-load of the bias spring 150 is transmitted directly to the movable valve member 160 to drive the movable valve member 160 whereas the displacement of the temperature sensitive spring 130 based on the temperature change is also transmitted directly to the movable valve member 160 to move the movable valve member 160. Even the temperature sensitive spring 130 consisting of a relatively small amount of a temperature-sensitive material and having a small spring constant can realize smooth movement of the movable valve member 160 since the friction loss for moving the movable valve member 160 is relatively small.

Structure and operation of each element of the combination faucet device 10 is described more in detail.

The metal material of the temperature sensitive spring 130 may be a shape-memory alloy (SMA) composed of nickel and titanium (Ni—Ti). The SMA has an elastic modulus varied with the temperature. This results in variation in the spring constant of the temperature sensitive spring 130 composed of SMA according to the temperature. The temperature sensitive spring 130 used in the combination faucet device 10 has such characteristics that the spring load and strain are proportional to the difference between the actual temperature of water mixture and a target temperature previously selected among an applicable temperature range, for example, from 10° C. to 70° C. The flow of hot water and that of cold water are controlled according to these characteristics of the temperature sensitive spring 130.

The Ni—Ti alloy shows thermal elastic martensite transformation between a base phase and a martensite phase, which are defined by a transformation starting temperature (hereinafter referred to as Ms) and a transformation terminating temperature (hereinafter referred to as Mf) under cooling conditions and a reverse transformation starting temperature (hereinafter referred to as As) and a reverse transformation terminating temperature (hereinafter referred to as Af) under heating conditions.

The Ni—Ti alloy has shape memory effects; that is, when the alloy is exposed to a deformation strain at a desirable temperature of not higher than Ms and subsequently heated at specific temperatures of not lower than Af, a reverse transformation occurs to re-transform the alloy to its original shape. The Ni—Ti alloy is in a soft martensite phase in a low temperature range of not higher than Mf, and changes to a hard base phase having the sufficiently high mechanical strength through the reverse transformation in a high temperature range of not lower than Af.

In the combination faucet device 10, the temperature sensitive spring 130 composed of the Ni—Ti alloy having such characteristics works around a pre-set temperature within the applicable temperature range of 10° C. through 70° C. The Ni—Ti alloy is thus required not to transform abruptly in a narrow Ms–Mf range but to have linear load-temperature characteristics within a specific temperature range of at least 15 degrees.

The Ni—Ti alloy and the temperature sensitive spring 130 composed of the Ni—Ti alloy are manufactured according to the following steps.

The Ni concentration in the Ni—Ti alloy is adjusted to be 55.0 through 56.0 percent by weight. The Ni concentration less than 55.0 percent by weight makes Ms higher than 70° C. while that greater than 56.0 percent by weight makes Mf lower than 10° C. Either the lower or higher Ni concentration is unsuitable for the temperature sensitive spring 130 used in the combination faucet device 10 where the temperature of water mixture running therefrom is controlled within the applicable temperature range, that is, between 10° C. and 70° C.

The Ni—Ti alloy primarily composed of nickel and titanium preferably contains one or a plurality of other metals selected from the group consisting of Co, Fe, V, Cr, Mn, and Al and replaced for part of Ni and/or Ti. These metals function to shift Ms, Mf, Af, or As to higher temperatures or lower temperatures. When the amount of such replacement metals is too small, Ms exceeds 70° C. at the Ni concentration around 55.0 percent by weight. When the amount of such metals is too large, Mf becomes lower than 10° C. at the Ni concentration around 56.0 percent by weight. The preferable amount of replacement metals ranges from 0.05 to 2.0 percent by weight.

The Ni—Ti alloy having nickel and titanium as primary components and containing some other metals, for example, Co, replacing part of Ni and Ti is prepared and forged to ingot. The ingot is drawn to a wire rod having a desired diameter by cold wire drawing, and the wire rod is then formed to a coil spring through cold working. The area reduction rate in cold working is set to be not less than thirty percent. The area reduction rate smaller than thirty percent deteriorates the performance of the temperature sensitive spring 130 as a final product and makes the Ms–Mf difference less than 15 degrees.

The coil spring is subsequently processed to have the shape memory effects. According to a concrete step, the coil spring is heated in a predetermined processing temperature range between 400° C. and 480° C. to memorize its original shape. The processing temperature range is determined relative to the pre-set temperature at which the temperature sensitive spring 130 works. When the temperature sensitive spring 130 is composed of the Ni—Ti alloy having the composition described above, the processing temperature lower than 400° C. makes Ms higher than 70° C. and the processing temperature higher than 480° C. makes Mf lower than 10° C.

For cold working to have the area reduction rate of not less than twenty percent, the coil spring is preferably treated in a temperature range between 450° C. and 480° C. to have the shape memory effect, and then further processed by aging at temperatures around 400° C.

In a preferred embodiment, the temperature sensitive spring 130 was manufactured according to the steps below.

A first alloy element A having a composition of 55.2 percent by weight Ni and 44.8 percent by weight Ti and a second alloy element B having a composition of 55.8 percent by weight Ni and 44.2 percent by weight Ti were fused through melting with a vacuum high-frequency induction furnace and re-melting with a vacuum arc furnace.

The first alloy element A and the second alloy element B were drawn to wire rods having a diameter of 5.0 mm through hot forging and hot rolling. The wire rods were then drawn to have a diameter of 3.3 mm at room temperatures, annealed at the temperature of 750° C. and further drawn to have a diameter of 2.5 mm at room temperatures. The area reduction rate in cold wire drawing was 42.6 percent.

These wire rods were then formed to coil springs having a coil diameter of 12.5 mm, an effective winding number of 4, and a free length of 22.0 mm. After a certain shape memory process at a variety of temperatures, Ms and Mf of the coil springs were measured. The results of measurement are shown in FIG. 2.

Figure 2:
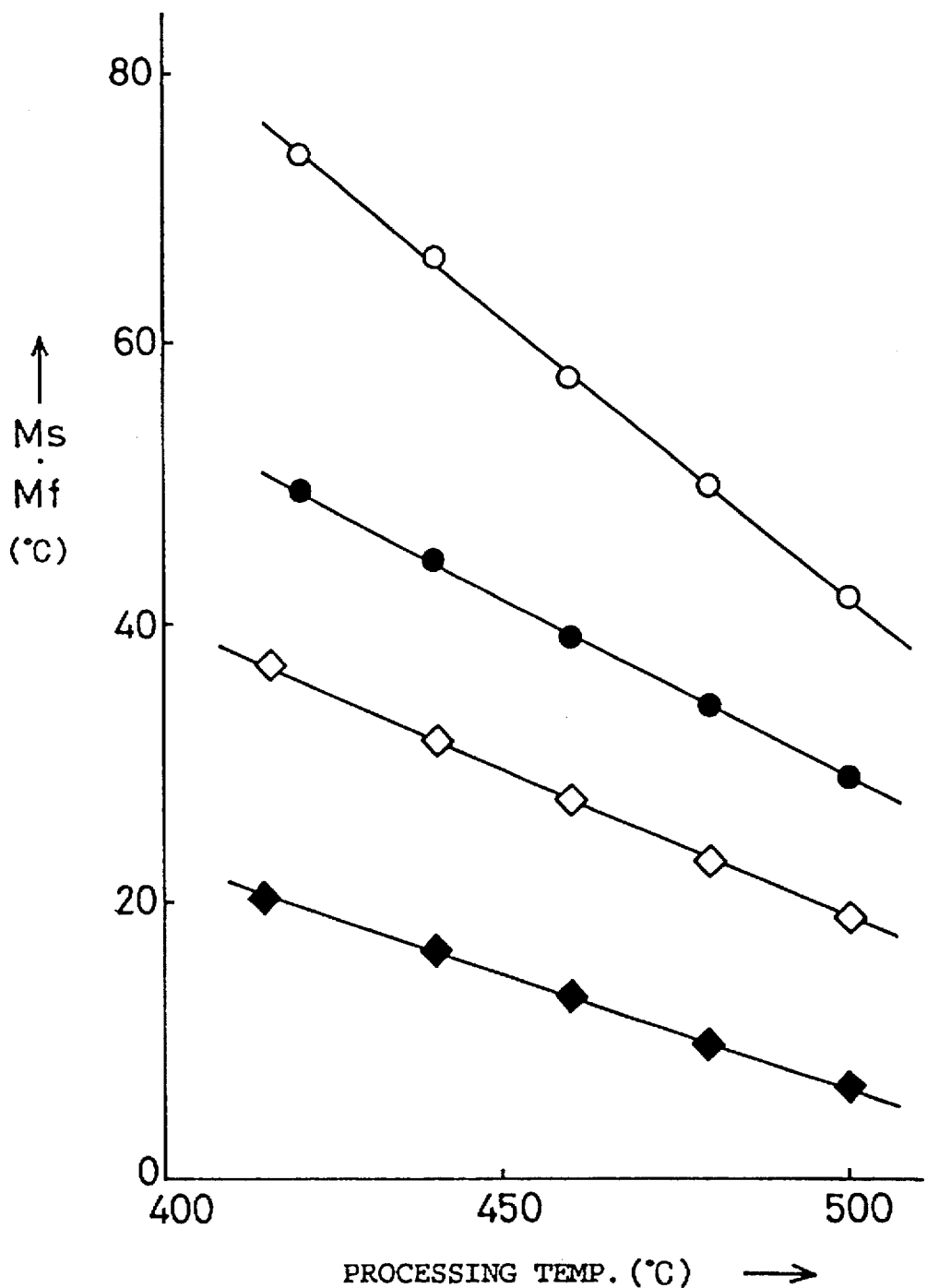
FIG. 2 is a graph showing the relationship between the processing temperature and the transforming temperature of a temperature sensitive spring used in the combination faucet device.

In the graph of FIG. 2, open circles and closed circles respectively represent Ms and Mf of the temperature sensitive spring 130 composed of the first alloy element A whereas open diamonds and closed diamonds denote Ms and Mf of the temperature sensitive spring 130 composed of the second alloy element B.

As clearly seen in FIG. 2, Ms, Mf, and the Ms–Mf difference of the alloy element constituting the temperature sensitive spring 130 are varied according to the composition of the alloy element and the temperature in the shape memory process.

Both Ms and Mf decrease with the increase in the Ni concentration and the increase in the processing temperature. It is thereby impossible to control the whole applicable temperature range of 10° C. through 70° C. with only one alloy element of the temperature sensitive spring 130. The composition of the temperature sensitive spring 130 and the processing temperature are determined according to the preset target temperature of water mixture.

When the preset target temperature of water running through the combination faucet device 10 is equal to 45° C., for example, data of FIG. 2 shows that the temperature sensitive spring 130 is preferably composed of the first alloy element A and processed to have the shape memory effect at the temperature of 460° C. When the preset target temperature is in a range between 20° C. and 40° C., the temperature sensitive spring 130 should be composed of the second alloy element B.

The structure of the movable valve member 160 is described in detail.

Referring to FIG. 3, the movable valve member 160 includes a cylindrical element 162, a cold water seat element 164 and a hot water seat element 166 formed on either end of the cylindrical element 162, and a ring stopper 168 formed on an inner face of the cylindrical element 162 and having a flow path element 172. The ring stopper 168 supports the bias spring 150 on one end thereof and the spacer 190 for receiving the temperature sensitive spring 130 on the other end thereof.

The movable valve member 160 is moved on a balance between the temperature sensitive spring 130 and the bias spring 150. When the cold water seat element 164 is seated on the cold water valve seat 108 as shown in FIG. 3, only hot water fed from the water heater runs through the combination faucet device 10. When the hot water seat element 166 is seated on the hot water valve seat 118, on the contrary, only cold tap water runs through the combination faucet device 10. When neither the cold water seat element 164 nor the hot water seat element 166 is seated on the cold water valve seat 108 or the hot water valve seat 118, both cold water and hot water are supplied according to the flow path openings of the cold water port 106 and the hot water port 116 and mixed in the mixing chamber 80.

Figure 4:
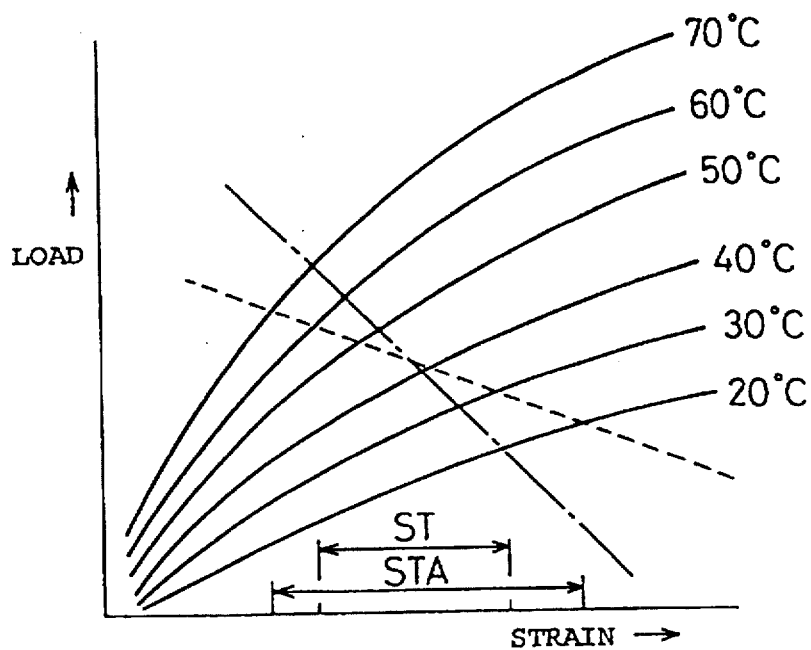
FIG. 4 is a graph showing the load-strain characteristics of the temperature sensitive spring.

The temperature sensitive spring 130 for actuating the movable valve member 160 is expanded and contracted under a strain due to the pre-load given by the bias spring 150, so as to slide the movable valve member 160 at a predetermined stroke ST. FIG. 4 is a graph showing the load-strain characteristics of the temperature sensitive spring 130. The solid lines, the one-dot chain line, and the broken line respectively show the strain characteristics of the temperature sensitive spring 130 at a variety of temperatures, the load characteristics of the bias spring 150 applied to the embodiment, and the load characteristics of a conventional bias spring. As clearly shown in FIG. 4, in a conventional structure, the temperature sensitive spring 130 is activated in a small strain range by means of a bias spring having a small spring constant to realize a large stroke STA. In the structure of the embodiment, on the other hand, the bias spring 150 having a large spring constant is used to expand and contract the temperature sensitive spring 130 at a short stroke ST under ordinary strain conditions. A strain r of the temperature sensitive spring 130 is expressed as an equation (1) shown below. The preferable range of such strain is 0.6% through 1.4% to stabilize movement of the movable valve member 160 and prevent deterioration caused by hysteresis of the temperature sensitive spring 130.

$$r = (d\ ST/nD)100(\%) \quad (1)$$

wherein d, ST, n, and D respectively represent a wire diameter of the temperature sensitive spring 130, a stroke or an amount of deflection, a number of coil windings, and a center diameter of the temperature sensitive spring 130.

When the strain r of the temperature sensitive spring 130 is smaller than 0.6% to generate only a small load, even slight fluctuation of the water pressure moves the movable valve member 160, thus deteriorating the temperature control ability. The strain r of the temperature sensitive spring 130 is thus to be not smaller than 0.6%, or more preferably not smaller than 0.7%.

Figure 5:
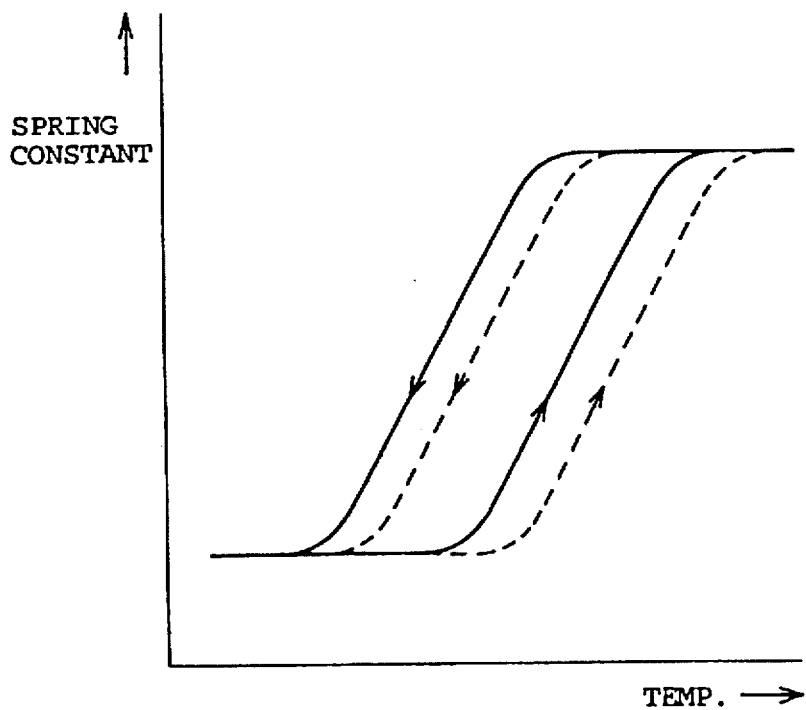
FIG. 5 is a graph showing the relationship between the temperature and the spring constant of the temperature sensitive spring.

The strain r of the temperature sensitive spring 130 greater than 1.4% affects the hysteresis. FIG. 5 is a graph showing the relationship between the temperature and the load of the temperature sensitive spring 130. Referring to FIG. 5, the greater strain r increases the area of hysteresis to lower the temperature control ability of the temperature sensitive spring 130. In other words, when the strain r is significantly large, the hysteresis characteristics change from an initial state shown by the solid line to another state shown by the dotted line with the time elapsed.

Durability of the temperature sensitive spring 130 is measured according to steps described below.

The temperature sensitive spring 130 significantly deteriorates when being cooled under a maximum strain rmax, or more concretely when the temperature sensitive spring 130 used in the combination faucet device 10 is abruptly cooled from a high pre-set temperature causing the maximum strain rmax. In winter, turning off the combination faucet device 10 abruptly cools water mixture from a relatively high pre-set temperature and thereby cools the temperature sensitive spring 130 exposed to the water mixture.

The durability test was performed on the above assumption. Under a condition the temperature sensitive spring 130 was compressed to have the maximum strain rmax, cold water of 10° C. and hot water of 80° C. were flown alternately by thirty seconds, and the reduced load of the temperature sensitive spring 130 was measured. Temperature sensitive springs 130 used for measurement were those having the wire diameter of 2.2 mm and 2.5 mm and the coil winding number of 3, 4.5, 6, and 8. The results of measurement were shown in FIG. 6.

Figure 6:
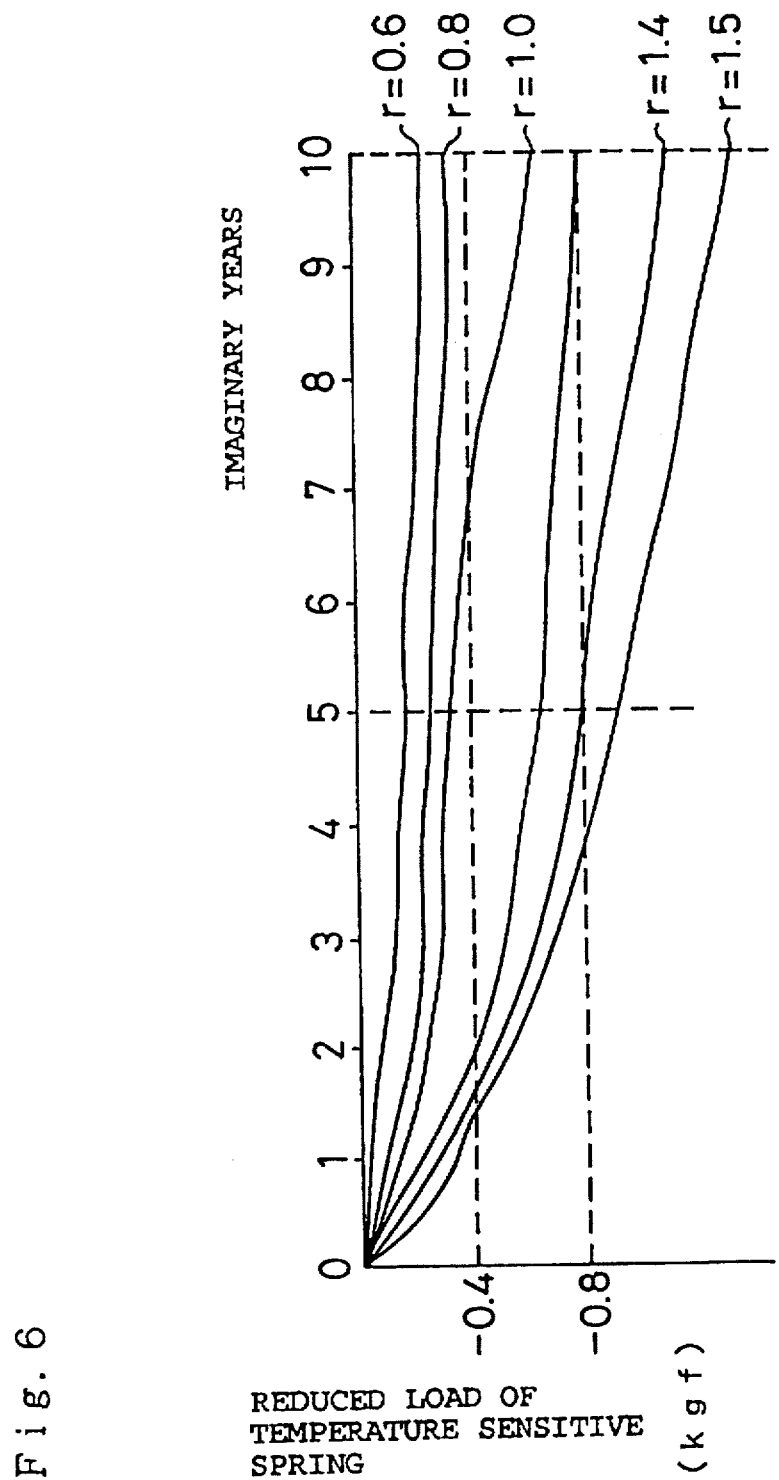
FIG. 6 is a graph showing the reduced load of the temperature sensitive spring plotted against imaginary years based on an experiment on durability of the temperature sensitive spring.

FIG. 6 is a graph showing the reduced load of the temperature sensitive spring 130 plotted against the number of heating-cooling cycles. Each imaginary year plotted as abscissa includes ten thousand heating-cooling cycles. The reduced load of the temperature sensitive spring 130 plotted as ordinate represents a deviation from the preset target temperature in the combination faucet device 10. People in general do not feel the deviation of 1° C. from the preset target temperature and slightly feel the deviation greater than 2° C. It is thus necessary to control the temperature of water mixture with the deviation of not greater than 2° C.

The strain r is not greater than 1.4% for the durability of five years and the temperature deviation of not greater than 2° C., is not greater than 1.2% for the durability of ten years and the temperature deviation of not greater than 2° C., and is not greater than 0.8% for the durability of ten years and the temperature deviation of not greater than 1° C.

Referring to the equation (1), the strain r of the temperature sensitive spring 130 can be set in a preferable range of 0.6% through 1.2% by appropriately determining the stroke ST, the wire diameter d of the temperature sensitive spring 130, the coil wiring number n, and the center diameter D of the temperature sensitive spring 130.

The stroke ST is determined by taking account of the diameter of the movable valve member 160 to assure the sufficient flow of water mixture. The preferable stroke ST ranges from 0.2 mm to 1.5 mm.

The equation (1) clearly shows that the greater coil winding number n or the greater center diameter D of the temperature sensitive spring 130 lowers the strain r while increasing the stroke ST. Under such conditions, the temperature sensitive spring 130 has a relatively small spring constant to cause unstable temperature control. The greater wire diameter d of the temperature sensitive spring 130, on the other hand, increases the strain r while requiring a greater amount of shape-memory alloy to increase the manufacturing cost. The specification of the temperature sensitive spring 130 is determined by taking account of These factors.

It is preferable that the center dieter D of the temperature sensitive spring 130 is substantially equal to the diameter of the movable valve member 160. The approximately identical diameter prevents an eccentric force from being applied to the movable valve member 160 during transmission of the load of the temperature sensitive spring 130 to the movable valve member 160, thus preventing leak of cold water or hot water due to inclination of the movable valve member 160 and improving the temperature control to the preset target temperature.

The spring constant of the bias spring 150 is preferably set in a range between 0.5 kgf/mm and 1.5 kgf/mm to apply an appropriate pre-load to the temperature sensitive spring 130 and set the strain r of the temperature sensitive spring 130 in a preferable range of 0.6% through 1.2%.

Figure 7:
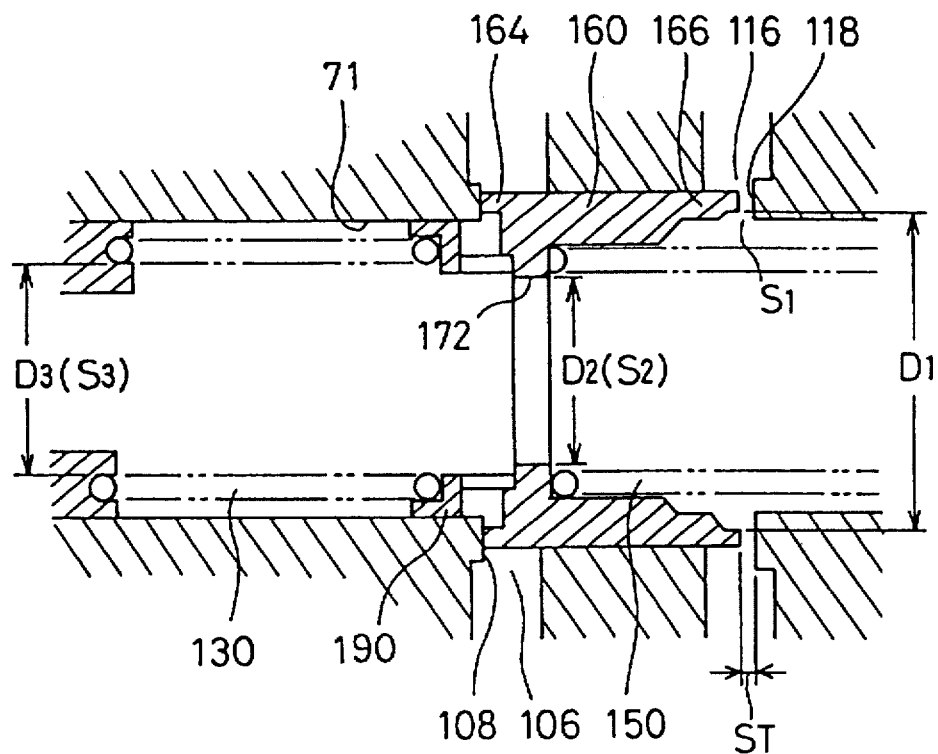
FIG. 7 shows characteristics of a movable valve member used in the combination faucet device.

Referring to FIG. 7, a port opening area S1 of the cold water port 106 and the hot water port 116 is related to a first flow path area S2 of the flow path element 172 of the movable valve member 160 and a second flow path area S3 in the temperature sensitive spring 130 as shown below:

$$S1 \leq S2 \leq S3 \quad (2)$$

For clarity of explanation, it is assumed that the cold water port 106 and the hot water port 116 are formed in ring shape. Under such assumption, the port opening area S1 is expressed as:

$$S1 = V1 \pi ST \quad (3)$$

wherein V1 denotes an inner diameter of the cold water valve seat 108 and the hot water valve seat 118, and ST the stroke.

The first flow path area S2 of the flow path element 172 is expressed as:

$$S2 = (D2)\pi 2/4 \quad (4)$$

wherein D2 represents a flow path diameter of the flow path element 172.

The second flow path area S3 of the temperature sensitive spring 130 is expressed as:

$$S3 = (D3)2\pi/4 \quad (5)$$

wherein D3 represents an inner diameter of the temperature sensitive spring 130.

In response to the movement of the movable valve member 160, cold water running through the cold water port 106 and hot water running through the hot water port 116 are mixed with each other in the mixing chamber 80, and flown through the flow path element 172 of the movable valve member 160 and then through the temperature sensitive spring 130 disposed in the mixing chamber 80. When the port opening area S1 is greater than the first flow path area S2 of the flow path element 172 of the movable valve member 160 and the second flow path area S3 of the temperature sensitive spring 130, a pressure loss of water mixture is transmitted to the temperature sensitive spring 130. Such a pressure loss causes displacement of the temperature sensitive spring 130. It is thereby preferable that both the first flow path area S2 of the flow path element 172 and the second flow path area S3 of the temperature sensitive spring 130 are greater than the port opening area S1 as shown in the expression (2).

Figure 8:
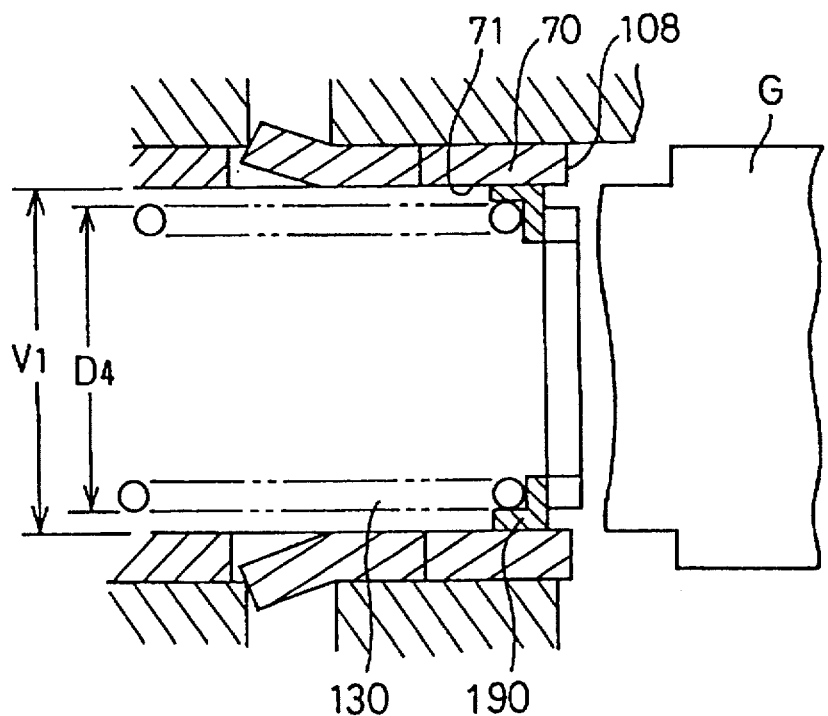
FIG. 8 shows a structure of a cold water valve seat member used in the combination faucet device.

An outer diameter D4 of the temperature sensitive spring 130 shown in FIG. 8 is defined with respect to the inner diameter V1 of the movable valve member 160 as an expression below:

$$V1 > D4 \qquad (6)$$

Figure 9:
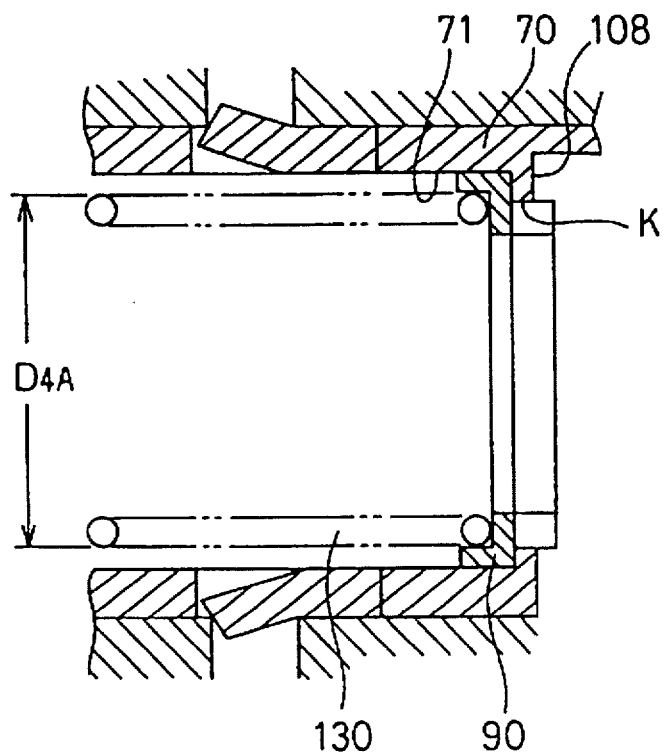
FIG. 9 shows another structure of the cold water valve seat member used in the combination faucet device.

The cold water valve seat 108 and the hot water valve seat 118 (see FIG. 7) are required to have high plane precision to realize a sufficiently high sealing performance in case that the movable valve member 160 is seated on the cold water valve seat 108 or the hot water valve seat 118 to flow only hot water or cold water out. Such a high plane precision is also required for an inner wall face 71 of the cold water valve seat member 70 for sliding the spacer in cooperation with the temperature sensitive spring 130. A gauge G shown in FIG. 8 is typically used for inspection of the plane precision. When the temperature sensitive spring 130 has a relatively large outer diameter D4A as shown in FIG. 9, an opening element K prevents insertion of the gauge G for inspection. The outer diameter D4 of the temperature sensitive spring 130 is thus preferably defined to be smaller than the inner diameter V1 of the movable valve member 160, so as to allow measurement of the inner wall face 71 of the cold water valve seat member 70 with the gauge G.

Figure 10:
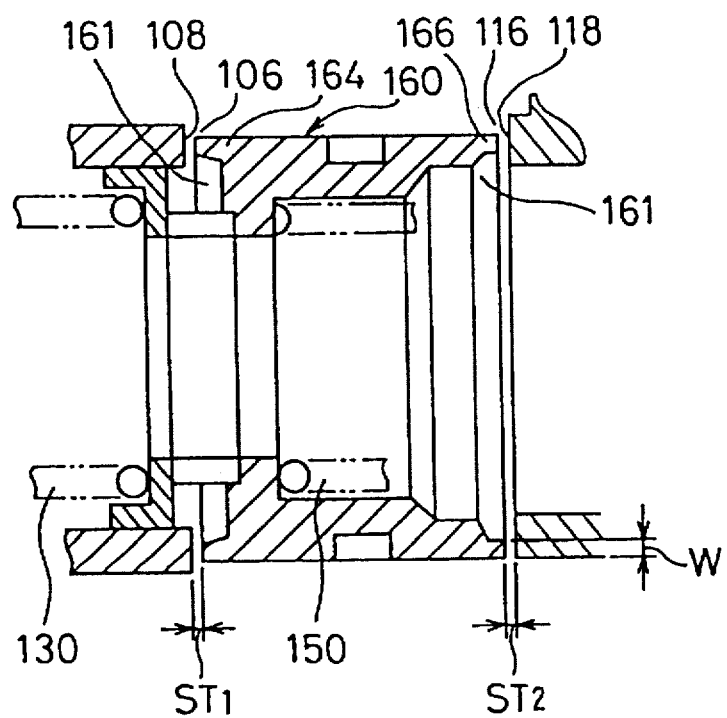
FIG. 10 shows characteristics of the movable valve member used in the combination faucet device.

A width W of the movable valve member 160 shown in FIG. 10 is determined in the following manner.

Referring to FIG. 10, the width W of the cold water seat element 164 or the hot water seat element 166 of the movable valve member 160 preferably has such a relationship to a stroke ST (=ST1+ST2) of the movable valve member 160 as to fulfill the condition of ½ST≦W≦3ST. The stroke ST is preferentially determined according to the material amount of the temperature sensitive spring 130, the strain of the temperature sensitive spring 130, and other conditions.

When the width is less than ½ST, a space between the cold water seat element 164 and the cold water valve seat 108 and a space between the hot water seat element 166 and the hot water valve seat 118 function to cause throttling for abrupt pressure decrease at the short stroke ST. This leads the liquid pressure to decrease abruptly in the vicinity of an inner portion 161 of the movable valve member 160. Such abrupt pressure decrease causes cavitation, that is, generates bubbles in the vicinity of the inner portion 161 of the movable valve member 160, which further causes offensive high-frequency noise or corrosion on the inside of the movable valve member 160. The width W should be not less than ½ST for prevention of such cavitation.

When the width W is greater than 3ST, on the contrary, the greater pressure-receiving area of the movable valve member 160 increases a force applied onto the temperature sensitive spring 130. Since the temperature sensitive spring 130 has a relatively small spring constant compared with conventional springs, the greater pressure-receiving area prevents the temperature sensitive spring 130 from maintaining a predetermined stroke ST. The width W should be not greater than 3ST to allow the temperature sensitive spring 130 composed of a relatively small amount of shape-memory alloy to maintain the predetermined stroke ST.

The movable valve member 160 having a large pressure receiving area is easily affected by fluctuation of the water pressure to cause unstable movement thereof. The fluctuation of pressure is significantly large when water is supplied to a number of taps via a water heater and the combination faucet device 10. A constant pressure valve may be disposed on the upstream of the combination faucet device 10 to adjust the pressure applied to the combination faucet. As a more effective method without any constant pressure valve, however, the width W of the movable valve member 160 is set in the above preferable range so as to allow the movable valve member 160 to work stably irrespective of some external fluctuation.

The movable valve member 160 is composed of a rubber, an elastomer, or a resin. Such material gives high sealing performances to the movable valve member 160. When the movable valve member 160 is seated on the cold water valve seat 108 or the hot water valve seat 118, the cold water seat element 164 or the hot water seat element 166 of the movable valve member 160 is slightly deformed for effective sealing. In a preferable application, the cold water valve seat member 70 is also composed of a rubber, an elastomer, or a resin for further enhancement of the sealing performance.

The spacer 190 disposed between the movable valve member 160 and the temperature sensitive spring 130 has a structure and functions described below.

Figure 11:
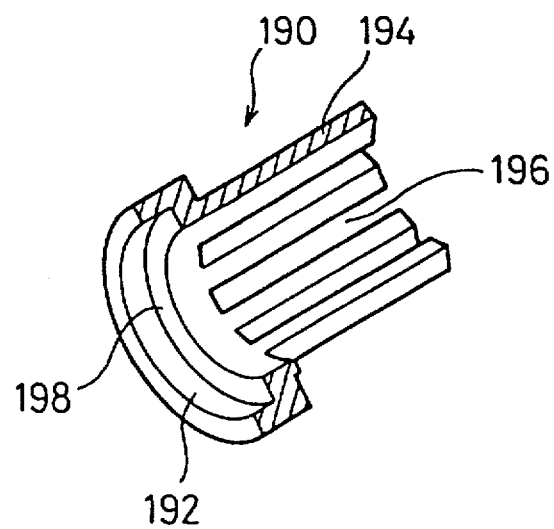
FIG. 11 illustrates a spacer as being partly broken.

Referring to FIGS. 3 and 11, the spacer 190 includes a spring receiving element 192 for supporting a right end 134 of the temperature sensitive spring 130, and a plurality of legs 194 protruded in parallel from the spring receiving element 192. Cold water supplied from the cold water port 106 flows through inter-leg flow paths 196 formed between the plurality of legs 194 whereas a center of the spring receiving element 192 is formed as a through path 198.

The spacer 190 works to keep the movable valve member 160 by a certain distance apart from the temperature sensitive spring 130 according to the reasons below.

The mixing ratio of hot water to cold water is adjusted by a sliding movement of the movable valve member 160 as described previously. Cold water running from the cold water port 106 through the inter-leg flow paths 196 of the spacer 190 is mixed with hot water supplied from the hot water port 116, and flows in the through path 198 of the spacer 190 towards the temperature sensitive spring 130. The spacer 190 assures a certain distance before mixing of hot water with cold water, thus allowing the temperature sensitive spring 130 to be exposed to sufficiently mixed water.

The plurality of legs 194 of the spacer 190 decrease the flow rate of cold water supplied from the cold water port 106 while changing the flow of cold water in a circumferential direction. This makes cold water flown through the inter-leg flow paths 196 uniformly into the mixing chamber 80. Hot water flown from the hot water port 116 is surrounded uniformly by cold water running through the inter-leg flow paths 196 and then mixed sufficiently with cold water in the mixing chamber 80. With the aid of the spacer 190 for assuring a certain distance before mixing of hot water with cold water, the temperature sensitive spring 130 is exposed to water mixed sufficiently and substantially uniformly in order to change its load. The temperature sensitive spring 130 thus does not apply to the movable valve member 160 such a sliding force as to incline the movable valve member 160 but expands and contracts uniformly.

The function of the spacer 190 was evaluated by an experiment described below. The spacer 190 used for the experiment had a length of 9.5 mm. The flow of water mixture and the target temperature were respectively set equal to ten liters and 40° C. The temperatures of cold water and hot water were 15° C. and 60° C., respectively.

The supply pressure of hot water was first varied from 0.5 kgf to 7.5 kgf while the supply pressure of cold water was kept at a constant value of 2 kgf. The supply pressure of cold water was then varied from 0.5 kgf to 7.5 kgf while the supply pressure of hot water was kept at a constant value of 0.5 kgf. The temperature of water mixture running through the combination faucet device was measured with the variation of the supply pressure. The water temperature was evaluated as a deviation from the target temperature.

Figure 12:
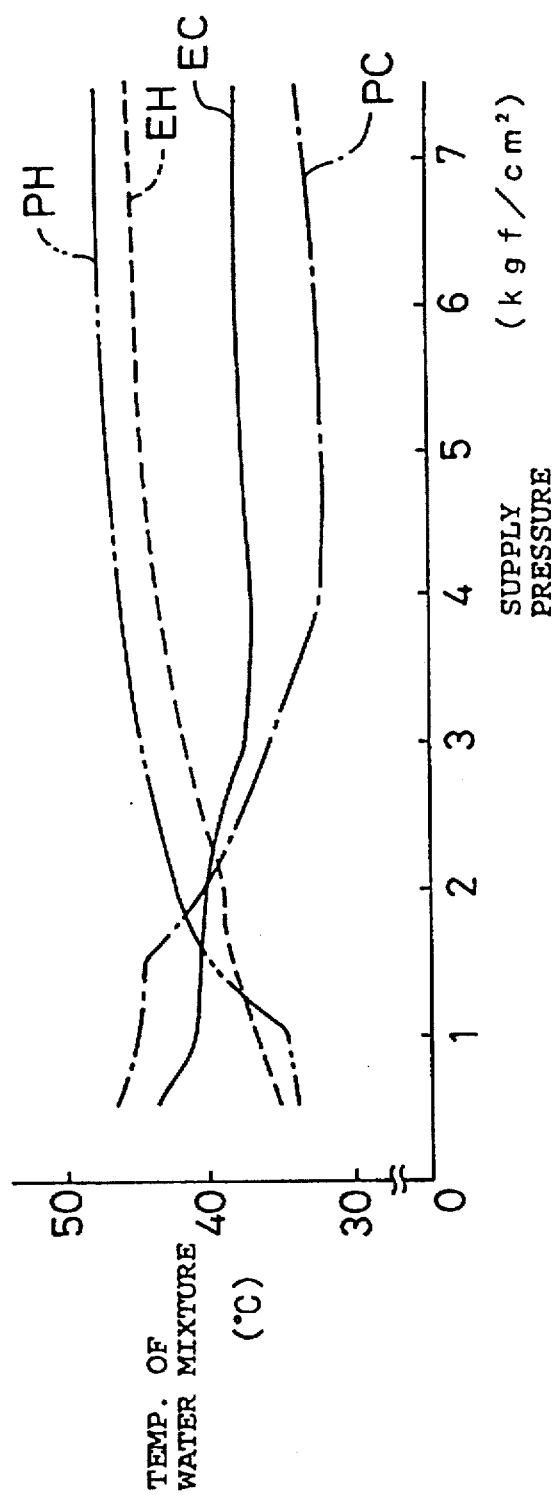
FIG. 12 is a graph showing the temperature of water mixture running through the combination faucet device plotted against the supply pressure of low-temperature water or high-temperature water.

Results of the experiment are shown in the graph of FIG. 12, with the temperature of water mixture as ordinate and the supply pressure of cold water or hot water as abscissa.

A solid line EC and a broken line EH represent the results of measurement in the structure of the embodiment with the spacer 190; EH with the varied supply pressure of hot water under a constant supply pressure of cold water, and EC with the varied supply pressure of cold water under a constant supply pressure of hot water. A one-dot chain line PC and a two-dot chain line PH, on the other hand, represent the results of measurement in a reference structure without the spacer 190; PH with the varied supply pressure of hot water under a constant supply pressure of cold water, and PC with the varied supply pressure of cold water under a constant supply pressure of hot water.

Compared with the reference structure without the spacer as shown by the one-dot chain line PC and the two-dot chain line PH, the structure of the embodiment with the spacer 190 as shown by the solid line EC and the broken line EH caused smaller temperature deviations from the target temperature against the varied supply pressure of hot water or cold water, thus having more stable temperature control properties.

The certain distance held between the temperature sensitive spring 130 and the movable valve member 160 by the spacer 190 is determined according to the size of the combination faucet device 10, so as to assure the sufficient mixing as described above and prevent hunting due to a response delay. In one preferable application, the distance may be 5 through 10 millimeter.

Though the spacer 190 is formed separately from the movable valve member 160 in the embodiment, the spacer may be formed integrally with the movable valve member 160 for lessen the required parts.

The temperature-sensitive spring receiving member 180 for supporting a left end 132 of the temperature sensitive spring 130 is described in detail based on the drawing of FIG. 3. The temperature-sensitive spring receiving member 180 is attached to a flange 74 of the cold water valve seat member 70 for positioning the temperature sensitive spring 130. As clearly shown in FIG. 13, a bottom element 182 of the spring receiving member 180 is provided with a helical step 186 having a shape corresponding to the left end 132 of the temperature sensitive spring 130.

The helical step 186 positions the non-processed left end 132 of the temperature sensitive spring 130, and supports the temperature sensitive spring 130 upright with respect to the bottom element 182. The temperature sensitive spring 130 supported perpendicularly to the bottom element 182 gives a spring force in an axial direction to the movable valve member 160, so as to slide the movable valve member 160 without causing the valve member 160 to lean. This structure allows the movable valve member 160 to exert an excellent sealing power to prevent leak of hot water or cold water.

While a conventional spring has an end processed and ground to be flat, the temperature sensitive spring 130 of the embodiment has the non-processed left end 132, which is thereby free from thermal deformation or distortion due to the grinding process. The temperature sensitive spring 130 has no distortion or deformation due to the grinding, and does not require any heat treatment for the desirable shape memory properties, thus preferably decreasing the manufacturing cost.

Figure 13:
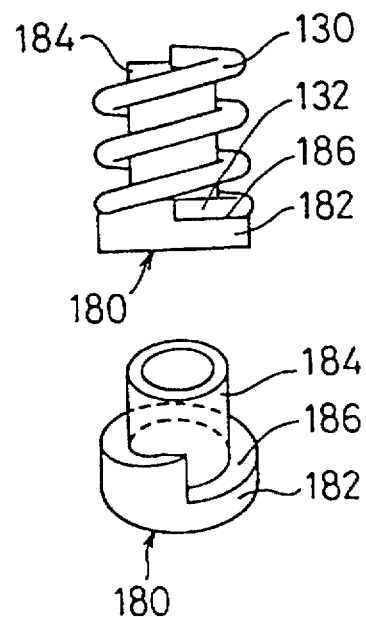
FIG. 13 shows an exemplified spring receiving member.

In the embodiment, the left end 132 of the temperature sensitive spring 130 is supported by the helical step 186 of the spring receiving member 180 as shown in FIG. 13. The structure is, however, not limited to that of the embodiment, and there may be other possible structures provided that the structure can support the temperature sensitive spring 130 upright without processing the left end 132 of the spring 130. Examples of the other possible structures are shown in FIGS. 14 through 16.

Figure 14A:
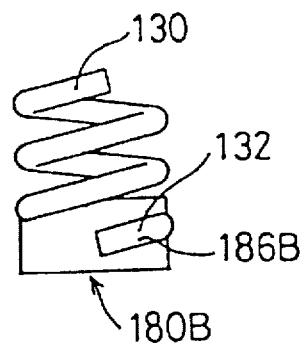
FIG. 14 shows another example of the spring receiving member.
Figure 14B:
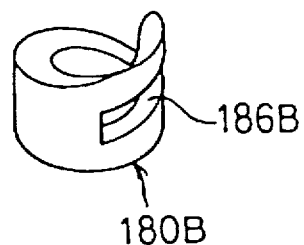

Referring to FIG. 14, a temperature-sensitive spring receiving member 180B has a helical groove 186B corresponding to the left end 132 of the temperature sensitive spring 130. The left end 132 of the temperature sensitive spring 130 is inserted in the helical groove 186B, so that the temperature sensitive spring 130 is supported upright.

Figure 15:
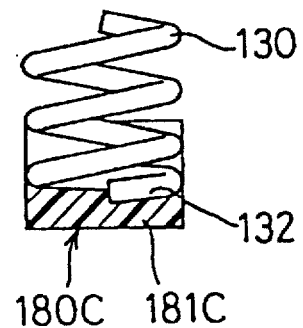
FIG. 15 shows still another example of the spring receiving member.

In the example of FIG. 15, a temperature-sensitive spring receiving member 180C has a resin element 181C which is injection molded to fix the left end 132 of the temperature sensitive spring 130 inserted therein. The structure for integrally supporting the temperature sensitive spring 130 with the spring receiving member 180C effectively prevents scattering of the load due to attachment of the temperature sensitive spring 130 without processing the left end 132 of the temperature sensitive spring 130.

Figure 16A:
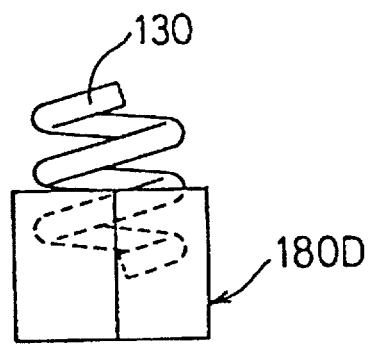
FIG. 16 shows another example of the spring receiving member.
Figure 16B:
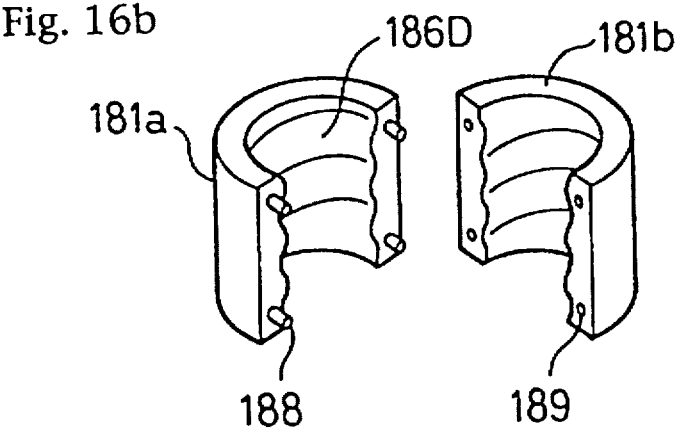

In the example of FIG. 16, a temperature-sensitive spring receiving member 180D includes a first separate piece 181a with a plurality of pins 188 and a second separate piece 181b with a plurality of pin holes 189 which the pins 188 are inserted in. Assembly of the first separate piece 181a and the second separate piece 181b forms a helical groove 186D for supporting the temperature sensitive spring 130. In this structure, the temperature sensitive spring 130 is inserted in the helical groove 186D to be held upright.

Figure 17:
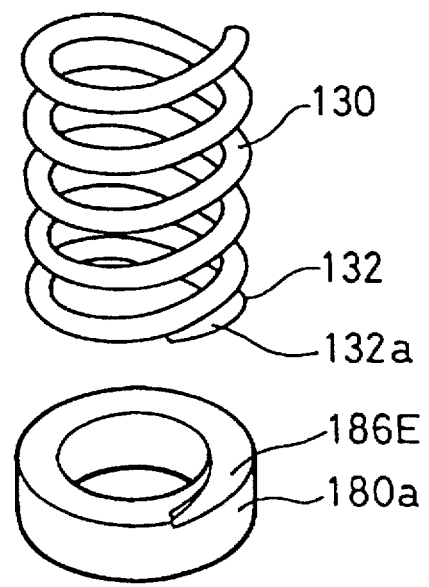
FIG. 17 shows still another example of the spring receiving member.

In any example shown in FIGS. 13 through 16, the temperature sensitive spring 130 is supported by the helical step 186 or a similar element corresponding to the non-processed left end 132 of the temperature sensitive spring 130. The left end 132 of the temperature sensitive spring 130 may, however, be ground flat. In this case, a temperature-sensitive spring receiving member 180a is provided with a recess 186E having a shape corresponding to the processed left end 132 of the temperature sensitive spring 130 as shown in FIG. 17. Even when the left end 132 is ground flat, there is a small gap between the left end 132 and a first helical loop 132a of the spring 130. The recess 186E effectively compensates for the difference between a load applied to the gap and that to the other part of the spring 130, thus preventing the movable valve member 160 from inclining.

Figure 18:
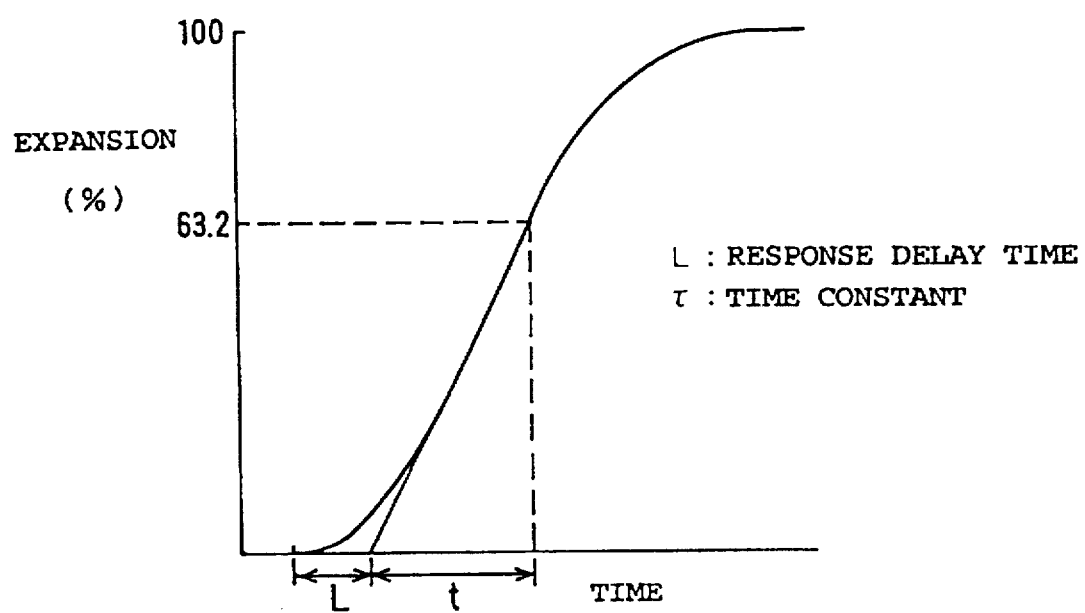
FIG. 18 is a graph showing the time constant of the temperature sensitive spring.

Referring to FIG. 3, an inner cylinder element 184 protruded from the spring receiving member 180 is fitted in the temperature sensitive spring 130 to delay a time when the temperature sensitive spring 130 comes into contact with water mixture flown out of the water flow chamber 90. The temperature sensitive spring 130 is displaced quickly in response to the contact with water mixture. Excessively quick response may, however, cause a cycling phenomenon which periodically varies the temperature and flow of water mixture running through the combination faucet. Such cycling phenomenon is caused by a resonance related to the shape of the movable valve member 160 and the water flow, and is adjustable by changing a time constant of the temperature sensitive spring 130. A time constant $\tau$ represents rise characteristics with respect to the displacement of the temperature sensitive spring 130 as shown in FIG. 18. The inner cylinder element 184 adjusts the time constant $\tau$ of the temperature sensitive spring 130 coming into contact with water mixture, thus efficiently canceling the cycling phenomenon without affecting the properties of the temperature sensitive spring 130.

When the spring receiving member 180 is composed of a resin having superior adiabatic properties to a metal, appropriate adjustment of the height of the inner cylinder element 184 allows a wider range of the time constant.

The cold water valve seat member 70 engaged with the main casing 50 is described in detail.

Figure 19:
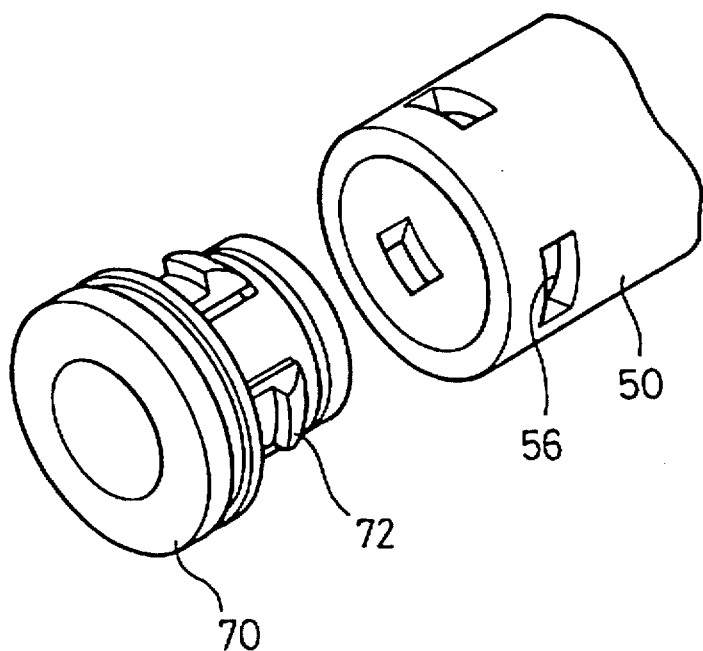
FIG. 19 is a partly decomposed perspective view illustrating a typical structure of the main casing and the cold water valve seat member.

As shown in FIG. 19, a plurality of engagement clicks 72 are formed at intervals of 90 degrees in a circumferential direction on an outer face of the cold water valve seat member 70. A plurality of engagement notches 56 corresponding to and engaging with the engagement clicks 72 are formed on the main casing 50.

The cold water valve seat member 70 having such structure is attached to the main casing 50 in the following manner. At a first step, the spring receiving member 180 is held inside the flange 74 of the cold water valve seat member 70 shown in FIG. 3. Second, the temperature sensitive spring 130 is supported on the bottom element 182 of the spring receiving member 180, and the spring receiving element 192 of the spacer 190 is positioned and fixed on the right end 134 of the temperature sensitive spring 130.

The cold water valve seat member 70 assembled as a unit is then inserted in the mixing chamber 80 of the main casing 50, so that the plurality of engagement clicks 72 formed on the outer face of the cold water valve seat member 70 are engaged with and fixed into the plurality of engagement notches 56 of the main casing 50.

The cold water valve seat member 70 is positioned and fixed in the mixing chamber 80 of the main casing 50 through engagement of the engagement clicks 72 with the engagement notches 56. Since the cold water valve seat member 70 is not turned for attachment to the main casing 50, no torsional force is applied onto the temperature sensitive spring 130. The temperature sensitive spring 130 does not expand or contract under the torsional force, and thereby has a smaller strain. This effectively lowers the hysteresis shown in FIG. 5, thus allowing the temperature of water mixture running through the combination faucet to be adjusted with high precision as well as improving the durability of the temperature sensitive spring 130.

Figure 20:
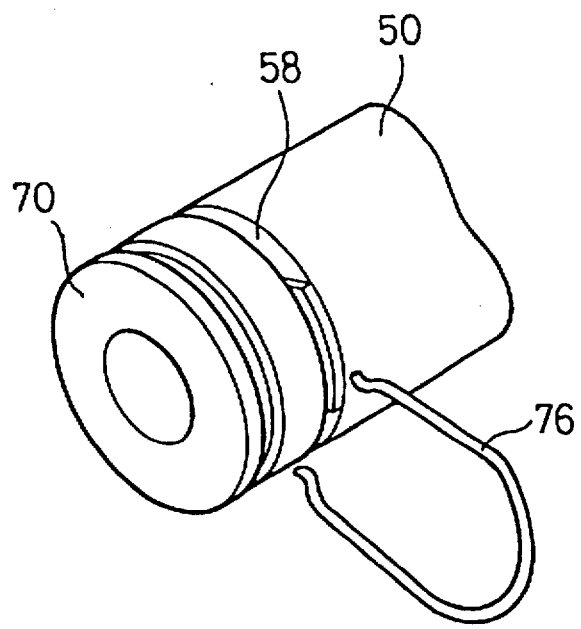
FIG. 20 is a partly decomposed perspective view illustrating another structure of the main casing and the cold water valve seat member.

In the structure of the embodiment, the engagement clicks 72 of the cold water valve seat member 70 engage with the engagement notches 56 formed on the main casing 50 as described above. Any other structure may, however, be applicable instead of the above engagement structure as long as the cold water valve seat member 70 can be inserted and positioned in the main casing 50 without being turned with respect to the main casing 50. FIG. 20 shows an example of another possible structure.

In the example of FIG. 20, the main casing 50 has a slit 58 whereas the cold water valve seat member 70 has a groove (not shown). The slit 58 and the groove are formed at positions corresponding to each other when the cold water valve seat member 70 is inserted in the mixing chamber 80 of the main casing 50. After the cold water valve seat member 70 is inserted into the mixing chamber 80 of the main casing 50, a stop ring 76 is placed over the slit 58 and the groove, so that the cold water valve seat member 70 is positioned and fixed to the main casing 50.

Structure and function of the pre-load adjusting mechanism 200 is described hereinafter in detail.

Figure 21:
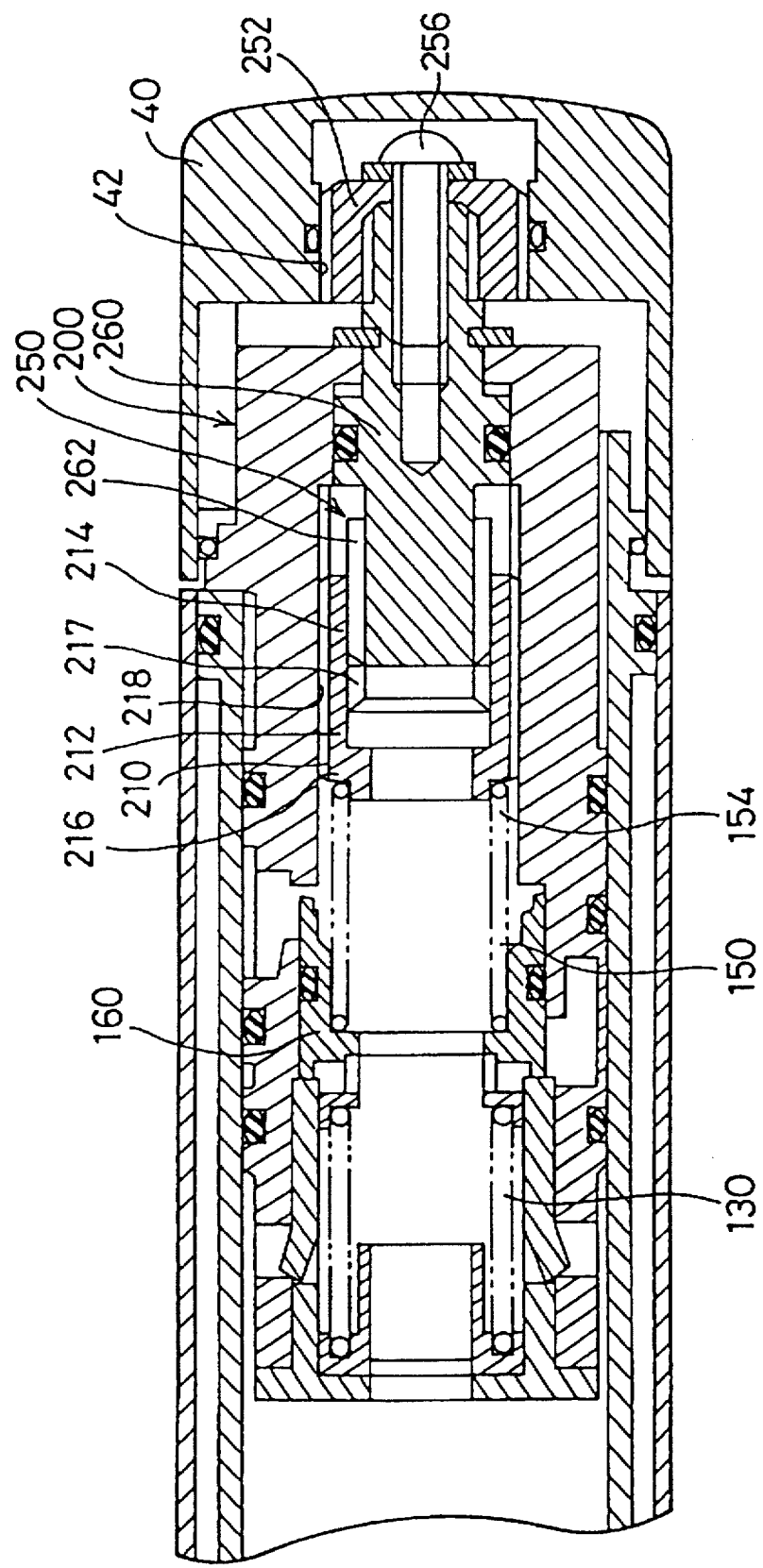
FIG. 21 is a cross sectional view illustrating a combination faucet device having a pre-load adjusting mechanism.

Referring to FIG. 21, the pre-load adjusting mechanism 200 includes the bias spring receiving member 210 for supporting a right end 154 of the bias spring 150, and the sliding mechanism 250 for moving the bias spring receiving member 210 in an axial direction.

The sliding mechanism 250 includes base element 252 fixed to an attachment recess 42 of the cap 40 by a latch mechanism or a click mechanism, and a rotating element 260 fixed to the base element 252 on one end thereof via a bolt 256 and having a male screw portion 262 on the other end thereof. The bias spring receiving member 210 includes a base element 212, a support element 214 formed integrally with the base element 212 and having a female screw portion 217 engaging with the male screw portion 262 of the rotating element 260, a spring receiving element 216 for supporting the bias spring 150, and a spline 218 formed between an outer face of the support element 214 and the main casing 50.

In the pre-load adjusting mechanism 200 thus constructed, the target temperature of water mixture is adjusted by turning the cap 40 in a predetermined direction according to an indication of an applicable temperature range on an outer face of the cap 40. When the cap 40 is turned manually, the bolt 256 as well as the base element 252 and the rotating element 260 of the sliding mechanism 250 rotate integrally with the cap 40. The male screw portion 262 of the rotating element 260 engages with the female screw portion 217 of the spring receiving member 210 as described previously, and a rotational driving force is thereby transmitted to the spring receiving member 210. Since the spline 218 restricts rotation of the spring receiving member 210, the spring receiving member 210 moves in the axial direction. According to movement of the spring receiving member 210 in the axial direction, the spring receiving element 216 of the spring receiving member 210 displaces the bias spring 150. Displacement of the bias spring 150 moves the movable valve member 160 to displace the temperature sensitive spring 130 to a position where the temperature sensitive spring 130 balances with the bias spring 150, thus consequently changing the target temperature of water mixture running through the combination faucet device 10.

In the structure of the pre-load adjusting mechanism 200, the bias spring 150 receives a pre-load in a direction identical with a pressed direction of the spring receiving member 210, and does not receive any torsional force. Namely, no torsional force is applied to the movable valve member 160 via the bias spring 150. The movable valve member 160 is accordingly not inclined but stably slides even under conditions of weak supporting force by the temperature sensitive spring 130 and the bias spring 150.

Figure 22:
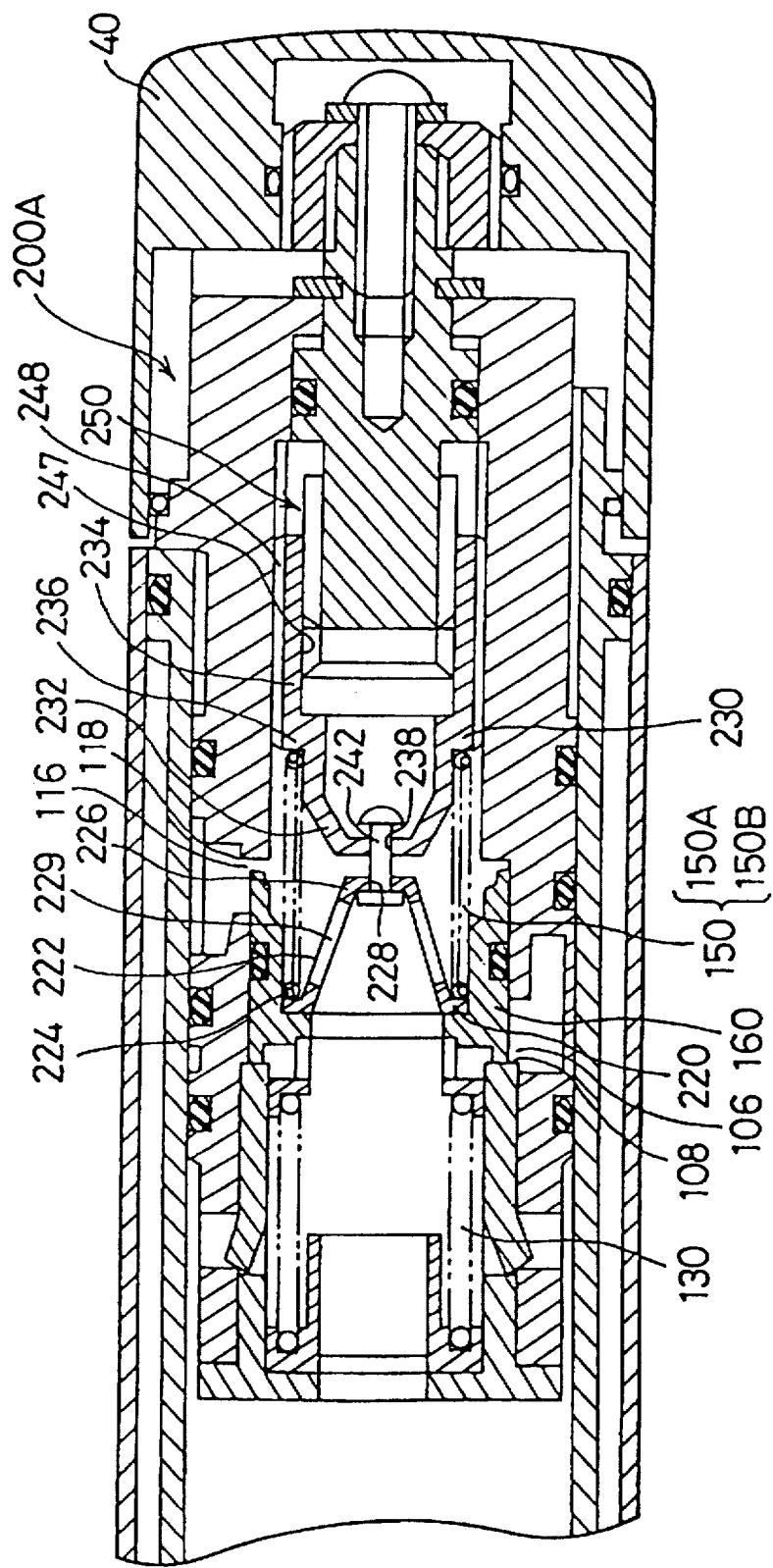
FIG. 22 is a cross sectional view illustrating a combination faucet device having another pre-load adjusting mechanism.

The pre-load adjusting mechanism 200 may have another structure as shown in FIG. 22.

A pre-load adjusting mechanism 200A of FIG. 22 includes a bias spring unit 150', a first spring receiving member 220, and a second spring receiving member 230 as different from the pre-load adjusting mechanism 200 shown in FIG. 21.

The bias spring unit 150' for applying a pre-load to the movable valve member 160 includes a first bias spring 150A and a second bias spring 150B having a spring length shorter than that of the first bias spring 150A. The first bias spring 150A and the second bias spring 150B are arranged concentrically and in parallel.

The first spring receiving member 220 having an umbrella-like shape includes a base element 222, a top element 226 formed integrally with the base element 222, and a first spring receiving element 224 disposed on a foot of the base element 222 for receiving the bias spring unit 150'. The base element 222 of the first spring receiving member 220 has a hot water flow path 229 whereas the top element 226 has a first aperture 228.

The second spring receiving member 230 includes a bevel-faced support element 232, a circumferential support element 234 formed integrally with the bevel-faced support element 232, and a second spring receiving element 236 disposed between the bevel-faced support element 232 and the circumferential support element 234 for receiving the bias spring unit 150'. The circumferential support element 234 is provided with a female spring portion 247 formed inside thereof, and a spline 248 formed outside thereof for making the circumferential support element 234 slidable in the axial direction. The bevel-faced support element 232 has a second aperture 238.

The first spring receiving member 220 and the second spring receiving member 230 are joined with each other via an engagement pin 242 passing through the first aperture 228 and the second aperture 238. When the first spring receiving member 220 engages with a projection formed on one end of the engagement pin 242, the first spring receiving member 220 moves integrally with the second spring receiving member 230 to release a spring force of the bias spring unit 150'. Otherwise, the first spring receiving member 220 is movable independently of the second spring receiving member 230.

The pre-load adjusting mechanism 200A thus constructed works in the following manner.

When the cap 40 is turned in one direction below a predetermined target temperature range, the second spring receiving member 230 moves rightward (in FIG. 22) via the sliding mechanism 250 so as to engage the projection of the engagement pin 242 with the first spring receiving member 220. The first spring receiving member 220 engaged with the engagement pin 242 moves integrally with the second spring receiving member 230. Such a rightward movement (in the drawing of FIG. 22) of the first spring receiving member 220 functions to decrease the spring constant of the bias spring unit 150'. The smaller spring constant of the bias spring unit 150' increases the rate of expansion of the temperature sensitive spring 130, and moves the movable valve member 160 quickly to the right in FIG. 22. The movable valve member 160 consequently closes the hot water port 116 of the hot water valve seat 118 while fully opening the cold water port 106 of the cold water valve seat 108 to allow a flow of cold water.

In this manner, the pre-load adjusting mechanism 200A seats the movable valve member 160 on the hot water valve seat 118 to make cold water flown through the combination faucet device. Since the spring constant of the bias spring unit 150' is substantially decreased to allow quick movement of the movable valve member 160, the user is not required to turn the cap 40 by a large angle before the movable valve member 160 closes the hot water port 116 of the hot water valve seat 118 to allow a flow of cold water.

When the cap 40 is rotated in the other direction above the predetermined target temperature range, the second spring receiving member 230 moves leftward (in FIG. 22) to allow both the first bias spring 150A and the second bias spring 150B to give a pre-load. In response to the rapid increase of the pre-load given by the bias spring unit 150', the movable valve member 160 quickly closes the cold water port 106 of the cold water valve seat 108 while abruptly opening the hot water port 116 of the hot water valve seat 118, thus allowing hot water to run through the combination faucet device.

Figure 23:
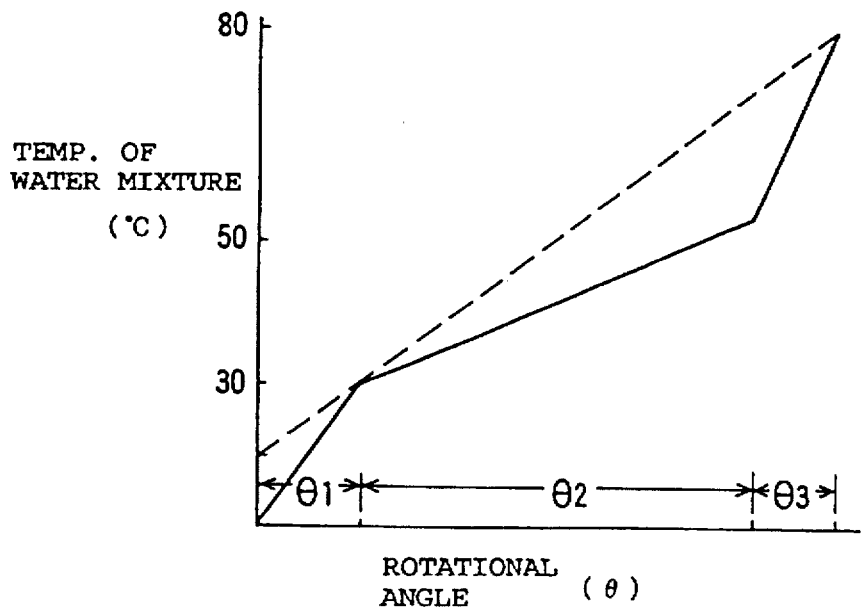
FIG. 23 is a graph showing the relationship between the actual temperature of water mixture running through the combination faucet device and the rotational angle of the cap for changing a target temperature of the water mixture.

FIG. 23 shows the relationship between the rotational angle θ of the cap 40 and the temperature T of water mixture running through the combination faucet device. In a second rotational angle range θ2, the temperature T increases gradually with the increase of the rotational angle θ. The temperature of water mixture is thereby controlled accurately in this range θ2. In a first rotational angle range θ1, on the other hand, cold water is quickly flown through the combination faucet device with the smaller rotational angle θ. In a third rotational angle range θ3, hot water is quickly flown through the combination faucet device with the smaller rotational angle θ.

Figure 24:
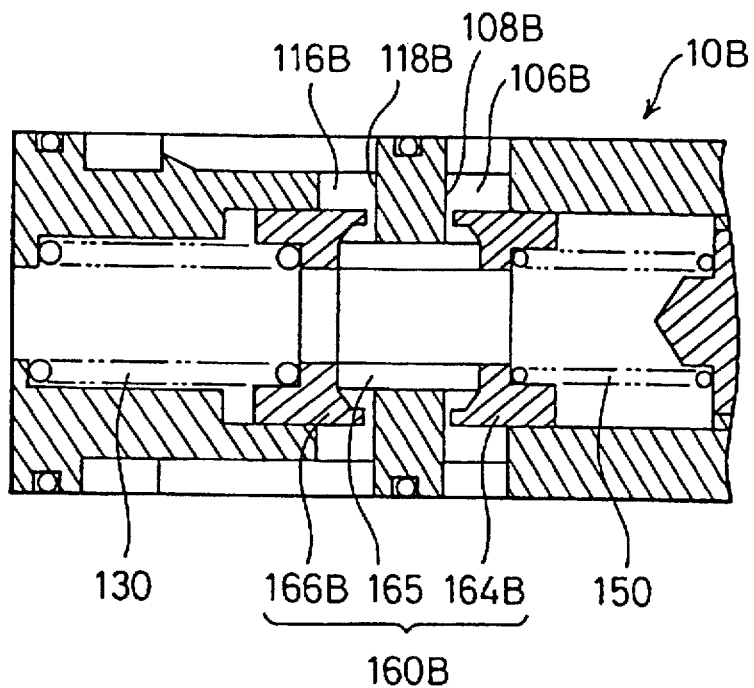
FIG. 24 is a cross sectional view illustrating a combination faucet device having another shape of the movable valve member.

FIG. 24 is a cross sectional view illustrating a combination faucet device 10B as a second embodiment of the invention. The difference from the combination faucet device 10 of the first embodiment includes structures and positions of a movable valve member 160B, hot water and cold water valve seats, and hot water and cold water ports.

In this second embodiment, the movable valve member 160B includes a cold water seat element 164B, a hot water seat element 166B, and a connection element 165 for connecting the cold water seat element 164B and the hot water seat element 166B with each other. The cold water seat element 164B is seated on a cold water valve seat 108B having a cold water port 106B whereas the hot water seat element 166B is seated on a hot water valve seat 118B having a hot water port 116B. The movable valve member 160B moves according to a balance between a load of the temperature sensitive spring 130 and a load of the bias spring 150 as in the first embodiment. In the second embodiment, however, the hot water port 116B is disposed close to the temperature sensitive spring 130 while the cold water port 106B is placed near the bias spring 150. This structure preferably corresponds to a piping arrangement different from that of the first embodiment.

Figure 25:
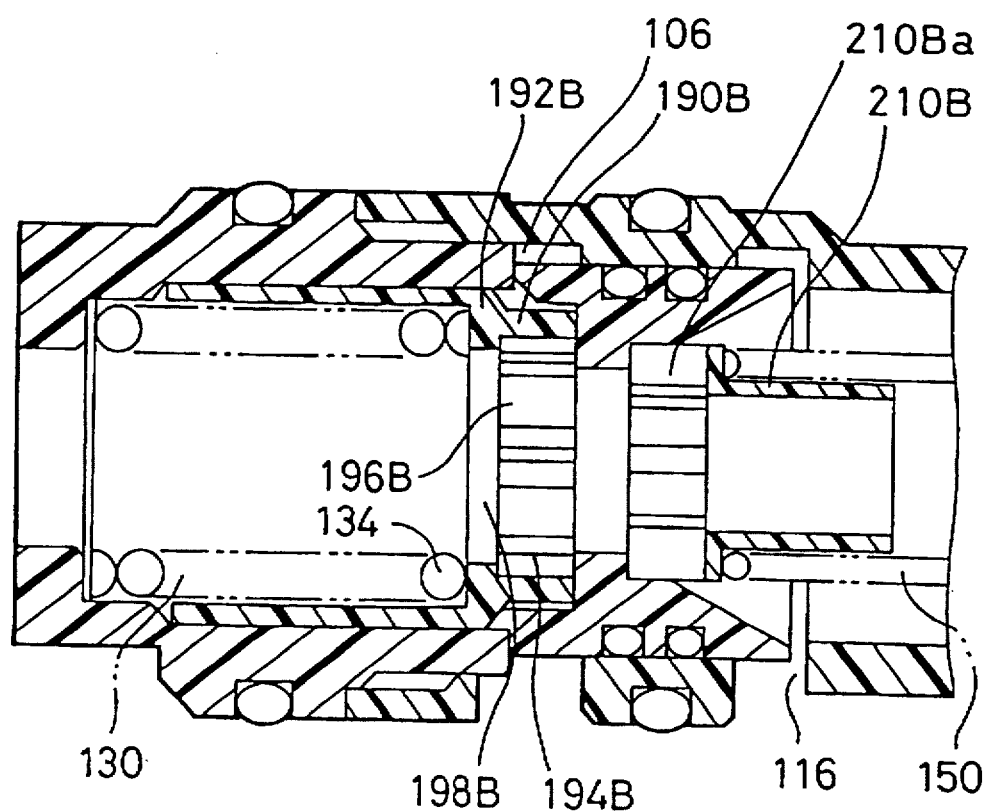
FIG. 25 is a cross sectional view illustrating an essential part of a combination faucet device having another spacer.
Figure 26:
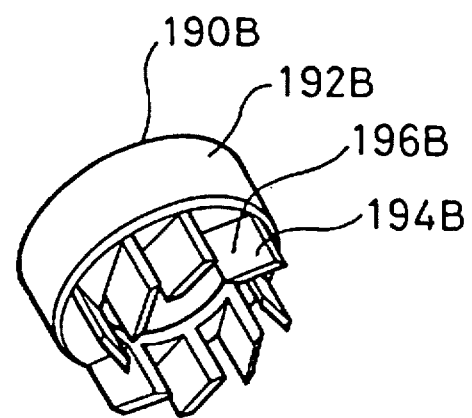
FIG. 26 is a perspective view illustrating the spacer of FIG. 25.

FIG. 25 is a cross sectional view illustrating another combination faucet device 10B with a spacer 190B disposed therein, and FIG. 26 is a perspective view showing the spacer 190B.

Figure 27:
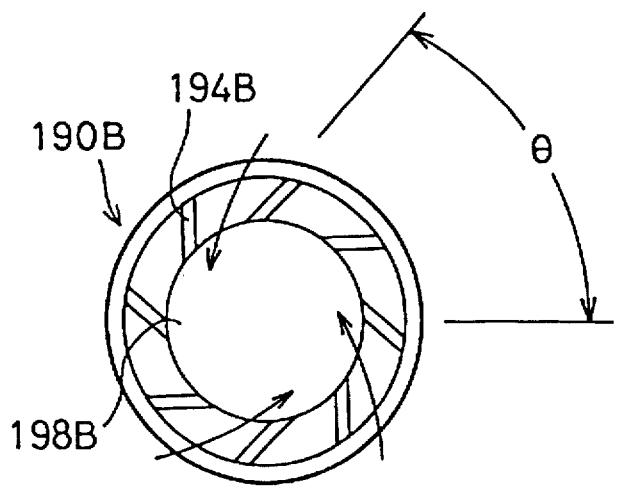
FIG. 27 shows fins formed on the spacer of FIG. 25.

The spacer 190B includes a spring receiving element 192B for receiving the right side 134 of the temperature sensitive spring 130, and a plurality of (for example, six through eight) fins 194B protruded in parallel from the spring receiving element 192B. Cold water supplied from the cold water port 106 flows through inter-fin flow paths 196B formed between the plurality of fins 194B whereas a center of the spring receiving element 192B is formed as a through path 198B. The plurality of fins 194B are inclined by a predetermined angle θ with respect to a circumscribed line of the spring receiving element 192B as shown in FIG. 27. The preferable angle θ for acceleration of a function stated below should be 40 through 60 degrees, or more specifically 45 through 55 degrees.

The plurality of fins 194B enhance the function of the plurality of legs 194 of the spacer 190 shown in FIG. 11 for changing the flow of cold water from the cold water port 106 in a circumferential direction.

The fins 194B raise the flow rate of cold water flown from the cold water port 106 in the circumferential direction, and accelerate mixing of the cold water with hot water in the mixing chamber 80. The temperature sensitive spring 130 is thus exposed to water mixture having a uniform temperature, which effectively prevents localized loading.

Figure 28:
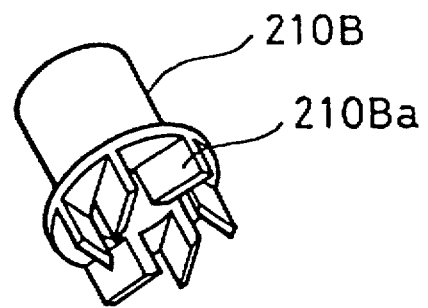
FIG. 28 is a perspective view illustrating a bias spring receiving member of FIG. 25.

Like the fins 194B formed on the spacer 190B, a bias spring receiving member 210B for receiving the bias spring 150 may have a plurality of fins 210Ba as shown in FIG. 28. These fins 210Ba raise the flow rate of hot water flown from the hot water port 116 in the circumferential direction, and accelerate mixing of the hot water with cold water flown from the cold water port 106.

The water-mixing effects of the fins 194B formed on the spacer 190B were evaluated by an experiment explained below.

Figure 29:
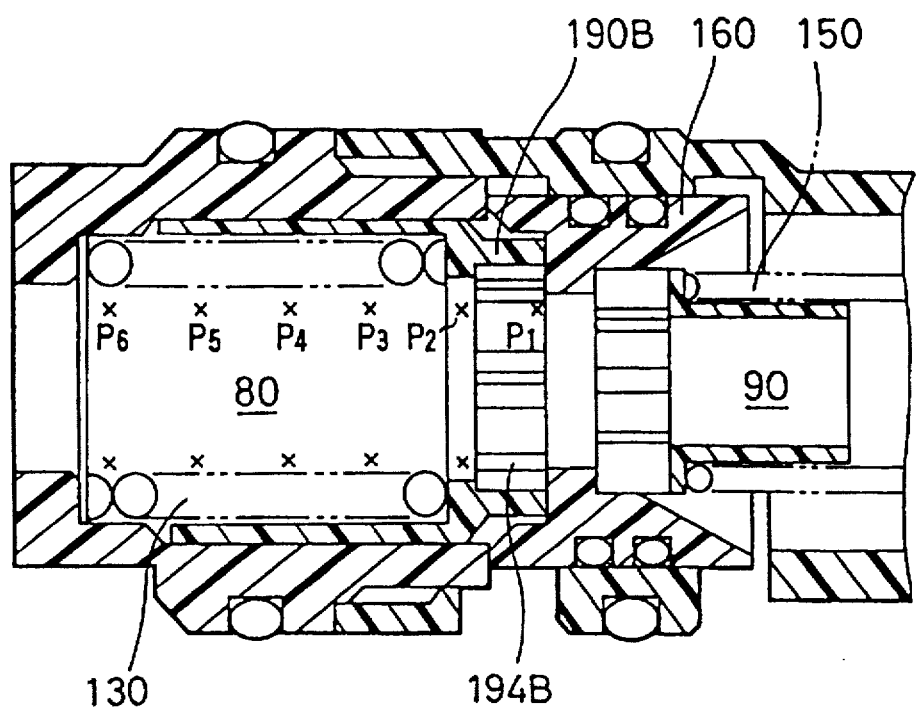
FIG. 29 shows axial positions of temperature sensors placed in the combination faucet device.
Figure 30:
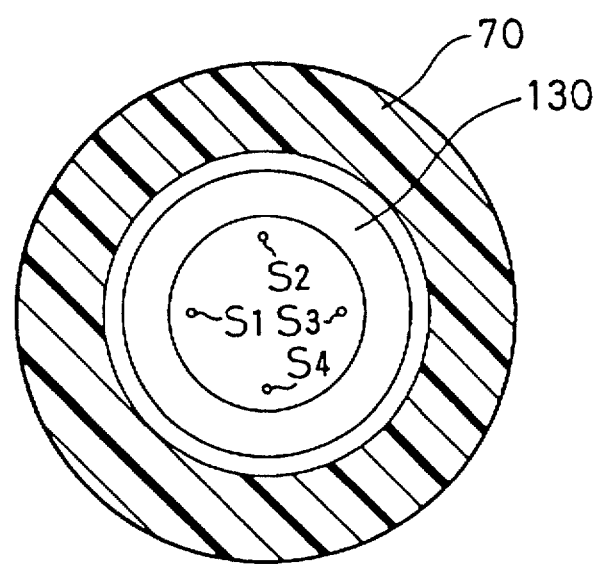
FIG. 30 shows circumferential positions of the temperature sensors disposed in the combination faucet device.

As shown in FIGS. 29 and 30, temperature sensors S1, S2, S3, and S4 were placed at 90-degree intervals in the circumferential direction in the mixing chamber 80. The temperature of water was measured at six different points P1 through P6 (shown by the crosses in FIG. 29) with the four temperature sensors S1 through S4. The points P1 through P6 are apart from each other by a predetermined distance, for example, 5 mm, in the direction of the water flow.

Figure 31:
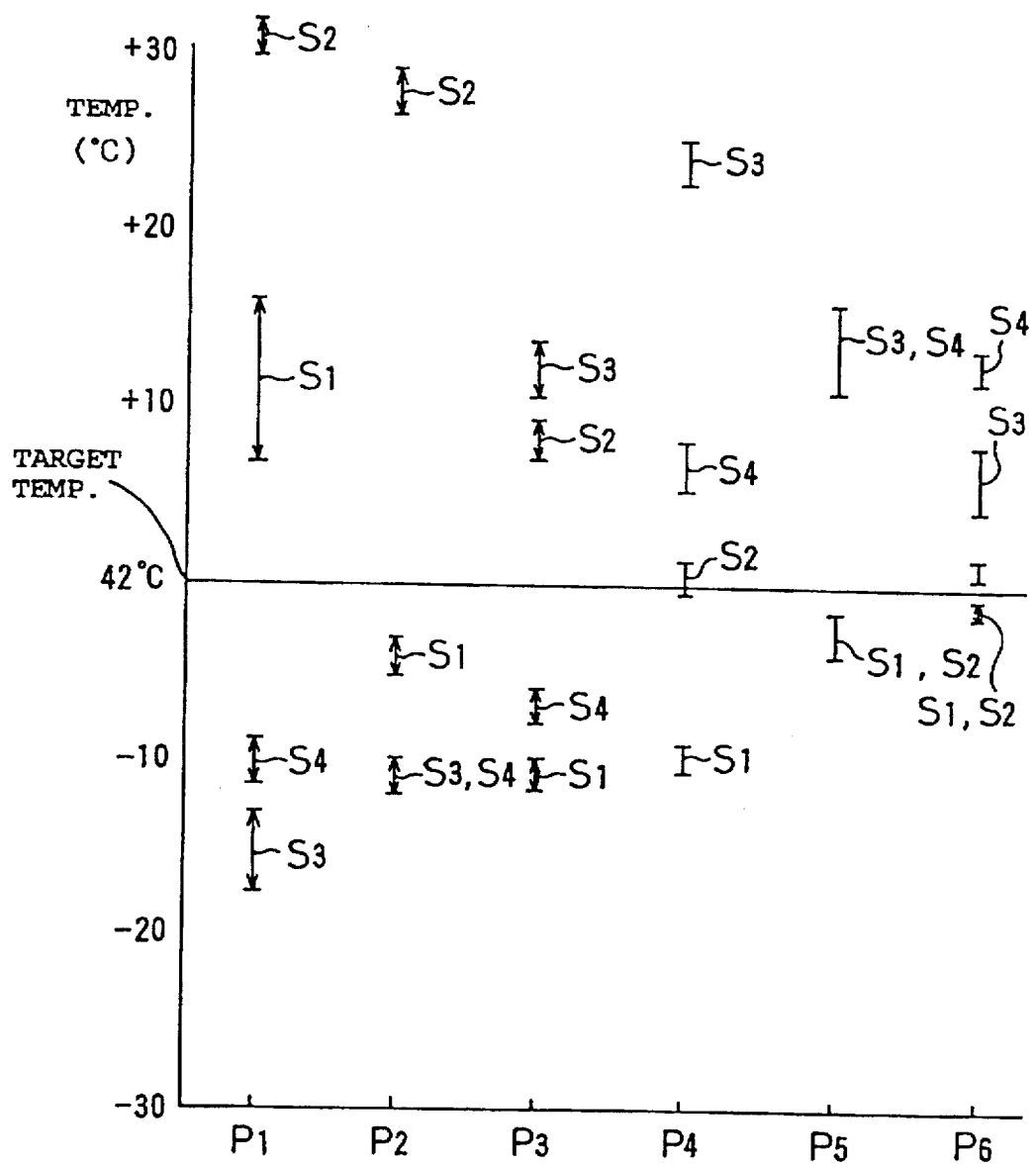
FIG. 31 is a graph showing the temperature distribution in the mixing chamber of a combination faucet device without a spacer.
Figure 32:
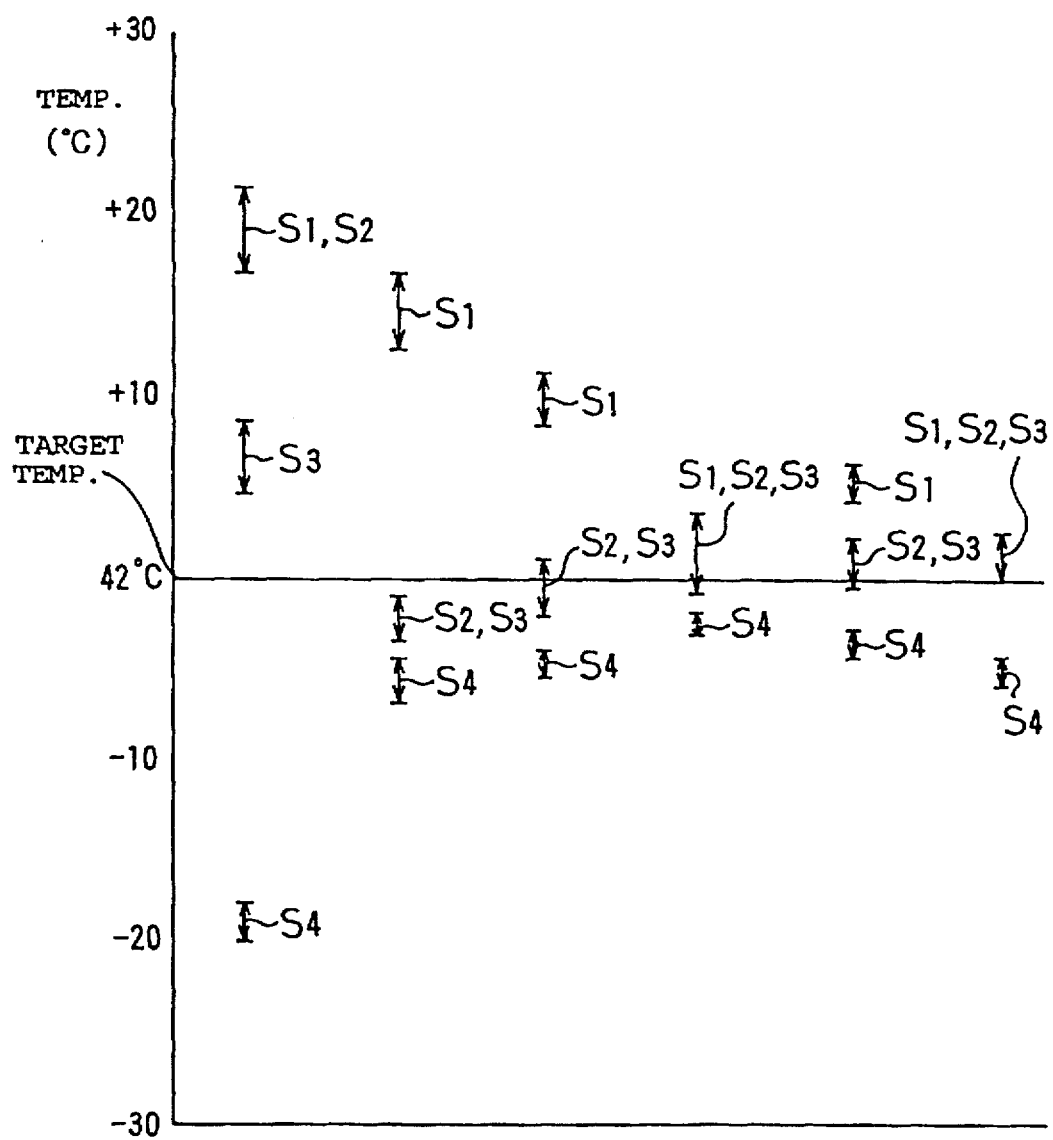
FIG. 32 is a graph showing the temperature distribution in the mixing chamber of a combination faucet device with a spacer.

FIG. 31 shows temperatures measured at the six points P1 through P6 in a reference structure without a spacer, and FIG. 32 shows temperatures measured at the six points P1 through P6 in the structure of the embodiment with the spacer 190B having the fins 194B. The results of FIGS. 31 and 32 clearly show that the fins 194B actually raise the flow rate of cold water flown from the cold water port 106 in the circumferential direction and accelerate mixing of the cold water with hot water. In the graph of FIG. 32, the temperatures measured at the four points P3 through P6 are significantly close to a pre-set target temperature.

Figure 33:
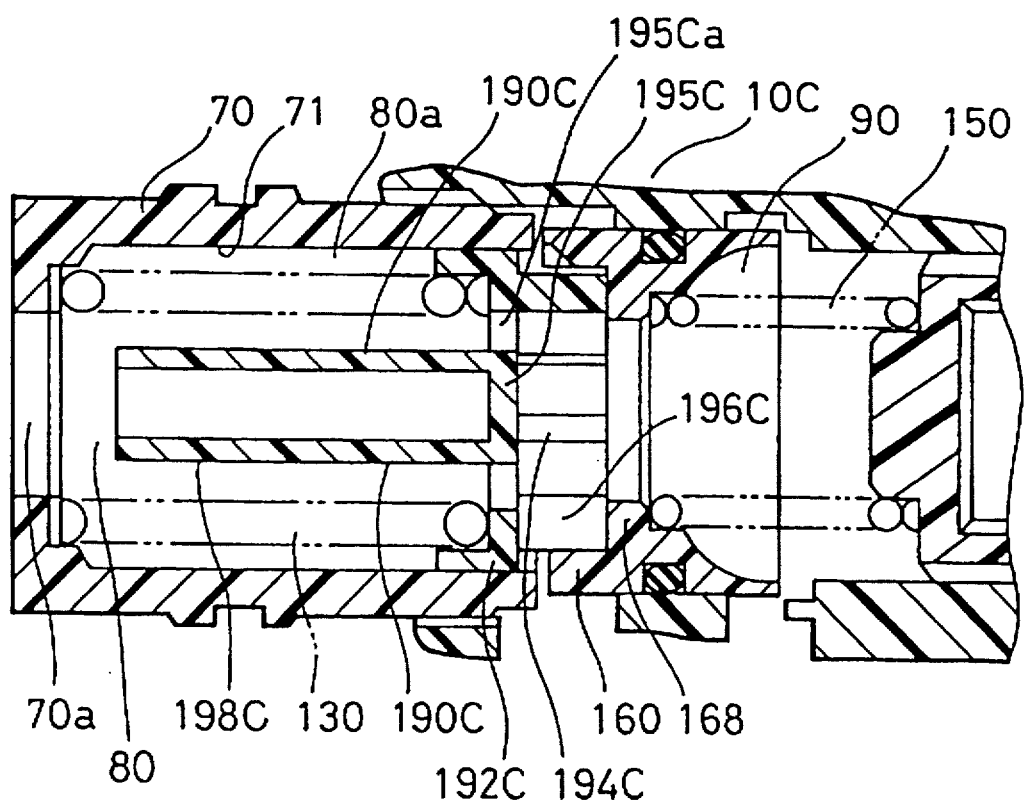
FIG. 33 is a cross sectional view illustrating an essential part of a combination faucet device having another spacer.
Figure 34:
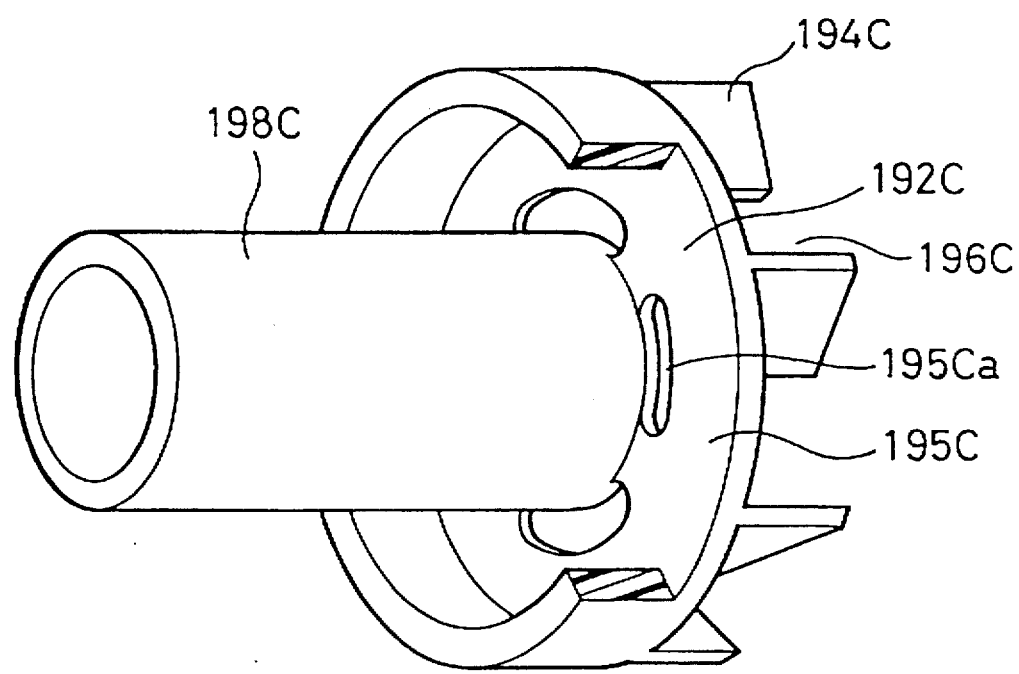
FIG. 34 is a perspective view showing the spacer of FIG. 33.

FIG. 33 is a cross sectional view showing another combination faucet device 10C with a spacer 190C disposed therein, and FIG. 34 is a perspective view illustrating the spacer 190C.

In this embodiment, the spacer 190C includes a spring receiving element 192C for supporting the temperature sensitive spring 130, a plurality of fins 194C projected from the spring receiving element 192C and positioned by the ring stopper 168 of the movable valve member 160, a spacer disk element 195C formed integrally with the spring receiving element 192C, and a spacer cylinder element 198C projected from the spacer disk element 195C.

The spacer cylinder element 198C is placed inside the temperature sensitive spring 130, and forms a spring-chamber water flow path 80a with the inner wall face 71 of the cold water valve seat member 70. The spacer disk element 195C is provided with a plurality of (for example, four) spacer flow apertures 195Ca disposed at predetermined intervals in the circumferential direction to connect the spring-chamber water flow path 80a with the mixing chamber 80.

In this structure, hot water running through the water flow chamber 90 is mixed with cold water passing through inter-fin flow paths 196C of the spacer 190C. Water mixture then runs through the spacer flow apertures 195Ca of the spacer disk element 195C and the spring-chamber water flow path 80a to flow out of an outlet 70a. The temperature sensitive spring 130 is expanded and contracted according to the temperature of water mixture running through the spring-chamber water flow path 80a.

Hot water is sufficiently mixed with cold water passing through the inter-fin flow paths 196C by the throttle-like function of the spacer flow apertures 195Ca. Since the well-mixed water is flown through the spring-chamber water flow path 80a, the temperature sensitive spring 130 is expanded and contracted stably.

Figure 35:
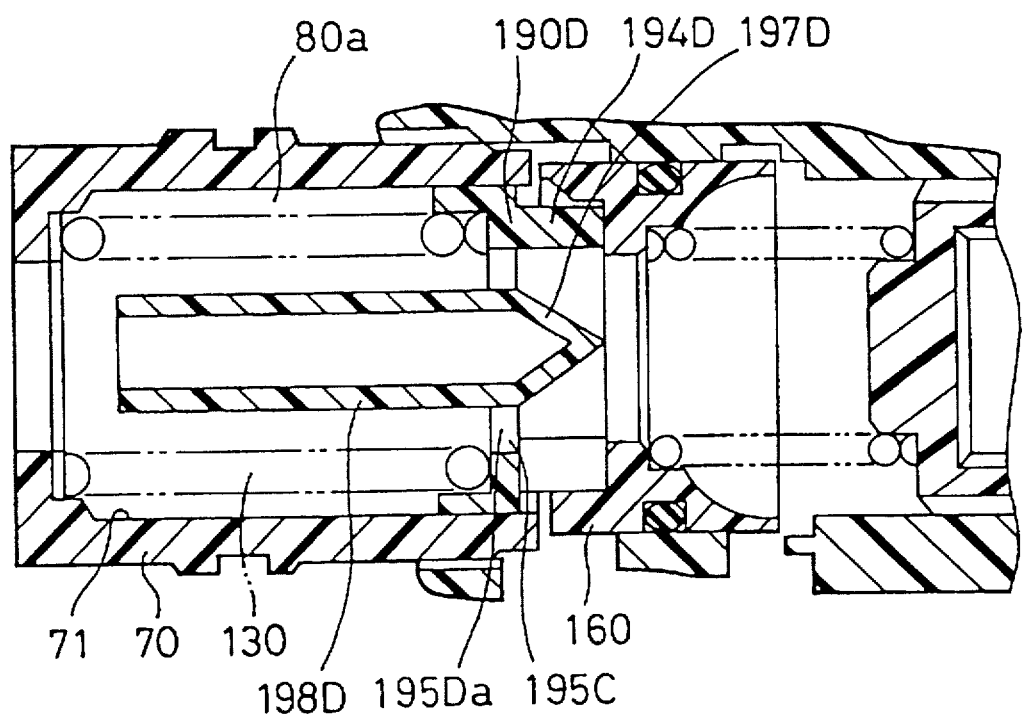
FIG. 35 is a cross sectional view showing an essential part of a combination faucet device having still another spacer.

FIG. 35 shows still another structure with a spacer 190D.

The spacer 190D has a cone-shaped guide element 197D projected from the spacer disk element 195C of the spacer 190C shown in FIG. 34. The cone-shaped guide element 197D is widened to the downstream to make water flown into the spring-chamber water flow path 80a smoothly.

A flow of water mixture sufficiently mixed by means of a plurality of fins 194D of the spacer 190D runs along the cone-shaped guide element 197D, is narrowed by a plurality of spacer flow apertures 195Da, and then runs through the spring-chamber water flow path 80a. The cone-shaped guide element 197D prevents water mixture flown in the spacer flow apertures 195Da from being turbulent and accelerates a smooth flow of the water mixture, thus keeping the spacer 190D and the movable valve member 160 free from vibrations and improving the stable sliding movement of the movable valve member 160.

Figure 36:
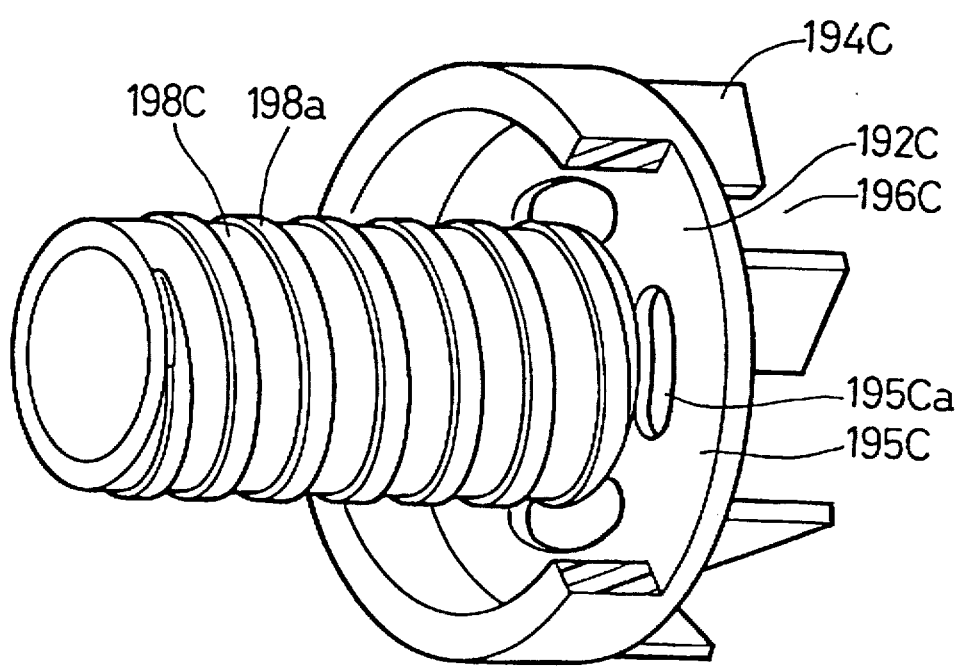
FIG. 36 is a perspective view illustrating another spacer.

As shown in FIG. 36, a helical spacer projection 198a may be attached to the spacer cylinder element 198C of the spacer 190C shown in FIG. 34 or the spacer cylinder element 198D of the spacer 190D shown in FIG. 35. The helical spacer projection 198a further stirs water mixture flown into the spring-chamber water flow path 80a, thus allowing the temperature sensitive spring 130 to be expanded and contracted stably. Another structure, for example, a passage baffle projection, may be applied to stir water mixture, instead of the helical spacer projection 198a. A helical spacer projection or a passage baffle projection mounted on the spacer in the embodiment may be formed on the inner wall face 71 of the cold water valve seat member 70.

The movable valve member 160 is supported on either end thereof by the temperature sensitive spring 130 and the bias spring 150. The movable valve member 160 is easily inclined by uneven loading of the temperature sensitive spring 130 and the bias spring 150. There are a variety of mechanisms for preventing inclination of the movable valve member 160 and enhancing the sealing effect.

Figure 37:
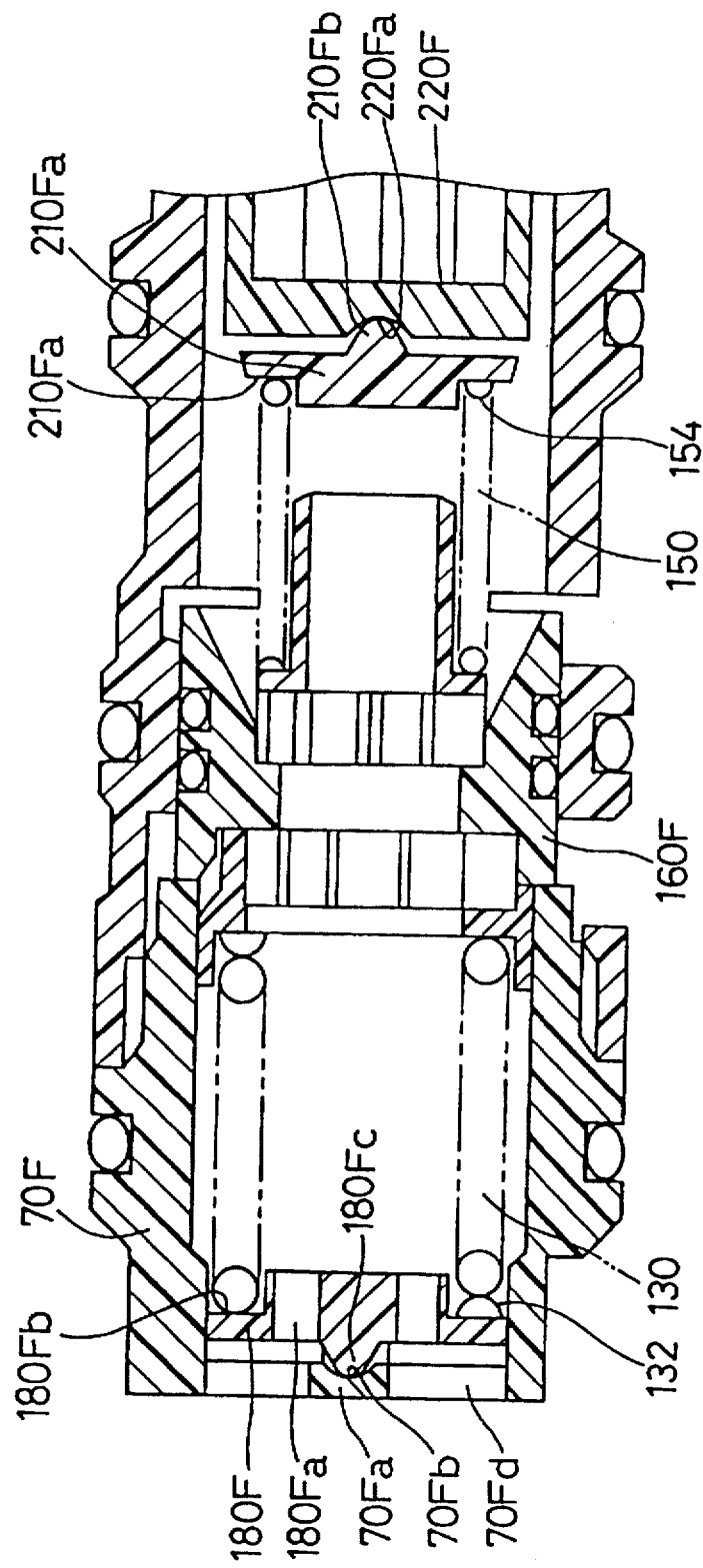
FIG. 37 is a cross sectional view illustrating a combination faucet device having spring receiving members according to another embodiment.
Figure 38:
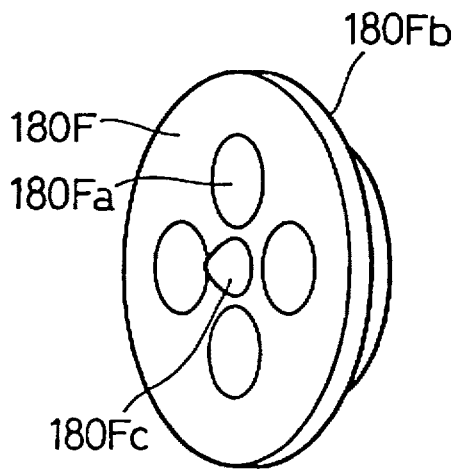
FIG. 38 is a perspective view showing the temperature-sensitive spring receiving member of FIG. 37.

Referring to FIG. 37, the left end 132 of the temperature sensitive spring 130 is held on a temperature-sensitive spring receiving member 180F supported by a cold water valve seat member 70F. The spring receiving member 180F is formed as a disk element having four passage apertures 180Fa arranged at 90-degree intervals on a circle as shown in FIG. 38. The spring receiving member 180F is further provided with a spring receiving step 180Fb on a circumference thereof for supporting the left end 132 of the temperature sensitive spring 130, and a support projection 180Fc formed on the center thereof.

The cold water valve seat member 70F includes a cover element 70Fa and four flow apertures 70Fd placed corresponding to the passage apertures 180Fa of the spring receiving member 180F. A support recess 70Fb is formed on a center of the cover element 70Fa for supporting the support projection 180Fc of the spring receiving member 180F.

The temperature sensitive spring 130 is positioned by the spring receiving step 180Fb of the spring receiving member 180F. The whole spring receiving member 180F is supported on one point via the support projection 180Fc, which is positioned by and fitted in the support recess 70Fb of the cover element 70Fa. When a load for displacing the temperature sensitive spring 130 is generated, the spring receiving member 180F is inclined via the support projection 180Fc thereof to make the load uniformly applied onto the temperature sensitive spring 130. The temperature sensitive spring 130 is adjusted to generate a uniform loading by the function of the spring receiving member 180F and does not apply such a force as to incline the movable valve member 160.

The bias spring 150 has a structure for supporting the movable valve member 160F on one point. The right end 154 of the bias spring 150 is supported by a liner 220F via a bias spring receiving member 210F. The bias spring receiving member 210F is formed as a disk element having a spring receiving step 210Fa on a circumference thereof and a support projection 210Fb on a center thereof. The support projection 210Fb is positioned and supported on a support recess 220Fa formed on the center of the liner 220F. The bias spring receiving member 210F supports the bias spring 150 to allow a pivotal movement of the bias spring 150 around the support projection 210Fb.

When a loading potentially applied onto the bias spring 150 is varied by the movement of the liner 220F, the bias spring receiving member 210F functions to apply a uniform load to the bias spring 150 via the support projection 210Fb, thus preventing an inclined sliding force from being applied to the movable valve member 160.

Figure 39:
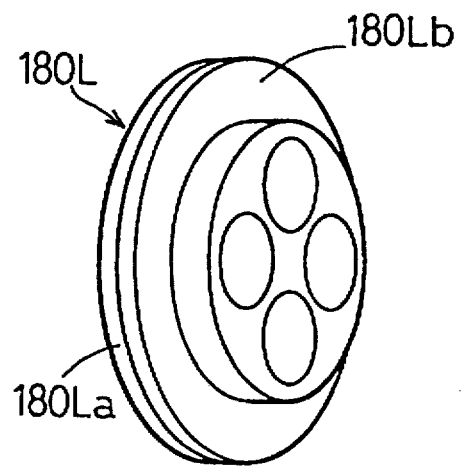
FIG. 39 is a perspective view showing another temperature-sensitive spring receiving member.

FIG. 39 is a perspective view showing a temperature-sensitive spring receiving resin member 180L for supporting the left end 132 of the temperature sensitive spring 130. The temperature-sensitive spring receiving resin member 180L includes a spring-receiving resin cover element 180La composed of a hard resin, and a spring-receiving resilient element 180Lb composed of a resilient material, such as, sponge rubber. The spring-receiving resin cover element 180La securely supports the whole temperature-sensitive spring receiving resin member 180L whereas the spring-receiving resilient element 180Lb absorbs an inclining load of the temperature sensitive spring 130. This structure effectively prevents a sliding force due to the inclining load from being applied to the movable valve member 160.

Figure 40:
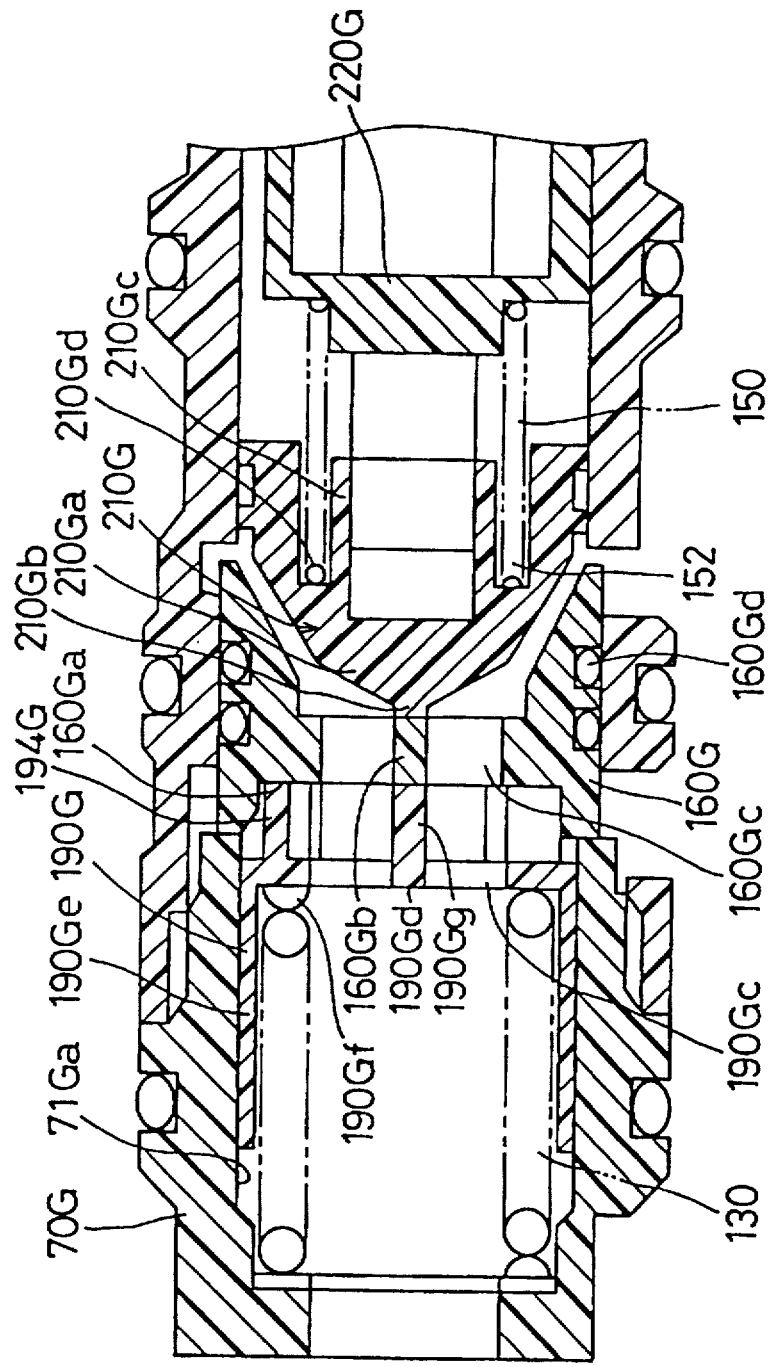
FIG. 40 is a cross sectional view illustrating a combination faucet device according to another embodiment of the invention.

FIG. 40 shows another specific structure for not applying an inclined sliding-force to a movable valve member 160G, where pressing forces of the temperature sensitive spring 130 and the bias spring 150 are focused on a center of the movable valve member 160G.

Referring to FIG. 40, an engagement support element 160Ga of the movable valve member 160G has a central base element 160Gb, and three engagement flow apertures 160Gc surrounding the central base element 160Gb. A bias spring receiving member 210G supporting the left end 152 of the bias spring 150 includes a bevel-faced element 210Ga, an end support projection 210Gb formed on one end of the bevel-faced element 210Ga, a cylindrical element 210Gc, and a spring-receiving ring recess 210Gd formed in the cylindrical element 210Gc.

A movement of a liner 220G is transmitted to the bias spring receiving member 210G via the bias spring 150. The end support projection 210Gb of the bias spring receiving member 210G accordingly presses the central base element 160Gb of the movable valve member 160G, so that the movable valve member 160G receives no eccentric force but only a sliding force from the central base element 160Gb.

A spacer 190G also has a structure for pressing the movable valve member 160G on a center thereof. The spacer 190G includes a spring receiving element 190Gf for supporting the temperature sensitive spring 130, a plurality of fins 194G, a spacer disk element 190Gd having a plurality of passage apertures 190Gc, and a guide cylinder element 190Ge formed outside the spring receiving element 190Gf. A valve pressing element 190Gg is protruded from a center of the spacer disk element 190Gd. The valve pressing element 190Gg of the spacer 190G is in contact with the central base element 160Gb of the movable valve member 160G. The guide cylinder element 190Ge is slidable with respect to an inner wall face 71Ga of a cold water valve seat member 70G.

The spacer 190G works in the following manner. The spacer 190G slidingly moves in response to expansion or contraction of the temperature sensitive spring 130. During the sliding movement of the spacer 190G, the guide cylinder element 190Ge of the spacer 190G is guided by the inner wall face 71Ga of the cold water valve seat member 70G. The sliding movement of the spacer 190G allows the valve pressing element 190Gg of the spacer 190G to press the central base element 160Gb of the movable valve member 160G, thereby sliding the movable valve member 160G.

In this manner, the movable valve member 160G receives on its center a sliding force transmitted from the spacer 190G. Since the guide cylinder element 190Ge of the spacer 190G is guided by the inner wall face 71Ga of the cold water valve seat member 70G, the spacer 190G slides without inclination and does not apply any inclining force to the movable valve member 160G.

The movable valve member 160G is further provided with two O-rings 160Gd for enhancing sealing effects of the movable valve member 160G.

Figure 41:
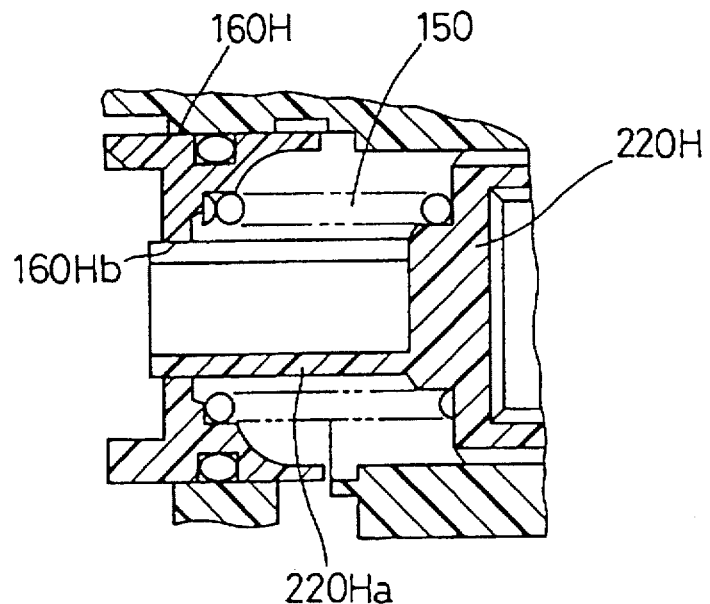
FIG. 41 is a cross sectional view showing a movable valve member of another embodiment.

FIG. 41 shows another structure where a movable valve member 160H includes a guide element. The movable valve member 160H has a passage aperture 160Bb on a center thereof, and a sliding guide element 220Ha protruded from a liner 220H is slidably inserted in the passage aperture 160Hb. The sliding guide element 220Ha effectively guides the movable valve member 160H in a sliding direction, thus allowing a stable and smooth movement of the movable valve member 160H.

Figure 42:
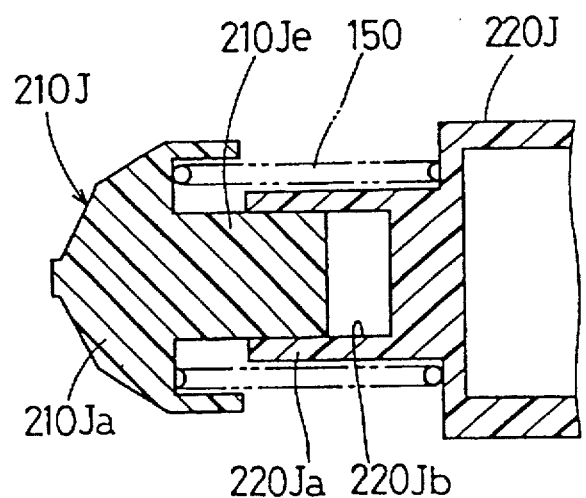
FIG. 42 is a cross sectional view illustrating a modification of the bias spring receiving member of FIG. 40.

FIG. 42 shows a modified structure having a bias spring receiving member 210J instead of the bias spring receiving member 210G of FIG. 40. The bias spring receiving member 210J has a guide column element 210Je protruded along the bias spring 150 from a bevel-formed element 210Ja. The guide column element 210Je is slidable inserted into a guide aperture 220Jb of a guide cylinder element 220Ja protruded from one end of a liner 220J. With a movement of the liner 220J, a pressing force of the bias spring 150 is transmitted to the bias spring receiving member 210J, which subsequently presses the center of the movable valve member (see FIG. 40) while the guide column element 210Je is guided by the guide cylinder element 220Ja.

Figure 43:
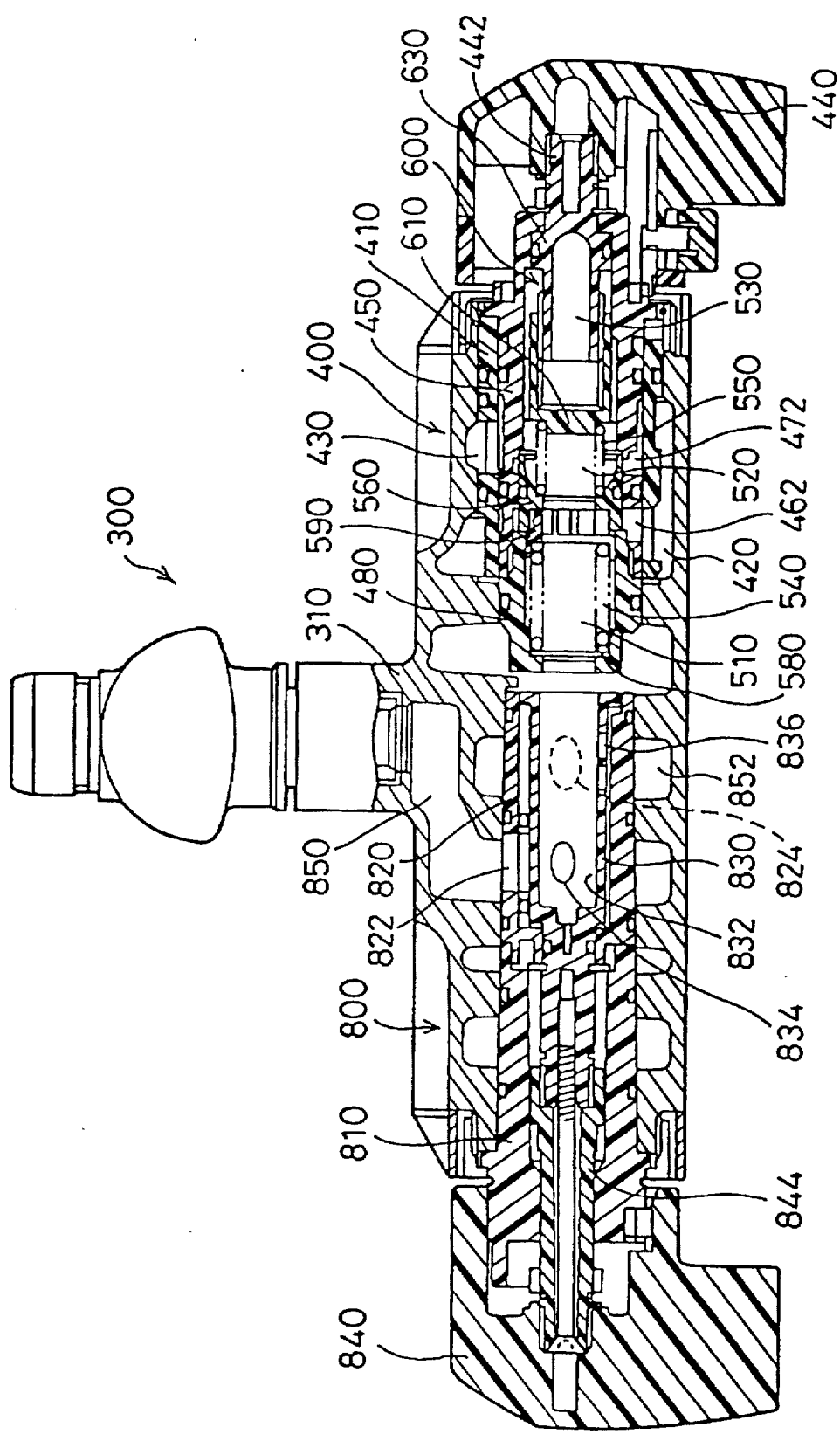
FIG. 43 is a cross sectional view illustrating a combination faucet having a mixing valve as still another embodiment of the invention.

FIG. 43 is a cross sectional view showing a combination faucet 300 embodying the invention. The combination faucet 300 includes a mixing valve 400 and a switch valve 800 disposed in an outer casing 310. Cold water and hot water supplied respectively from a cold water passage and a hot water passage are mixed by means of the mixing valve 400 and switched by the switch valve 800 to be supplied to a plurality of water-supply taps.

Figure 44:
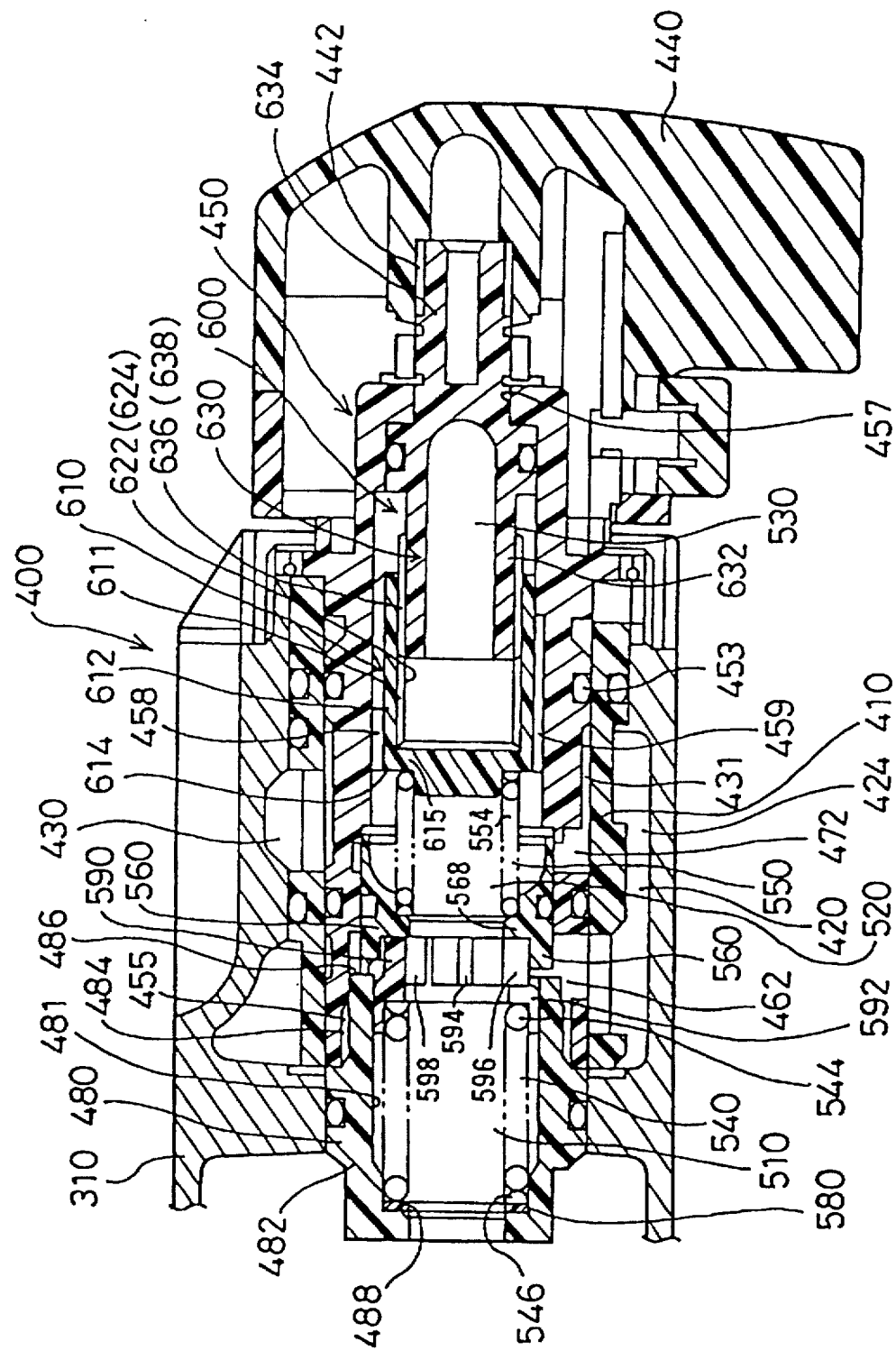
FIG. 44 is a cross sectional view illustrating an essential part of the mixing valve of FIG. 43.
Figure 45:
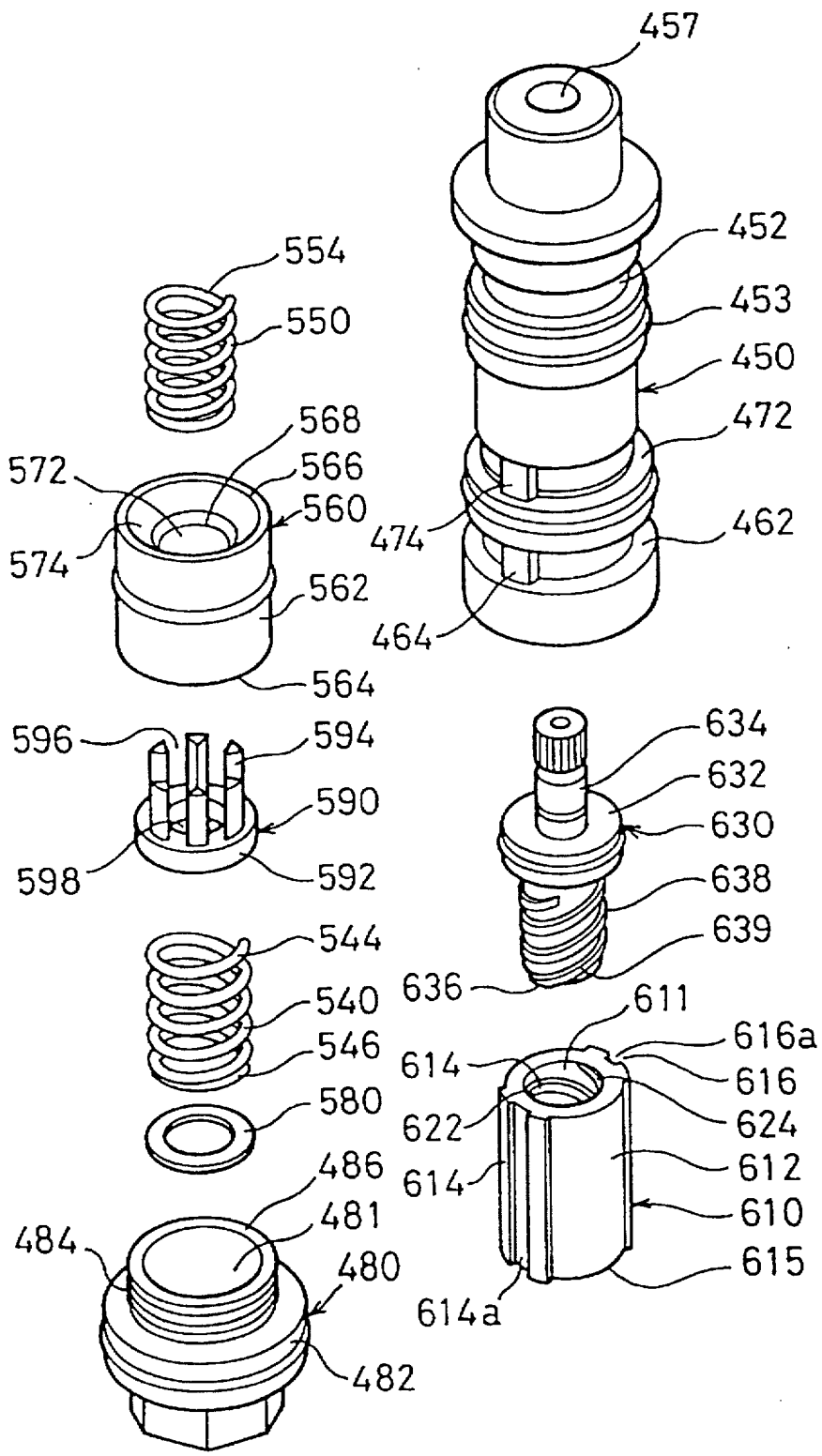
FIG. 45 is a decomposed perspective view illustrating a typical structure of the essential part of the mixing valve.

The mixing valve 400 is described in detail according to the cross sectional view of FIG. 44 and the decomposed perspective view of FIG. 45. Referring to FIGS. 43 and 44, the mixing valve 400 includes an adiabatic member 410 fitted in the outer casing 310, a cold water conduit 420 and a hot water conduit 430 disposed in the outer casing 310, a temperature control dial 440 attached to one end of the outer casing 310, a main casing 450, and a cold water valve seat member 480 screwed to the main casing 450.

The main casing 450 and the cold water valve seat member 480 have a plurality of chambers for accommodating valve mechanisms (described later), that is, a mixing chamber 510, a water flow chamber 520, and a sliding chamber 530. The main casing 450 is further provided with a cold water port 462 connecting to the cold water conduit 420 and a hot water port 472 connecting to the hot water conduit 430. The cold water port 462 and the hot water port 472 are connected to the water flow chamber 520, which a movable valve member 560 is slidably fitted in. The movable valve member 560 receives a spring force of a temperature sensitive spring 540 disposed in the mixing chamber 510 as well as a spring force of a bias spring 550, and is positioned according to a balance of the spring forces.

The temperature sensitive spring 540 is spanned between a spacer 590 and the cold water valve seat member 480 via a slip washer 580. The temperature sensitive spring 540 is composed of a metal having a spring constant varied with the temperature whereas the bias spring 550 is composed of a conventional material having a spring constant substantially unchanged irrespective of the temperature.

Referring to FIG. 44, a pre-load adjusting system 600 adjusts a pre-load of the bias spring 550 in order to change a target temperature of water mixture running through the mixing valve 400. A rotation of the temperature control dial 440 moves a liner 610 via a spindle 630 to increase or decrease the pre-load of the bias spring 550. In response to the increase or decrease in the pre-load, the movable valve member 560 is displaced to a position where the spring force of the bias spring 550 balances with the spring force of the temperature sensitive spring 540, thus changing the target temperature of water mixture.

The temperature of water mixture running through the mixing valve 400 is controlled with the mixing valve 400 according to the process described below.

When water mixture of a target temperature runs through the mixing valve 400 while a variety of conditions, such as the temperature of hot water fed from a water heater and the temperature and the flow of tap water, are in stationary state, the movable valve member 560 is kept at a position determined according to a balance between a force of the temperature sensitive spring 540 caused by water mixture in the mixing chamber 510 and the spring force of the bias spring 550. When the temperature of hot water fed from the water heater, the temperature of tap water, the flow of tap water, or another essential condition is fluctuated by some external factor, the temperature of water mixture in the mixing chamber 510 is consequently deviated from the target temperature. The temperature sensitive spring 540 varies its spring constant with the temperature, which results in the varied spring force of the temperature sensitive spring 540.

When the actual temperature of water mixture is deviated to be higher than the target temperature, the spring force of the temperature sensitive spring 540 is increased to shift the movable valve member 560 rightward (in FIG. 43) as increasing the pre-load of the bias spring 550. The rightward shift of the movable valve member 560 decreases the ratio of hot water to lower the temperature of water mixture.

When the actual temperature of water mixture is deviated to be lower than the target temperature, on the contrary, the spring force of the temperature sensitive spring 540 is decreased to shift the movable valve member 560 leftward (in FIG. 43) as decreasing the pre-load of the bias spring 550. The leftward shift of the movable valve member 560 increases the ratio of hot water to raise the temperature of water mixture. In this manner, the actual temperature of water mixture is adjusted to come close to the target temperature by means of the temperature sensitive spring 540.

In the mixing valve 400 thus constructed, the target temperature is changed by turning the temperature control dial 440, which constitutes a part of the pre-load adjusting system 600, in a predetermined direction. When the temperature control dial 440 is turned in the predetermined direction, the liner 610 moves leftward (in FIG. 43) via the spindle 630 to compressively displace the bias spring 550, thus increasing the pre-load of the bias spring 550 against the movable valve member 560. When the temperature control dial 440 is turned in a direction opposite to the predetermined direction, on the contrary, the liner 610 moves rightward (in FIG. 43) via the spindle 630 to extensibly displace the bias spring 50, thus decreasing the pre-load of the bias spring 550 against the movable valve member 560.

Increase in the pre-load of the bias spring 550 adjusts the movable valve member 560 at such a position as to widen a flow path of the hot water port 472 and narrow a flow path of the cold water port 462. Resultant increase in the hot water flow and decrease in the cold water flow changes the ratio of hot water to cold water and raises the temperature of water mixture running through the mixing valve 400. Decrease in the pre-load of the bias spring 550, on the other hand, adjusts the movable valve member 560 at such a position as to narrow the flow path of the hot water port 472 and widen the flow path of the cold water port 462. Resultant decrease in the hot water flow and increase in the cold water flow changes the ratio of hot water to cold water and lowers the temperature of water mixture running through the mixing valve 400.

In the mixing valve 400 of the embodiment, the pre-load of the bias spring 550 is transmitted directly to the movable valve member 560 to drive the movable valve member 560 whereas the displacement of the temperature sensitive spring 540 based on the temperature change is also transmitted directly to the movable valve member 560 to move the movable valve member 560. Even the temperature sensitive spring 540 consisting of a relatively small amount of a temperature-sensitive material and having a small spring constant can realize smooth movement of the movable valve member 560 since the friction loss for moving the movable valve member 560 is relatively small.

The switch valve 800 works to make water mixture running through the mixing valve 400 flown to one of a plurality of external taps, for example, either of two external taps. Referring to FIG. 43, the switch valve 800 includes a support member 810, a sleeve 820 having a first flow port 822 and a second flow port 824 connecting to the two external taps, and a switching valve member 830 fitted in the sleeve 820, which are all disposed inside the outer casing 310. A switching dial 840 is rotatably attached to one end of the support member 810, and fixed to the switching valve member 830 via a joint member 844 held on the switching valve member 830. The switching valve member 830 has a bottomed hole 832 connecting to the mixing chamber 510 and first and second flow apertures 834 and 836 for connecting the bottomed hole 832 respectively to the first and second flow ports 822 and 824 of the sleeve 820.

The switch valve 800 works in the following manner. When the switching dial 840 is rotated in a first direction to connect the first flow aperture 834 to the first flow port 822, water mixture fed from the mixing chamber 510 of the mixing valve 400 is flown via the bottomed hole 832, the first flow aperture 834, the first flow port 822 to a first flow path 850. When the switching dial is rotated in a second direction to connect the second flow aperture 836 to the second flow port 824, water mixture fed from the mixing chamber 510 is flown via the bottomed hole 832, the second flow aperture 836, the second flow port 824 to a second flow path 852.

Figure 46:
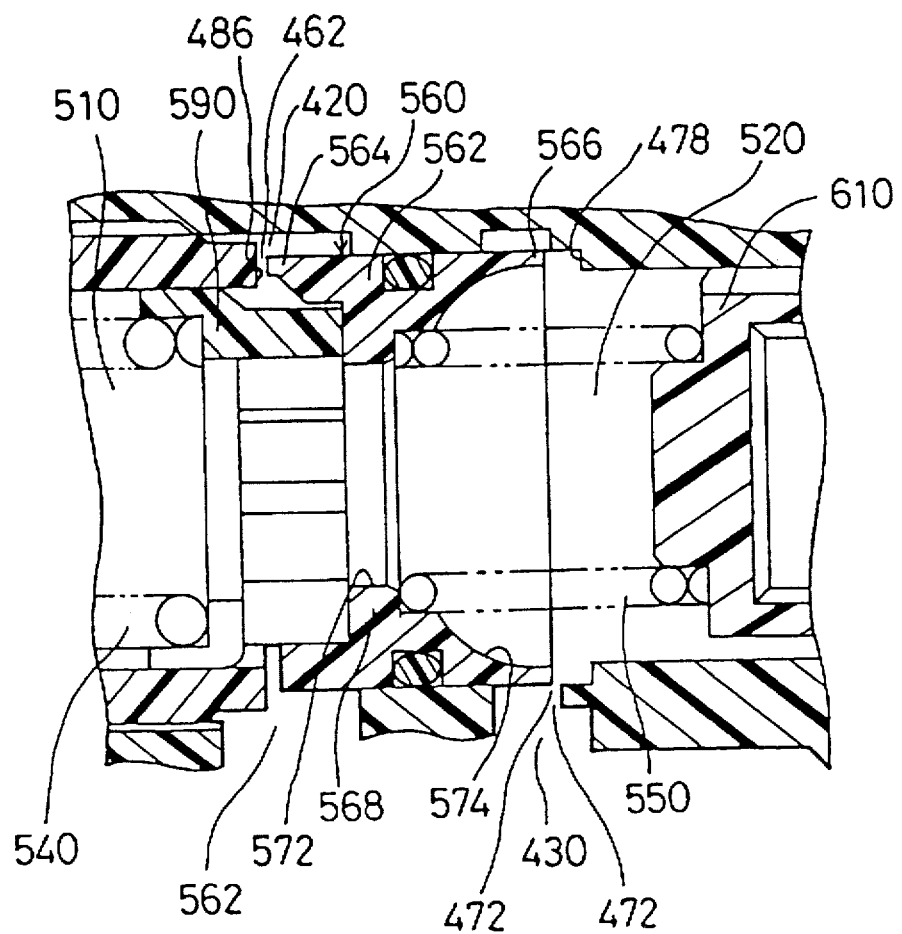
FIG. 46 is a cross sectional view showing the movable valve member of the mixing valve.

The structure and operation of the mixing valve 400 are described more in detail. Referring to FIG. 46, the movable valve member 560 includes a cylindrical element 562, a cold water seat element 564 and a hot water seat element 566 formed on either end of the cylindrical element 562, a ring stopper 568 formed on an inner face of the cylindrical element 562 and having a flow path element 572, and a curved guide face 574 bent inward from the hot water seat element 566. The ring stopper 568 supports the bias spring 550 on one end thereof and the spacer 590 for receiving the temperature sensitive spring 540 on the other end thereof.

The movable valve member 560 is moved on a balance between the temperature sensitive spring 540 and the bias spring 550. When the cold water seat element 564 is seated on a cold water valve seat 486, only hot water fed from the water heater runs through the mixing valve 400. When the hot water seat element 566 is seated on a hot water valve seat 478, on the contrary, only cold tap water runs through the mixing valve 400. When neither the cold water seat element 564 nor the hot water seat element 566 is seated on the cold water valve seat 486 or the hot water valve seat 478, both cold water and hot water are supplied according to the flow path openings of the cold water port 462 and the hot water port 472 and mixed in the water flow chamber 520.

The temperature sensitive spring 540 for actuating the movable valve member 560 is expanded and contracted under a strain due to the pre-load given by the bias spring 550, so as to slide the movable valve member 560 at a predetermined stroke ST.

Referring to FIG. 46, the curved guide face 574 of the movable valve member 560 curves inward from the hot water conduit 430 to the water flow chamber 520 to be inclined towards the ring stopper 568. Hot water supplied from the hot water conduit 430 runs through the hot water port 472 into the water flow chamber 520. In case that the guide face 574 is formed as a plane, an abrupt increase in the flow path area causes a turbulent flow of hot water, which runs through the windings of the bias spring 550 to make an undesirable noise. The curved guide face 574, however, maintains a laminar flow even under the condition of an increase in the flow path area, thus making no noise while hot water running through the windings of the bias spring 550.

Figure 47:
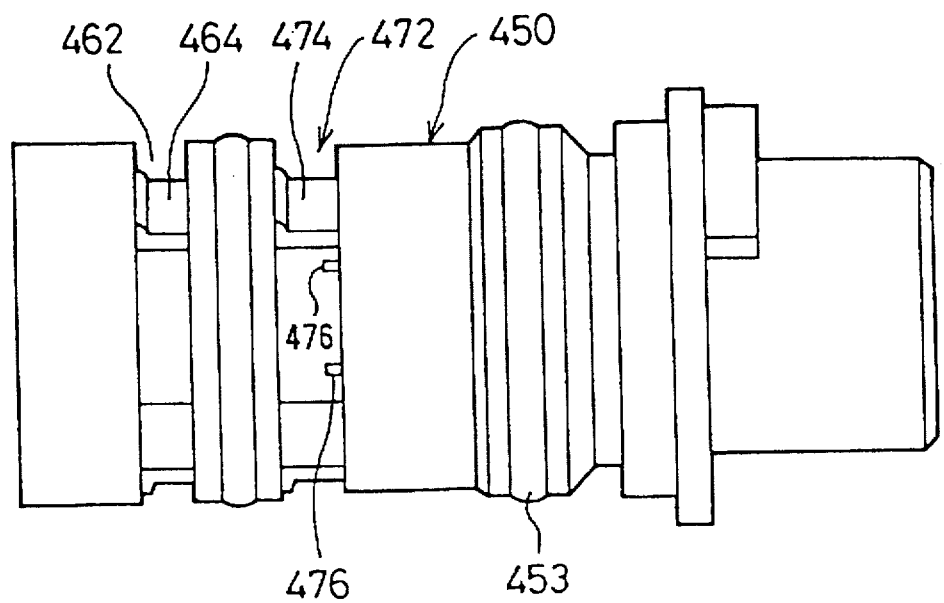
FIG. 47 is a plan view illustrating the main casing.
Figure 48:
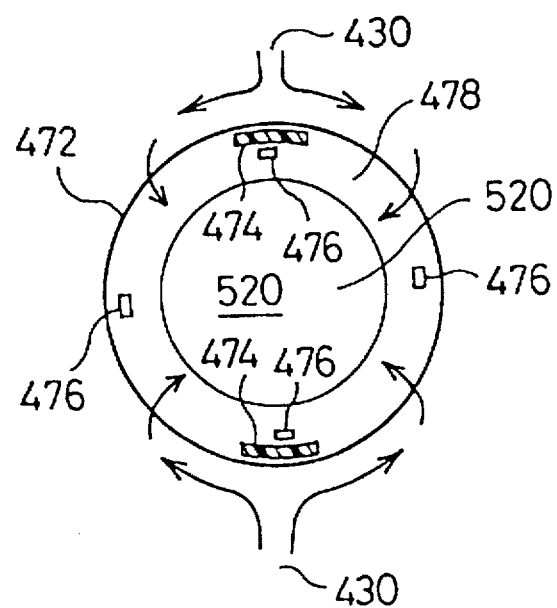
FIG. 48 shows a flow of hot water in the mixing valve of FIG. 43.

Referring to FIGS. 47 and 48, the cold water port 462 and the hot water port 472 of the main casing 450 have a pair of cold water joint elements 464 and a pair of hot water joint elements 474, respectively. Flow apertures of the hot water conduit 430 are disposed at the position of the pair of hot water joint elements 474. Hot water running through the hot water conduit 430 hits against the hot water joint elements 474, and changes its flow in a circumferential direction in order to flow into the water flow chamber 520 substantially uniformly from the all region of the hot water port 472. Hot water thus flown from the all region of the hot water port 472 is sufficiently and uniformly mixed with cold water flown through the cold water conduit 420 and the cold water port 462. An O ring 453 disposed close to the temperature control dial 440 as shown in FIG. 44 makes hot water from the hot water conduit 430 flown through a gap 431 adjacent to the O ring 453 to the hot water port 472 and subsequently to the water flow chamber 520. This also helps the uniform mixing of hot water with cold water.

Figure 49:
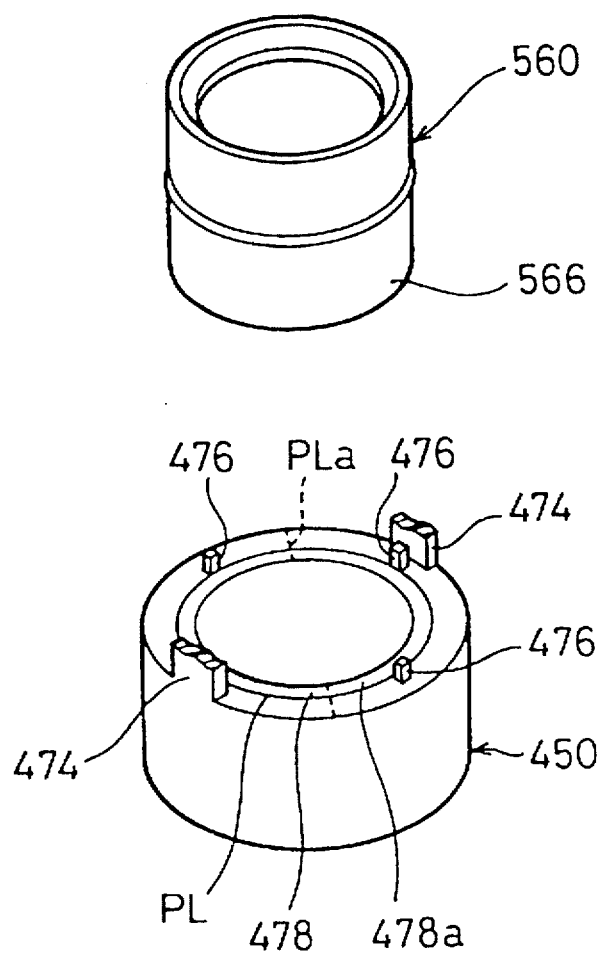
FIG. 49 is a perspective view illustrating an engagement structure of the movable valve member and the hot water seat element.

The structure and function of the hot water valve seat 478 and the relevant elements are described in detail according to the perspective view of FIG. 49. The hot water valve seat 478 includes a ring-shaped seat face 478a, which comes into contact with the hot water seat element 566 of the movable valve member 560. A parting line PL formed by a die split in injection molding defines a circumference of the seat face 478a. Four guide projections 476 are formed at 90-degree intervals along the circumference of the seat face 478a. The height of each guide projection 476 is determined to be slightly greater than the stroke ST of the movable valve member 560 by taking account of the guiding performance of the movable valve member 560 and the resistance of hot water flown into the hot water port 472.

The seat face 478a is required to have a high plane precision. Even a little unevenness of the seat face 478a damages the sealing effects between the seat face 478a and the hot water seat element 566 of the movable valve member 560 so as to deviate the actual temperature of water mixture from the target temperature. It is thereby preferable to finish the seat face 478a like a mirror. A splittable die suitable for molding the hot water joint elements 474, however, makes a parting line PLa formed on the seat face 478a as shown by the broken line in FIG. 49. In the embodiment, the seat face 478a is formed accordingly by an end face of a cylindrical core (not shown). Although the parting line PL is naturally formed along the circumference of the cylindrical core, the guide projections 476 effectively prevent the hot water seat element 566 of the movable valve member 560 from striking on the parting line PL.

The adiabatic member 410 fitted in the outer casing 310 and a cooling mechanism utilizing the adiabatic member 410 are described hereinafter according to FIG. 44. The adiabatic member 410 is formed as a cylindrical resin element. A cooling flow path 424 connecting to the cold water conduit 420 is formed between the adiabatic member 410 and the outer casing 310, and substantially surrounds the hot water conduit 430 via the adiabatic member 410. The adiabatic member 410 and the cooling flow path 424 function in the following manner. In the structure of the mixing valve 400 of the embodiment, the hot water conduit 430 is disposed close to the temperature control dial 440. A thermal energy in hot water running through the hot water conduit 430 may be transmitted to raise the temperature of the temperature control dial 440. While cold water led from the cold water conduit 420 to the cooling flow path 424 effectively cools down the adiabatic member 410, the adiabatic member 410 works to block the thermal energy of the hot water conduit 430, thus preventing the temperature rise of the temperature control dial 440.

Referring again to FIGS. 44 and 45, the spacer 590 is placed between the movable valve member 560 and the temperature sensitive spring 540. The spacer 590 includes a spring receiving element 592 for supporting one end 544 of the temperature sensitive spring 540, and a plurality of legs 594 protruded in parallel from the spring receiving element 592. Cold water supplied from the cold water port 462 flows through inter-leg flow paths 596 formed between the plurality of legs 594 whereas a center of the spring receiving element 592 is formed as a through path 598.

The spacer 590 works to keep the movable valve member 560 by a certain distance apart from the temperature sensitive spring 540 according to the reasons below. The mixing ratio of hot water to cold water is adjusted by a sliding movement of the movable valve member 560 as described previously. Cold water running from the cold water port 462 through the inter-leg flow paths 596 of the spacer 590 is mixed with hot water supplied from the hot water port 472, and flows in the through path 598 of the spacer 590 towards the temperature sensitive spring 540. The spacer 590 assures a certain distance to allow water mixture to be sufficiently mixed in the water flow chamber 520 before the water mixture reaching and coming into contact with the temperature sensitive spring 540. Such structure that the temperature sensitive spring 540 is exposed to the sufficiently mixed water realizes stable and accurate temperature control of water mixture.

Cold water supplied from the cold water port 462 does not directly hit the temperature sensitive spring 540, but flows through the inter-leg flow paths 596 of the spacer 590. This structure effectively prevents an undesirable vibration of the temperature sensitive spring 540 due to the fluid pressure, and assures stable operation of the temperature sensitive spring 540.

The certain distance held between the temperature sensitive spring 540 and the movable valve member 560 by the spacer 590 is determined according to the size of the mixing valve 400, so as to assure the sufficient mixing as described above and prevent hunting due to a response delay. In one preferable application, the distance may be 5 through 10 millimeter.

Though the spacer 590 is formed separately from the movable valve member 560 in the embodiment, the spacer may be formed integrally with the movable valve member 560 for lessen the required parts.

The cold water valve seat member 480 screwed to the main casing 450 and the slip washer 580 are described more in detail.

Referring to FIGS. 44 and 45, the cold water valve seat member 480 includes a valve seat element 482 having a recess 481 for defining the mixing chamber 510 in cooperation with the main casing 450, a cold water valve seat 486 formed on one end of the valve seat element 482, a male screw element 484 formed on the valve seat element 482 and screwed to a female screw element 455 of the main casing 450, and a spring receiving element 488 formed on a bottom of the recess 481 for supporting the temperature sensitive spring 540 via the slip washer 580. The temperature sensitive spring 540 is prepared by working a high-rigid wire rod having a diameter of 2 mm to a coil, processing the other end 546 by grinding, and implementing heat treatment for giving the shape memory properties. The slip washer 580 is composed of a heat resistant resin material, for example, polyacetal or fluororesin, and formed to have two mirror-like faces. The slip washer 580 may be composed of another material, such as metal or ceramics, as long as the material has sufficient heat resistance and is worked as mirror-like faces.

The cold water valve seat member 480 thus constructed is assembled with the slip washer 580 and the temperature sensitive spring 540 and then attached to the main casing 450. Under the condition that the movable valve member 560 is fitted in the main casing 450, the slip washer 580 is placed on the spring receiving element 488 of the cold water valve seat member 480. The temperature sensitive spring 540 is inserted into the recess 481 while one end 544 of the temperature sensitive spring 540 is supported on the spacer 590. As the ends of the plurality of the legs 594 of the spacer 590 are brought into contact with the ring stopper 568 of the movable valve member 560, the male screw element 484 of the cold water valve seat member 480 is engaged with the female screw element 455 of the main casing 450. The cold water valve seat member 480 is accordingly attached to the main casing 450.

A rotational force and a pressing force due to the screw engagement of the cold water valve seat member 480 are applied to the temperature sensitive spring 540 via the slip washer 580. The mirror-like faces of the slip washer 580 and the high rigidity of the temperature sensitive spring 540, however, function to apply no torsional force but only a pressing force to the temperature sensitive spring 540. The temperature sensitive spring 540 does not expand or contract in the mixing chamber 510 under the torsional loading, thereby not inclining the movable valve member 560 to damage the sealing effects. A small strain of the temperature sensitive spring 540 effectively lowers the hysteresis, thus allowing the temperature of water mixture to be adjusted with high precision as well as improving the durability of the temperature sensitive spring 540.

Referring again to FIGS. 44 and 45, the pre-load adjusting system 600 includes the liner 610 for supporting one end 554 of the bias spring 550, and the spindle 630 for moving the liner 610 in an axial direction.

The liner 610 includes a cylindrical main body 612 having a bottomed hole 611, a spring receiving element 615 formed on one end of the cylindrical main body 612 for receiving one end of the bias spring 550, a first guide element 614 and a second guide element 616 (see FIG. 45) formed on an outer wall of the cylindrical main body 612, and a first female screw element 622 and a second female screw element 624 formed on an inner wall of the cylindrical main body 612.

The first and the second guide elements 614 and 616 disposed at an 180-degree interval along the circumference of the cylindrical main body 612 are positioned corresponding to ends of the first and the second female screw elements 614a and 616a along an axis of the cylindrical main body 612, respectively. The first and second guide grooves 614a and 616a are slidably movable with respect to guide rails 458 and 459 formed on an inner wall of the main casing 450.

The spindle 630 includes a rotating body 632 and a projection 634, which are formed of a resin material integrally with each other. The projection 634 runs through a through hole 457 of the main casing 450, and is fixed to the temperature control dial 440 via a spline formed on an outer wall of the projection 634 and a fixture element 442. The rotating body 632 has a first male screw element 636 and a second male screw element 638 respectively corresponding to the first female screw element 622 and the second female screw element 624. Projections 639 are formed on the threads of the first and the second male screw elements 636 and 638 as shown in FIG. 45. The projections 639 are in contact with the roots of the first and the second female screw elements 622 and 624 to give a sliding resistance.

In the pre-load adjusting system 600 thus constructed, the target temperature of water mixture is adjusted by turning the temperature control dial 440 in a predetermined direction according to an indication of an applicable temperature range on an outer face of the temperature control dial 440. When the temperature control dial 440 is turned manually, the spindle 630 rotates integrally with the temperature control dial 440. The first and the second male screw elements 636 and 638 formed on the outer face of the spindle 630 engage with the first and the second female screw elements 622 and 624 of the liner 610, and a rotational driving force is thereby transmitted to the liner 610. Since the first and the second guide elements 614 and 616 and the guide rails 458 and 459 restrict rotation of the liner 610, the liner 610 moves in the axial direction. The axial movement of the liner 610 subsequently displaces the bias spring 550. Displacement of the bias spring 550 moves the movable valve member 560 so as to displace the temperature sensitive spring 540 to a position where the temperature sensitive spring 540 balances with the bias spring 550, thus changing the target temperature of water mixture running through the mixing valve 400.

In the structure of the pre-load adjusting system 600, the bias spring 550 receives a pre-load in a direction identical with a pressed direction of the liner 610, and does not receive any torsional force. Namely, no torsional force is applied to the movable valve member 560 via the bias spring 550. The movable valve member 560 is accordingly not inclined but stably slides even under conditions of weak supporting force by the temperature sensitive spring 540 and the bias spring 550.

The pre-load adjusting system 600 is assembled in the following manner. The spindle 630 is first fitted into the liner 610. As the first and the second guide elements 614 and 616 of the liner 610 are fitted to the guide rails 458 and 459 of the main casing 450 and the projection 634 is fitted in the through hole 457, the liner 610 and the spindle 630 are inserted into the main casing 450. The temperature control dial 440 is then attached to the main casing 450. The first and the second male screw elements 636 and 638 of the spindle 630 form, together with the first and the second female screw elements 622 and 624 of the liner 610, a double-threaded screw for realizing smooth screw engagement. The first and the second guide elements 614 and 616 are positioned corresponding to the ends of the first and the second female screw elements 622 and 624 to allow automatic assembly. The liner 610 is inserted into the main casing 450 as the first and the second guide elements 614 and 616 are fitted to the guide rails 458 and 459. This allows the precise positioning compared with another mechanism using, for example, a spline.

The liner 610 and the spindle 630 are engaged with each other via the double-threaded screw, which has a large pitch to ensure the smooth screw engagement but may allow the spindle 630 to be loosened easily by means of the spring force of the bias spring 550. In the embodiment, however, the projections 639 formed on the threads of the first and the second male screw elements 636 and 638 work as a sliding resistance against the roots of the first and the second female screw elements 622 and 624. The spindle 630 is thereby not loosened by the spring force of the bias spring 550. These projections 639 are formed easily since the spindle is typically composed of a resin material.

There may be many alterations, changes, and modifications without departing from the scope or spirit of essential characteristics of the invention. It is thus clearly understood that the above embodiments are only illustrative and not restrictive in any sense. The spirit and scope of the present invention is limited only by the terms of the appended claims.

What is claimed is:

1. A combination faucet device for mixing high-temperature water with low-temperature water and making water mixture of a predetermined target temperature flown through said combination faucet device, said combination faucet device comprising a casing member comprising a hot water port for supplying said high-temperature water therethrough, a cold water port for supplying said low-temperature water therethrough, and a sliding chamber connecting to both of said hot water port and said cold water port, a movable valve member slidably fitted into said sliding chamber formed in said casing member for adjusting a mixing ratio of said high-temperature water flown through said hot water port to said low-temperature water flown through said cold water port, a temperature sensitive spring having a first end and a second end of a certain shape and being mainly composed of a material having a spring constant varied according to a temperature change within a predetermined temperature range, said temperature sensitive spring pressing said movable valve member in a first direction for decreasing the ratio of said high-temperature water to said low-temperature water when an actual temperature of said water mixture becomes greater than said predetermined target temperature, a bias spring for pressing said movable valve member in a second direction opposite to said first direction, and a temperature-sensitive spring receiving member having a spring receiving recess formed to receive said certain shape of said second end of said temperature-sensitive spring such that a force generated by said temperature sensitive spring is properly imposed upon said movable valve member.

2. A combination faucet device in accordance with claim 1, wherein said second end of said temperature sensitive spring is ground to a plane.

3. A combination faucet device for mixing high-temperature water with low-temperature water and making water mixture of a predetermined target temperature flown through said combination faucet device, said combination faucet device comprising a casing member comprising a hot water port for supplying said high-temperature water therethrough, a cold water port for supplying said low-temperature water therethrough, and a sliding chamber connecting to both of said hot water port and said cold water port, a movable valve member slidably fitted into said sliding chamber formed in said casing member for adjusting a mixing ratio of said high-temperature water flown through said hot water port to said low-temperature water flown through said cold water port, a temperature sensitive spring having a first end and a second end and being mainly composed of a material having a spring constant varied according to a temperature change within a predetermined temperature range, said temperature sensitive spring pressing said movable valve member in a first direction for decreasing to the ratio of said high-temperature water to said low-temperature water when an actual temperature of said water mixture becomes greater than said predetermined target temperature, a bias spring for pressing said movable valve member in a second direction opposite to said first direction, and a temperature-sensitive spring receiving member having a spring receiving recess formed corresponding to a shape of said second end of said temperature sensitive spring, wherein said temperature-sensitive spring receiving member comprises a splittable member having a helical groove for accommodating said temperature sensitive spring therein.

4. A combination faucet device for mixing high-temperature water with low-temperature water and making water mixture of a predetermined target temperature flown through said combination faucet device, said combination faucet device comprising a casing member comprising a hot water port for supplying said high-temperature water therethrough, a cold water port for supplying said low-temperature water therethrough, and a sliding chamber connecting to both of said hot water port and said cold water port, a movable valve member slidably fitted into said sliding chamber formed in said casing member for adjusting a mixing ratio of said high-temperature water flown through said hot water port to said low-temperature water flown through said cold water port, a temperature sensitive spring having a first end and a second end and being mainly composed of a material having a spring constant varied according to a temperature change within a predetermined temperature range, said temperature sensitive spring pressing said movable valve member in a first direction for decreasing the ratio of said high-temperature water to said low-temperature water when an actual temperature of said water mixture becomes greater than said predetermined target temperature, a bias spring for pressing said movable valve member in a second direction opposite to said first direction, and a temperature-sensitive spring receiving member having a spring receiving recess formed corresponding to a shape of said second end of said temperature sensitive spring, wherein said temperature-sensitive spring receiving member comprises a resin element which said second end of said temperature sensitive spring is inserted in and molded with.

5. A combination faucet device for mixing high-temperature water with low-temperature water and making water mixture of a predetermined target temperature flown through said combination faucet device, said combination faucet device comprising a casing member comprising a hot water port for supplying said high-temperature water therethrough, a cold water port for supplying said low-temperature water therethrough, and a sliding chamber connecting to both of said hot water port and said cold water port, a movable valve member slidably fitted into said sliding chamber formed in said casing member for adjusting a mixing ratio of said high-temperature water flown through said hot water port to said low-temperature water flown through said cold water port, a temperature sensitive spring having a first end and a second end and being mainly composed of a material having a spring constant varied according to a temperature change within a predetermined temperature range, said temperature sensitive spring pressing said movable valve member in a first direction for decreasing the ratio of said high-temperature water to said low-temperature water when an actual temperature of said water mixture becomes greater than said predetermined target temperature, a bias spring for pressing said movable valve member in a second direction opposite to said first direction, a temperature-sensitive spring receiving member having a spring receiving recess formed corresponding to a shape of said second end of said temperature sensitive spring, and a spacer disposed between said movable valve member and said temperature sensitive spring for keeping said first end of said temperature sensitive spring apart by a predetermined distance from a certain position where said high-temperature water is mixed with said low-temperature water, said temperature-sensitive spring receiving member being formed on said spacer.

6. A combination faucet device for mixing high-temperature water with low-temperature water and making water mixture of a predetermined target temperature flown through said combination faucet device, said combination faucet device comprising a casing member comprising a hot water port for supplying said high-temperature water therethrough, a cold water port for supplying said low-temperature water therethrough, and a sliding chamber connecting to both of said hot water port and said cold water port, a movable valve member slidably fitted into said sliding chamber formed in said casing member for adjusting a mixing ratio of said high-temperature water flown through said hot water port to said low-temperature water flown through said cold water port, a temperature sensitive spring having a first end and a second end and being mainly composed of a material having a spring constant varied according to a temperature change within a predetermined temperature range, said temperature sensitive spring pressing said movable valve member in a first direction for decreasing the ratio of said high-temperature water to said low-temperature water when an actual temperature of said water mixture becomes greater than said predetermined target temperature, a bias spring for pressing said movable valve member in a second direction opposite to said first direction, and a temperature-sensitive spring receiving member comprising a flat plate having a central support element formed on a center thereof and a spring receiving element for supporting said second end of said temperature sensitive spring, said temperature-sensitive spring receiving member being supported on said casing member via said central support element to allow a pivotal movement of said temperature sensitive spring receiving member with respect to said casing member.

7. A combination faucet device in accordance with claim 6, wherein said central support element of said temperature-sensitive spring receiving member comprises a projection and a support recess for supporting said projection.

8. A combination faucet device in accordance with claim 6, wherein said central support element of said temperature-sensitive spring receiving member is mainly composed of a hard resin, and said spring receiving element of said temperature-sensitive spring receiving member is mainly composed of a resilient material.

9. A combination faucet device for mixing high-temperature water with low-temperature water and making water mixture of a predetermined target temperature flown through said combination faucet device, said combination faucet device comprising a casing member comprising a hot water port for supplying said high-temperature water therethrough, a cold water port for supplying said low-temperature water therethrough, and a sliding chamber connecting to both of said hot water port and said cold water port, a movable valve member slidably fitted into said sliding chamber formed in said casing member for adjusting a mixing ratio of said high-temperature water flown through said hot water port to said low-temperature water flown through said cold water port, a temperature sensitive spring mainly composed of a material having a spring constant varied according to a temperature change within a predetermined temperature range, said temperature sensitive spring pressing said movable valve member in a first direction for decreasing the ratio of said high-temperature water to said low-temperature water when an actual temperature of said water mixture becomes greater than said predetermined target temperature, a bias spring having a first end and a second end, said bias spring pressing said movable valve member in a second direction opposite to said first direction, and a bias spring receiving member comprising a flat plate having a central support element formed on a center thereof and a spring receiving element for supporting said first end of said bias spring, said bias spring receiving member being supported on said casing member via said central support element to allow a pivotal movement of said bias spring receiving member with respect to said casing member.

10. A combination faucet device in accordance with claim 9, wherein said central support element of said bias spring receiving member comprises a projection and a support recess for supporting said projection.

11. A combination faucet device in accordance with claim 9, wherein said central support element of said bias spring receiving member is mainly composed of a hard resin, and said spring receiving element of said bias spring receiving member is mainly composed of a resilient material.

12. A combination faucet device for mixing high-temperature water with low-temperature water and making water mixture of a predetermined target temperature flown through said combination faucet device, said combination faucet device comprising a casing member comprising a hot water port for supplying said high-temperature water therethrough, a cold water port for supplying said low-temperature water therethrough, and a sliding chamber connecting to both of said hot water port and said cold water port, a movable valve member slidably fitted into said sliding chamber formed in said casing member for adjusting a mixing ratio of said high-temperature water flown through said hot water port to said low-temperature water flown through said cold water port, a temperature sensitive spring having a first end and a second end and being mainly composed of a material having a spring constant varied according to a temperature change within a predetermined temperature range, said temperature sensitive spring pressing said movable valve member in a first direction for decreasing the ratio of said high-temperature water to said low-temperature water when an actual temperature of said water mixture becomes greater than said predetermined target temperature, a bias spring for pressing said movable valve member in a second direction opposite to said first direction, and a temperature-sensitive spring receiving member having a spring receiving element for supporting said second end of said temperature sensitive spring, and a valve pressing element protruded from said spring receiving element for pressing a central portion of said movable valve member in a sliding direction.

13. A combination faucet device for mixing high-temperature water with low-temperature water and making water mixture of a predetermined target temperature flown through said combination faucet device, said combination faucet device comprising a casing member comprising a hot water port for supplying said high-temperature water therethrough, a cold water port for supplying said low-temperature water therethrough, and a sliding chamber connecting to both of said hot water port and said cold water port, a movable valve member slidably fitted into said sliding chamber formed in said casing member for adjusting a mixing ratio of said high-temperature water flown through said hot water port to said low-temperature water flown through said cold water port, a temperature sensitive spring mainly composed of a material having a spring constant varied according to a temperature change within a predetermined temperature range, said temperature sensitive spring pressing said movable valve member in a first direction for decreasing the ratio of said high-temperature water to said low-temperature water when an actual temperature of said water mixture becomes greater than said predetermined target temperature, a bias spring having a first end and a second end, said bias spring pressing said movable valve member in a second direction opposite to said first direction, and a bias spring receiving member having a spring receiving element for supporting said first end of said bias spring, a valve pressing element protruded from said spring receiving element for pressing a central portion of said movable valve member in a sliding direction, and a bevel-formed element guiding said high-temperature water from said hot water port to said valve pressing element thereby narrowing a flow path of said sliding chamber.

14. A combination faucet device for mixing high-temperature water with low-temperature water and making a water mixture of a predetermined target temperature flowing through said combination faucet device, said combination faucet device comprising a casing member comprising a hot water port for supplying said high-temperature water therethrough, a cold water port for supplying said low-temperature water therethrough, and a sliding chamber connecting to both of said hot water port and said cold water port, a movable valve member slidably fitted into said sliding chamber formed in said casing member for adjusting a mixing ratio of said high-temperature water flown through said hot water port to said low-temperature water flown through said cold water port, a temperature sensitive spring mainly composed of a material having a spring constant varied according to a temperature change within a predetermined temperature range, said temperature sensitive spring pressing said movable valve member in a first direction for decreasing the ratio of said high-temperature water to said low-temperature water when an actual temperature of said water mixture becomes greater than said predetermined target temperature, a bias spring for pressing said movable valve member in a second direction opposite to said first direction, a movable valve member guide aperture formed through said movable valve member along a sliding direction, and a guiding element protruding from a receiving member and slidably fitted in said movable valve member guide aperture for supporting said movable valve member.

15. A combination faucet device for mixing high-temperature water with low-temperature water and making water mixture of a predetermined target temperature flown through said combination faucet device, said combination faucet device comprising a casing member comprising a hot water port for supplying said high-temperature water therethrough, a cold water port for supplying said low-temperature water therethrough, and a sliding chamber connecting to both of said hot water port and said cold water port, a movable valve member slidably fitted into said sliding chamber formed in said casing member for adjusting a mixing ratio of said high-temperature water flown through said hot water port to said low-temperature water flown through said cold water port, a temperature sensitive spring mainly composed of a material having a spring constant varied according to a temperature change within a predetermined temperature range, said temperature sensitive spring pressing said movable valve member in a first direction for decreasing the ratio of said high-temperature water to said low-temperature water when an actual temperature of said water mixture becomes greater than said predetermined target temperature, a bias spring for pressing said movable valve member in a second direction opposite to said first direction, and a guide projection protruding into an opening of said hot water port or said cold water port for coming into contact with a circumference of said movable valve member so as to guide said movable valve member in a sliding direction.

16. A combination faucet device in accordance with claim 15, said combination faucet device further comprising a seat face where said movable valve member is seated, said seat face positioning a parting line along said circumference of said movable valve member while said movable valve member is seated on said seat face, said guide projection being formed to make said movable valve member seated inside said parting line.

17. A combination faucet device for mixing high-temperature water with low-temperature water and making water mixture of a predetermined target temperature flown through said combination faucet device, said combination faucet device comprising a casing member comprising a hot water port for supplying said high-temperature water therethrough, a cold water port for supplying said low-temperature water therethrough, and a sliding chamber connecting to both of said hot water port and said cold water port, a movable valve member slidably fitted into said sliding chamber formed in said casing member for adjusting a mixing ratio of said high-temperature water flown through said hot water port to said low-temperature water flown through said cold water port, a temperature sensitive spring having a first end and a second end and being mainly composed of a material having a spring constant varied according to a temperature change within a predetermined temperature range, said temperature sensitive spring pressing said movable valve member in a first direction for decreasing the ratio of said high-temperature water to said low-temperature water when an actual temperature of said water mixture becomes greater than said predetermined target temperature, a bias spring for pressing said movable valve member in a second direction opposite to said first direction, a temperature-sensitive spring receiving member comprising a spring receiving element for supporting said second end of said temperature sensitive spring, and a cylinder element inserted into said sliding chamber of said casing member, and fixture means for fixing said temperature-sensitive spring receiving member to said casing member.

18. A combination faucet device in accordance with claim 17, wherein said fixture means comprises a recess formed on said casing member, and an engagement click formed on said temperature-sensitive spring receiving member for engaging with said recess.

19. A combination faucet device in accordance with claim 17, wherein said fixture means comprises a slit formed on said casing member, a groove formed on said temperature-sensitive spring receiving member at a certain position corresponding to said slit, and a stop ring for engaging with said slit and said groove to prevent said temperature-sensitive spring receiving member from being slipped off said sliding chamber.

20. A combination faucet device in accordance with claim 17, said combination faucet device further comprising a cold water valve seat member fitted in said sliding chamber of said casing member for constituting said cold water port and having a cold water valve seat where said movable valve member is seated on, said temperature-sensitive spring receiving member being formed on said cold water valve seat member.

21. A combination faucet device for mixing high-temperature water with low-temperature water and making water mixture of a predetermined target temperature flown through said combination faucet device, said combination faucet device comprising a casing member comprising a hot water port for supplying said high-temperature water therethrough, a cold water port for supplying said low-temperature water therethrough, and a sliding chamber connecting to both of said hot water port and said cold water port, a movable valve member slidably fitted into said sliding chamber formed in said casing member for adjusting a mixing ratio of said high-temperature water flown through said hot water port to said low-temperature water flown through said cold water port, a temperature sensitive spring having a first end and a second end and being mainly composed of a material having a spring constant varied according to a temperature change within a predetermined temperature range, said temperature sensitive spring pressing said movable valve member in a first direction for decreasing the ratio of said high-temperature water to said low-temperature water when an actual temperature of said water mixture becomes greater than said predetermined target temperature, a bias spring for pressing said movable valve member in a second direction opposite to said first direction, a first screw element formed in an opening of said casing member, a spring receiving member having a second screw element for engaging with said first screw element of said casing member, said spring receiving member being fixed to one end of said opening of said casing member through engagement of said second screw element with said first screw element and receiving said second end of said temperature sensitive spring, and a sliding member disposed between said spring receiving member and said temperature sensitive spring, said sliding member further comprising a sliding face having a small coefficient of friction and being brought into contact with said spring receiving member and said temperature sensitive spring.

* * * * *